(12) United States Patent
Kwag et al.

(10) Patent No.: US 11,454,401 B2
(45) Date of Patent: Sep. 27, 2022

(54) COOKING APPLIANCE

(71) Applicant: LG ELECTRONICS INC., Seoul (KR)

(72) Inventors: Dongseong Kwag, Seoul (KR); Donghyok Yun, Seoul (KR); Hag Soo Kim, Seoul (KR); Sung Mun Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 331 days.

(21) Appl. No.: 16/739,623

(22) Filed: Jan. 10, 2020

(65) Prior Publication Data

US 2020/0224884 A1    Jul. 16, 2020

(30) Foreign Application Priority Data

Jan. 11, 2019  (KR) .................. 10-2019-0004169
Apr. 1, 2019   (KR) .................. 10-2019-0038037
Apr. 5, 2019   (KR) .................. 10-2019-0040379

(51) Int. Cl.
*F24C 15/02*    (2006.01)
*H05B 6/12*     (2006.01)
*F24C 7/08*     (2006.01)

(52) U.S. Cl.
CPC .............. *F24C 15/02* (2013.01); *H05B 6/12* (2013.01); *F24C 7/08* (2013.01)

(58) Field of Classification Search
CPC .......... F24C 15/02; F24C 15/04; F24C 15/00; H05B 6/12; H05B 6/129; A47J 37/06
See application file for complete search history.

(56) References Cited

U.S. PATENT DOCUMENTS

| | | |
|---|---|---|
| 1,690,570 A | 11/1928 | Dalbey |
| 3,393,295 A | 7/1968 | Jepson et al. |
| 3,746,837 A | 7/1973 | Frey et al. |
| 4,403,540 A * | 9/1983 | Erkelenz ............. A47J 37/0611 99/375 |
| 6,029,649 A | 2/2000 | Su |
| 6,097,003 A * | 8/2000 | Markum .................. F24C 7/06 219/402 |
| 6,271,502 B1 | 8/2001 | Lee |
| 7,301,127 B1 * | 11/2007 | Derridinger, Jr. ... A47J 37/0709 219/386 |
| 9,492,031 B2 * | 11/2016 | Diaz .................. A47J 37/0704 |
| 9,924,830 B1 | 3/2018 | Glucksman et al. |
| 2005/0252905 A1 | 11/2005 | De'Longhi |
| 2012/0031282 A1 | 2/2012 | Kitayama et al. |
| 2022/0087473 A1 * | 3/2022 | Kim ....................... F24C 7/067 |

(Continued)

FOREIGN PATENT DOCUMENTS

| | | |
|---|---|---|
| CN | 202173285 U | 3/2012 |
| CN | 203328543 U | 12/2013 |
| CN | 106821025 A | 6/2017 |

(Continued)

OTHER PUBLICATIONS

JPH0634137(A) by Sugioka Takanobu, Microwave Oven of Aug. 1994.*

*Primary Examiner* — Jorge A Pereiro
*Assistant Examiner* — Nikhil P Mashruwala
(74) *Attorney, Agent, or Firm* — Dentons US LLP

(57) ABSTRACT

A cooking appliance includes a door frame that supports a heating part and is coupled to a door such that the heating part is disposed at the door.

16 Claims, 35 Drawing Sheets

(56) References Cited

U.S. PATENT DOCUMENTS

2022/0090794 A1\* 3/2022 Yun .................. F24C 15/00

FOREIGN PATENT DOCUMENTS

| | | |
|---|---|---|
| CN | 107131528 A | 9/2017 |
| DE | 2145094 A1 | 3/1973 |
| EP | 0830063 A1 | 3/1998 |
| JP | 0634137 A | 2/1994 |
| JP | 2000081213 A | 3/2000 |
| JP | 2003114030 A | 4/2003 |
| JP | 2005030711 A | 2/2005 |
| JP | 2008039277 A | 2/2008 |
| JP | 2017084814 A | 5/2017 |
| KR | 1019970011605 A | 3/1997 |
| KR | 1020060062202 A | 6/2006 |
| KR | 2020090005892 U | 6/2009 |
| KR | 200450168 Y1 | 9/2010 |
| KR | 1020110008423 A | 1/2011 |
| KR | 2020110001565 U | 2/2011 |
| WO | 97/34490 A1 | 9/1997 |
| WO | 2008032903 A1 | 3/2008 |

\* cited by examiner

COOKING APPLIANCE

CROSS-REFERENCE TO RELATED APPLICATION

This application claims priority to and the benefit of Korean Patent Application No. 10-2019-0004169, filed on Jan. 11, 2019, Korean Patent Application No. 10-2019-0038037, filed on Apr. 1, 2019, and Korean Patent Application No. 10-2019-0040379, filed on Apr. 5, 2019, the disclosure of which are incorporated herein by reference in their entirety.

BACKGROUND

1. Technical Field

The present disclosure relates to a cooking appliance, and more particularly, to a cooking appliance, such as an oven, provided to open and close a cooking compartment.

2. Background

Cooking appliances, which are one kind of home appliances that may be installed in a kitchen space for cooking food according to a user's intention. Cooking appliances may be classified in various ways according to heat sources or forms used therein or types of fuels used therein.

When classified according to the form of cooking food, cooking appliances may be classified into open cooking appliances and sealed cooking appliances according to the form of a space in which food is placed. For example, sealed cooking appliances may include an oven, a microwave oven, and the like, and open cooking appliances include a cooktop, a hob, and the like.

The sealed cooking appliances are cooking appliances that cook food by sealing a space in which food is located and heating the sealed space. The sealed cooking appliances are provided with a cooking compartment which is a space in which food is placed and which is sealed when cooking the food. The cooking compartment is substantially the space in which food is cooked.

The sealed cooking appliances are broadly classified into gas ovens and electric ovens according to the type of heat source. The gas ovens use gas as a fuel and cook food using flames generated as gas is supplied to a plurality of burners, and the burners are ignited, which burns the supplied gas. Unlike the gas ovens, the electric ovens use electricity as a heat source and cook food using heat emitted from a plurality of heaters, which are heated by the electricity.

Of the gas ovens and the electric ovens, the use of the electric ovens has increased due to a faster cooking speed, higher thermal efficiency, and better stability when compared with the gas ovens. Also, reducing the size of the electric ovens is easier than reducing the size of the gas ovens. Accordingly, the electric ovens in the form of mini ovens having a small size (hereinafter referred to as "mini ovens") have also been released.

The mini ovens have a small size, and thus are not suitable for cooking food of a large size but are suitable for baking or warming a small amount of food which does not require the use of large-capacity ovens.

Particularly, the mini ovens have advantages of being conveniently usable in toasting bread. In addition, the mini oven are usable in cooking a small amount of food or food having a small size. Accordingly, the use of the mini ovens as cooking appliances for replacing conventional toasters has increased.

In general, the mini oven includes an outer case for housing all its components, a plurality of shelves for placing food during cooking, and a cooking compartment having an open front surface through which food may be placed in the cooking compartment and cooked.

Also, the mini oven includes an oven heater for heating food to an appropriate temperature, and a door for opening and closing the cooking compartment.

The oven heater may be disposed below the shelves, or may be disposed at an upper portion of the cooking compartment. The oven heater disposed below the shelf is mainly used to heat the shelves, and the oven heater disposed at the upper portion of the cooking compartment may be used to directly apply heat to food placed on the shelves.

The door is provided so that, while food is placed in the cooking compartment and cooked, the inside of the cooking compartment is closed from the outside environment and sealed. The door may include a handle for easily opening and closing the door and a glass window for viewing the inside of the cooking compartment without opening the door.

In the mini oven, the door is mostly provided as a downward opening type. That is, the door of the mini oven may have a lower end portion rotatably coupled to the outer case through a door hinge. The door opens the cooking compartment by rotating downward about the lower end portion rotatably coupled to the outer case and closes the cooking compartment by rotating upward when the cooking compartment is open.

The door may open the cooking compartment by rotating at an angle of about 90° when the cooking compartment is closed, and the shelves may be withdrawn or inserted while the cooking compartment is opened by the door.

That is, the door is opened in a state of being substantially parallel to the shelves inserted into the mini oven, and the withdrawal and insertion of the shelves are directly performed by the user.

However, the mini oven having the above configuration has the following disadvantages.

First, there is a problem in that, when the door is opened, the door inevitably protrudes from the front of the mini oven by as much as a height of the door. Thus, the opening of the door and the withdrawal and insertion of the shelves are difficult when the mini oven is installed in a narrow space.

Second, there is a problem in that, when the door is opened, the door protrudes from the front of the mini oven by as much as the height of the door, and the center of mass of the mini oven is biased towards the front.

Due to the characteristics of the mini oven being lightweight as well as having a small size, the center of mass of the mini oven is inevitably biased towards the front when the door opens forward from the mini oven. In this case, there is an increased risk that the mini oven may topple forward.

Particularly, when the shelves are withdrawn, the shelves are often placed on the door for checking a cooking state or temporarily placing the shelves. In such a structure in which the center of mass of the mini oven is biased towards the front, the risk of the mini oven toppling forward is inevitably increased.

Furthermore, the risk is greater when the weight of the shelves or foods placed on the shelves are heavy. This not only adds risks to the cooking of heavyweight foods but also causes an increase in the weight of the shelves. That is, even when it is necessary to adopt shelves formed of a thick, heavy material to improve the cooking performance, adopting such shelves becomes difficult due to the risk of the mini oven toppling forward.

Third, various limitations occur because a passage for the withdrawal and insertion of the shelves and a passage for checking the cooking state are limited to the front side of the mini oven.

That is, since the directions of the withdrawal and insertion of the shelves are limited to a front-rear direction, inconvenience occurs during the withdrawal and insertion of the shelves when the mini oven is installed at a low place. Since the passage for checking the cooking state is limited to the glass window provided in the door, there is considerable inconvenience in checking the cooking state when the mini oven is installed at a low place.

Generally, for properly checking the cooking state of the entire food, opening the door is not enough, and the withdrawal of the tray should necessarily be performed.

That is, when the user wants to properly check the cooking state of the entire food, the user should open the door and then withdraw the shelf containing the entire food. However, when the mini oven is installed at a low place, it is very inconvenient to perform such tasks. Also the possibility that the user will be exposed to the risk of injuries such as burns when the user withdraws and inserts the shelf is also increased.

Taking the above problems into account, a structure of the door capable of opening the front and top of the cooking compartment together may be considered. This door may be provided in such a form that a front surface part disposed in the front of the cooking compartment and an upper surface part disposed on the top of the cooking compartment are integrally provided.

The door having this structure may be rotated about the rear thereof and open the cooking compartment, and due to the rotation of the door, the top of the cooking compartment may be opened together with the front of the cooking compartment.

Thus, directions in which the shelves are withdrawn and inserted may be expanded to the top-down direction in addition to the front-rear direction, and since the door does not protrude from the front of the mini oven when the door is opened, the center of mass of the mini oven is less biased forward. Further, since the opening for checking the cooking state when the door is opened is expanded to the top of the cooking compartment in addition to the front of the cooking compartment, checking of the cooking state may also be enhanced.

Meanwhile, in the mini oven to which the door having the structure as described above is adopted, the oven heater is inevitably installed on the door in order to dispose the oven heater on the upper portion of the cooking compartment. However, to install the oven heater on the door, a structure for coupling the oven heater to the door has to be provided on the door, and various components for electrical connection, which are required to supply power to the oven heater and to transmit control signals to the oven heater, have to be provided.

SUMMARY

Various embodiments are directed to providing a cooking appliance having an improved structure such that a heater may be installed on a door.

Also, various embodiments are directed to providing a cooking appliance having an improved structure such that various components that have to be disposed at a door may be stably installed on the door.

In addition, various embodiments are directed to providing a cooking appliance having an improved structure such that various components that have to be disposed at a door may be easily and promptly installed on the door and be easily disassembled for maintenance.

A cooking appliance according to an embodiment of the present disclosure to achieve these aspects includes a door frame that supports a first heating part and is coupled to a door, and thereby allows the first heating part to be disposed at the door.

The door frame may include a heater mounting part to which the first heating part is coupled, and a coupling part that is coupled with a door upper surface part and supports the heater mounting part on the door upper surface part.

With this configuration, the first heating part may be stably installed on the door, and a task of installing the first heating part may be efficiently performed.

Further, a shielding plate to which a reflector is coupled may be provided on the door frame.

Further, a grille fixing part to which a protective grille is fixed may be provided on the door frame.

Further, a seating surface on which a glass is seated may be formed on the door frame.

Further, a restricting rib and a stopper that restrict movement of the glass seated on the seating surface may be provided on the door frame.

With this configuration, the structures for fixing the components such as the glass, the reflector, and the protective grille, in addition to the first heating part, to the door frame may be provided on the door frame, and a frame in which the components such as the first heating part, the glass, the reflector, and the protective grille may be assembled into a single unit body by the door frame may be provided.

A cooking appliance according to an embodiment of the present disclosure includes: a housing in which a cooking compartment is formed and whose upper and front surfaces are open, the cooking compartment being surrounded by a bottom surface, both side surfaces, and a back surface of the housing; a door that includes a door upper surface part that covers the upper surface of the housing and a door front surface part that is connected to a front side of the door upper surface part and covers the front surface of the housing, is rotated about a rear side of the door upper surface part, and opens and closes the upper and front surfaces of the housing; a first heating part disposed at the door; and a door frame that supports the first heating part and is coupled to the door.

The door frame may cover a lower portion of the door upper surface part and/or may be coupled with the door. The first heating part may be installed on the door frame and/or may be disposed at the lower portion of the door upper surface part.

Further, the door frame may include: a heater mounting part to which the first heating part is coupled. The door frame may include a coupling part that is coupled with the door upper surface part and supports the heater mounting part on the door upper surface part.

Further, the first heating part may include an electric heater having a heating element, a first connecting end disposed at an end of one side of the heating element in a longitudinal direction, and a second connecting end disposed at an end of the other side of the heating element in the longitudinal direction. The heater mounting part may include a first connecting end fixing part that fixes the first connecting end and a second connecting end fixing part that fixes the second connecting end.

Further, at least one of the first connecting end fixing part and the second connecting end fixing part may include: a cover that surrounds surrounding portions of the connecting end from an outer side of the connecting end in a circumferential direction. At least one of the first connecting end fixing part and the second connecting end fixing part may further include a support wall which partitions a space surrounded by the cover into inner and outer spaces of the first heating part in a longitudinal direction and into which the connecting end is fitted.

Further, the heating element may be formed in the shape of a rod having a predetermined length. At least one of the first connecting end and the second connecting end may include a cylindrical part that is formed in a cylindrical shape and is disposed at each of opposite ends of the heating element in the longitudinal direction. At least one of the first connecting end and the second connecting end may include a key-shaped part that is disposed between the heating element and the cylindrical part. is the key-shaped part may be formed in a flat hexahedral shape whose thickness is smaller than a diameter of the cylindrical part and whose width is larger than the diameter of the cylindrical part. The support wall may include a coupling hole that is formed to pass through the support wall and is formed in a shape corresponding to a shape of an outer circumferential surface of the cylindrical part. The support wall may include a through-hole that is formed to pass through the support wall and is formed as a passage that connects the coupling hole and an outer portion of the support wall to each other.

Further, the through-hole may be formed with a width corresponding to the thickness of the key-shaped part.

Further, at least one of the first connecting end and the second connecting end may pass through the through-hole and/or may be inserted into the coupling hole in a state in which the first heating part takes a first posture. The first posture may be a posture in which a surface parallel to a thickness direction of the key-shaped part is disposed parallel to a width direction of the through-hole.

Further, the cylindrical part may further include an extension part that is formed to extend toward the key-shaped part. The extension part may be formed to protrude outward from a surface parallel to a width direction of the key-shaped part so that a step is formed on the surface parallel to the width direction of the key-shaped part.

Further, a separation distance (L1) between the support wall of the first connecting end fixing part and the support wall of the second connecting end fixing part may satisfy conditions that LH=LH1+2LH2+2LH3 and L1=LH−LH2−LH3, where LH is an entire length of the first heating part, LH1 is a length of the heating element, LH2 is a distance between the end of one side of the heating element and the step, and LH3 is a distance between the step and an outermost end of the cylindrical part.

Further, the separation distance (L1) between the support wall of the first connecting end fixing part and the support wall of the second connecting end fixing part may satisfy a condition that L1=LH1+2LH4 where LH4 is a length of the key-shaped part.

Further, the cooking appliance may further include an outer wall disposed outside the support wall in the longitudinal direction of the heating element. A separation distance (L2) between the support wall and the outer wall may satisfy a condition that L2≥LH3.

Further, at least a part of the cylindrical part may be inserted into a space surrounded by the cover, the support wall. The outer wall, and the outer wall may be connected to the coupling part. A concave groove recessed from an upper surface of the coupling part may be formed in a connecting portion between the outer wall and the coupling part.

Further, the through-hole may be formed inside the coupling part in a planar direction. Glasses covering the through-hole are disposed at the upper portion of the heater mounting part. Seating surfaces on which the glasses are seated may be formed on the inner surface of the coupling part adjacent to the through-hole. The concave groove is preferably formed as a surface recessed downward from the seating surfaces.

Further, the cooking appliance may further include a shielding plate that is disposed at a side farther from the center of the cooking compartment in a front-rear direction than the first heating part. The shielding plate may connect the first connecting end fixing part and the second connecting end fixing part to each other.

Further, the cooking appliance may further include a protective grille disposed to be spaced apart from the shielding plate with the first heating part interposed therebetween.

Further, the protective grille may include a plurality of steel wires that extend in the longitudinal direction of the first heating part. The protective grille may include a plurality of fixing members that extend in a direction in which the plurality of steel wires are arranged and fix the plurality of steel wires. The plurality of steel wires may be arranged to surround a surrounding portion of the first heating part from an outside of the first heating part in a circumferential direction.

Further, at least one of the first connecting end fixing part and the second connecting end fixing part may further include a grille fixing part that fixes the steel wires to the heater mounting part. The grille fixing part may include a plurality of fixing ribs that are formed to protrude from the cover toward the first heating part. The plurality of steel wires may be fitted into fixing grooves formed between the plurality of fixing ribs.

Further, a through-hole may be formed inside the coupling part in a planar direction. A glass that covers the through-hole may be disposed at an upper portion of the heater mounting part.

Further, the cooking appliance may further include a shielding plate that is disposed at a side farther from the center of the cooking compartment in a front-rear direction than the first heating part and connects the first connecting end fixing part and the second connecting end fixing part to each other. The cooking appliance may further include a reflector that reflects heat of the first heating part while blocking the first heating part and the shielding plate from each other and blocking the first heating part and the glass from each other.

In addition, seating surfaces on which the glass is seated may be formed at an inner side surface of the coupling part adjacent to the through-hole. The seating surfaces may be disposed on both sides of the through-hole in a left-right direction. The coupling part may include a restricting rib that is disposed at one side of the through-hole in the front-rear direction and may restrict movement of the glass to one side in the front-rear direction and movement of the glass in an upward direction. The coupling part may include a stopper that is disposed at the other side of the through-hole in the front-rear direction and restricts movement of the glass to the other side in the front-rear direction.

The cooking appliance of the present disclosure may be configured such that the structures for allowing the first heating part to be easily and promptly installed on the door frame are provided on the door frame, and the door frame can be easily and promptly installed on the door, thereby providing an effect of allowing the first heating part to be stably installed on the door and allowing the task of installing the first heating part to be efficiently performed.

Further, according to the present disclosure, the structures for fixing the components such as the glass, the reflector, and the protective grille, in addition to the first heating part, to the door frame may be provided on the door frame, and a frame in which the components such as the first heating part, the glass, the reflector, and the protective grille can be assembled into a single unit body by the door frame is provided. Thus, an effect of allowing various components, which have to be disposed at the door, to be installed on the door easily, promptly and stably is provided.

Further, according to the present disclosure, the door frame may be coupled to the door upper surface part, and be provided to allow the components provided in the door to be protected and disassembled easily as needed. Thus, an effect of stably protecting the internal components can be provided along with an effect of allowing a maintenance task of the cooking appliance to be easily and promptly performed.

Also, since an expanded passage is provided so that a user may easily and conveniently insert or withdraw food or the tray into or from the cooking compartment and, at the same time, the tray is allowed to be automatically withdrawn or inserted when the door is opened or closed, a function of allowing the withdrawal and insertion of food or the tray to be more easily and conveniently performed may be provided.

Also, since the door is provided to be able to open both a front surface and an upper surface of a cooking compartment by rotating upward without being unfolded forward, opening of the door may be easily and smoothly performed even in a narrow space and the withdrawal of food or a tray may be more easily and conveniently performed.

Since both the front surface and the upper surface of the cooking compartment may be opened by the door and a tray part is exposed to a greater extent due to the opening of the door, an object to be cooked may be easily put in or taken out even when only a portion of the tray is withdrawn. Thus, improved convenience and stability may be provided.

Also, according to the present disclosure, since the door is provided to be opened by rotating upward without being unfolded forward, there is little concern about the center of mass of the cooking appliance being biased towards the front even when the door is opened. Accordingly, there is an advantageous effect in that the risk of the cooking appliance toppling forward is significantly lowered.

Also, according to the present disclosure, since the center of rotation of the door is formed at the rear side of the cooking appliance, the center of mass of the door is formed to be biased towards a door upper surface part than toward a door front surface part, and the center of mass of the cooking appliance is formed to be biased towards the rear side of the cooking appliance when the door is opened, there are advantageous effects in that the risk of the cooking appliance toppling forward is significantly lowered, and thus safety and convenience in use of the cooking appliance are improved.

Also, since the present disclosure provides the cooking appliance having a stable structure in which the risk of the cooking appliance toppling forward is significantly low, there is an advantageous effect in that it is possible to freely adopt a tray whose thickness and weight are increased to improve the cooking performance or a tray which is usable in an environment being heated by an induction heating part.

According to an aspect of the present disclosure, a cooking appliance comprises: a housing in which a cooking compartment is formed and whose upper and front surfaces are open, the cooking compartment being surrounded by a bottom surface, both side surfaces, and a back surface of the housing; a door that includes a door upper surface part that covers the upper surface of the housing and a door front surface part that is connected to a front side of the door upper surface part and covers the front surface of the housing, is rotated about a rear side of the door upper surface part, and opens and closes the upper and front surfaces of the housing; a first heating part disposed at the door; and a door frame that supports the first heating part and is coupled to the door.

Within the context of the present disclosure, the expression "bottom/side/back surface", may be understood as and substituted respectively by the expression "bottom/side/back wall", "bottom/side/back plate" or "bottom/side/back portion". That is, the door may be rotatable about an upper edge of the back part of the housing or about an axis parallel thereto and/or about a rear edge of the door upper surface part or about an axis parallel thereto.

The door frame may cover a lower portion of the door upper surface part and/or may be coupled with the door.

The first heating part may be installed on the door frame, and/or may be disposed at the lower portion of the door upper surface part.

The door frame may include: a heater mounting part to which the first heating part is coupled; and may include a coupling part that may be coupled with the door upper surface part and may support the heater mounting part on the door upper surface part.

The first heating part may include an electric heater having a heating element, a first connecting end disposed at an end of one side of the heating element in a longitudinal direction, and a second connecting end disposed at an end of the other side of the heating element in the longitudinal direction.

The heater mounting part may include a first connecting end fixing part that fixes the first connecting end. The heater mounting part may include a second connecting end fixing part that fixes the second connecting end.

At least one of the first connecting end fixing part and the second connecting end fixing part may include: a cover that surrounds surrounding portions of the connecting end from an outer side of the connecting end in a circumferential direction. At least one of the first connecting end fixing part and the second connecting end fixing part may include may further include a support wall which partitions a space surrounded by the cover into inner and outer spaces of the first heating part in a longitudinal direction and into which the connecting end may be fitted.

The heating element may be formed in the shape of a rod having a predetermined length.

At least one of the first connecting end and the second connecting end may include a cylindrical part that may be formed in a cylindrical shape and may be disposed at each of opposite ends of the heating element in the longitudinal direction. t least one of the first connecting end and the second connecting end may include a key-shaped part that may be disposed between the heating element and the cylindrical part. The key-shaped part may be formed in a flat hexahedral shape whose thickness is smaller than a diameter of the cylindrical part and whose width is larger than the diameter of the cylindrical part.

The support wall may include a coupling hole that may be formed to pass through the support wall. The coupling hole may be formed in a shape corresponding to a shape of an outer circumferential surface of the cylindrical part. The support wall may include a through-hole that may be formed to pass through the support wall. The through-hole may be formed as a passage that connects the coupling hole and an outer portion of the support wall to each other.

The through-hole may be formed with a width corresponding to the thickness of the key-shaped part.

At least one of the first connecting end and the second connecting end may pass through the through-hole and may be inserted into the coupling hole in a state in which the first heating part takes a first posture. The first posture may be a posture in which a surface parallel to a thickness direction of the key-shaped part is disposed parallel to a width direction of the through-hole.

The cylindrical part may further include an extension part that may be formed to extend toward the key-shaped part.

The extension part may be formed to protrude outward from a surface parallel to a width direction of the key-shaped part so that a step may be formed on the surface parallel to the width direction of the key-shaped part.

A separation distance L1 between the support wall of the first connecting end fixing part and the support wall of the second connecting end fixing part may satisfy the following relational expression:

$$LH=LH1+2LH2+2LH3$$

$$L1=LH-LH2-LH3$$

where LH is an entire length of the first heating part, LH1 is a length of the heating element, LH2 is a distance between the end of one side of the heating element and the step, and LH3 is a distance between the step and an outermost end of the cylindrical part.

The separation distance L1 between the support wall of the first connecting end fixing part and the support wall of the second connecting end fixing part may satisfy the following relational expression:

$$L1=LH1+2LH4$$

where LH4 is a length of the key-shaped part.

The cooking appliance may further comprise an outer wall disposed outside the support wall in the longitudinal direction of the heating element.

A separation distance L2 between the support wall and the outer wall satisfies the following relational expression:

$$L2 \geq LH3.$$

The cooking appliance may further comprise a shielding plate disposed at a side farther from the center of the cooking compartment in a front-rear direction than the first heating part. The shielding plate may connect the first connecting end fixing part and the second connecting end fixing part to each other.

The cooking appliance may further comprise a protective grille disposed to be spaced apart from the shielding plate with the first heating part interposed therebetween.

The protective grille may include a plurality of steel wires that may extend in the longitudinal direction of the first heating part. The protective grille may include a plurality of fixing members that may extend in a direction in which the plurality of steel wires are arranged and may fix the plurality of steel wires.

The plurality of steel wires may be arranged to surround a surrounding portion of the first heating part from an outside of the first heating part in a circumferential direction.

At least one of the first connecting end fixing part and the second connecting end fixing part may further include a grille fixing part that may fix the steel wires to the heater mounting part.

The grille fixing part may include a plurality of fixing ribs that may be formed to protrude from the cover toward the first heating part.

The plurality of steel wires may be fitted into fixing grooves formed between the plurality of fixing ribs.

DETAILED DESCRIPTION

Figure 1:
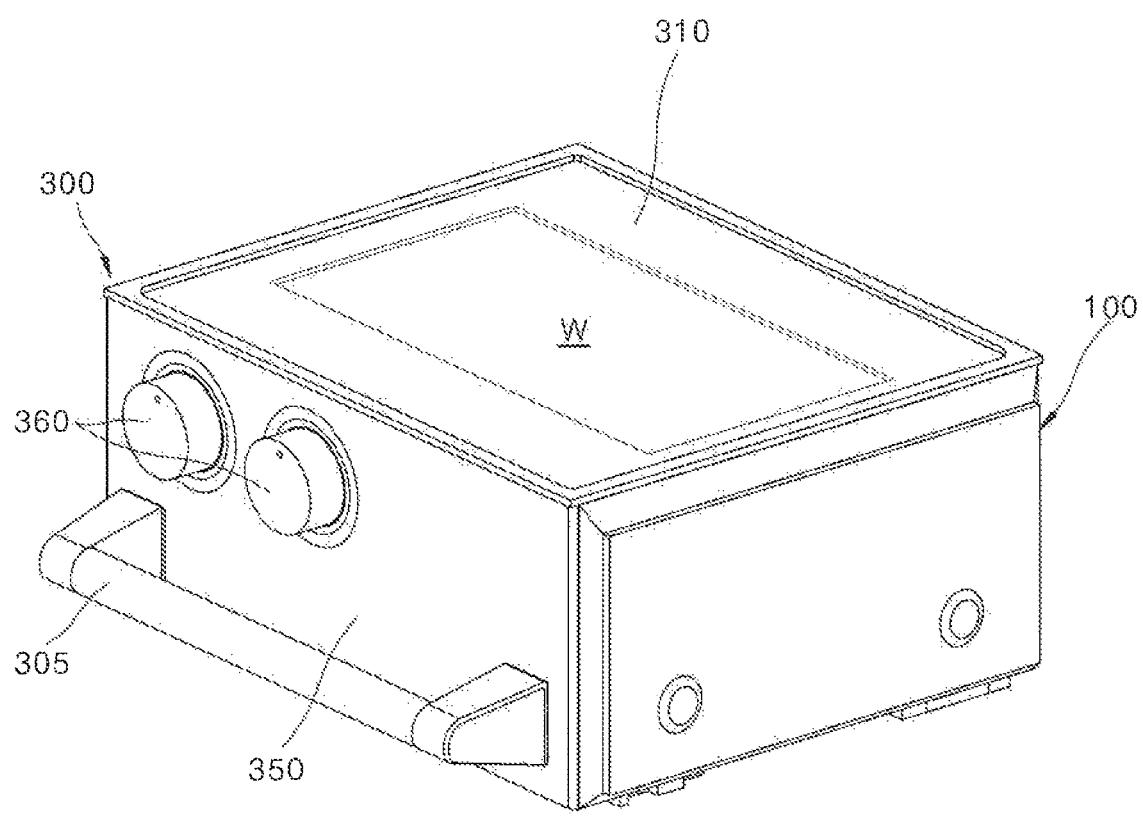
FIG. 1 is a perspective view illustrating a cooking appliance according to an embodiment of the present disclosure.

The above-mentioned aspects, features, and advantages will be described in detail with reference to the accompanying drawings, and accordingly, those of ordinary skill in the art to which the present disclosure pertains should be able to easily practice the technical idea of the present disclosure. In describing the present disclosure, when detailed description of known art related to the present disclosure is deemed as having a possibility of unnecessarily blurring the gist of the present disclosure, the detailed description may be omitted. Hereinafter, exemplary embodiments according to the present disclosure will be described in detail with reference to the accompanying drawings. Like reference numerals in the drawings may refer to like or similar elements throughout.

Terms such as first and second are used to describe various elements, but the elements are of course not limited by the terms. The terms are merely used for distinguishing one element from another element, and a first element may also be a second element unless particularly described otherwise.

Hereinafter, when it is said that an arbitrary element is disposed at "an upper portion (or a lower portion)" of an element or disposed "above (or below)" an element, this may not only mean that the arbitrary element is disposed in contact with an upper surface (or a lower surface) of the element, but also mean that another element may be interposed between the element and the arbitrary element disposed above (or below) the element.

Also, when it is said that a certain element is "connected" or "coupled" to another element, this may mean that the elements are directly connected or coupled to each other, but it should be understood that another element may be "interposed" between the elements or the elements may be "connected" or "coupled" to each other via another element.

Through the specification, each element may be singular or plural unless particularly described otherwise.

A singular expression used herein encompasses a plural expression unless the context clearly indicates otherwise. In the present disclosure, terms such as "consisting of" or "including" should not be interpreted as necessarily including all of various elements or various steps described herein and should be interpreted as indicating that some of the elements or some of the steps may not be included or additional elements or steps may be further included.

Throughout the specification, "A and/or B" may refer to A, B, or A and B unless particularly described otherwise, and "C to D" refers to C or more and D or less unless particularly described otherwise.

Figure 2:
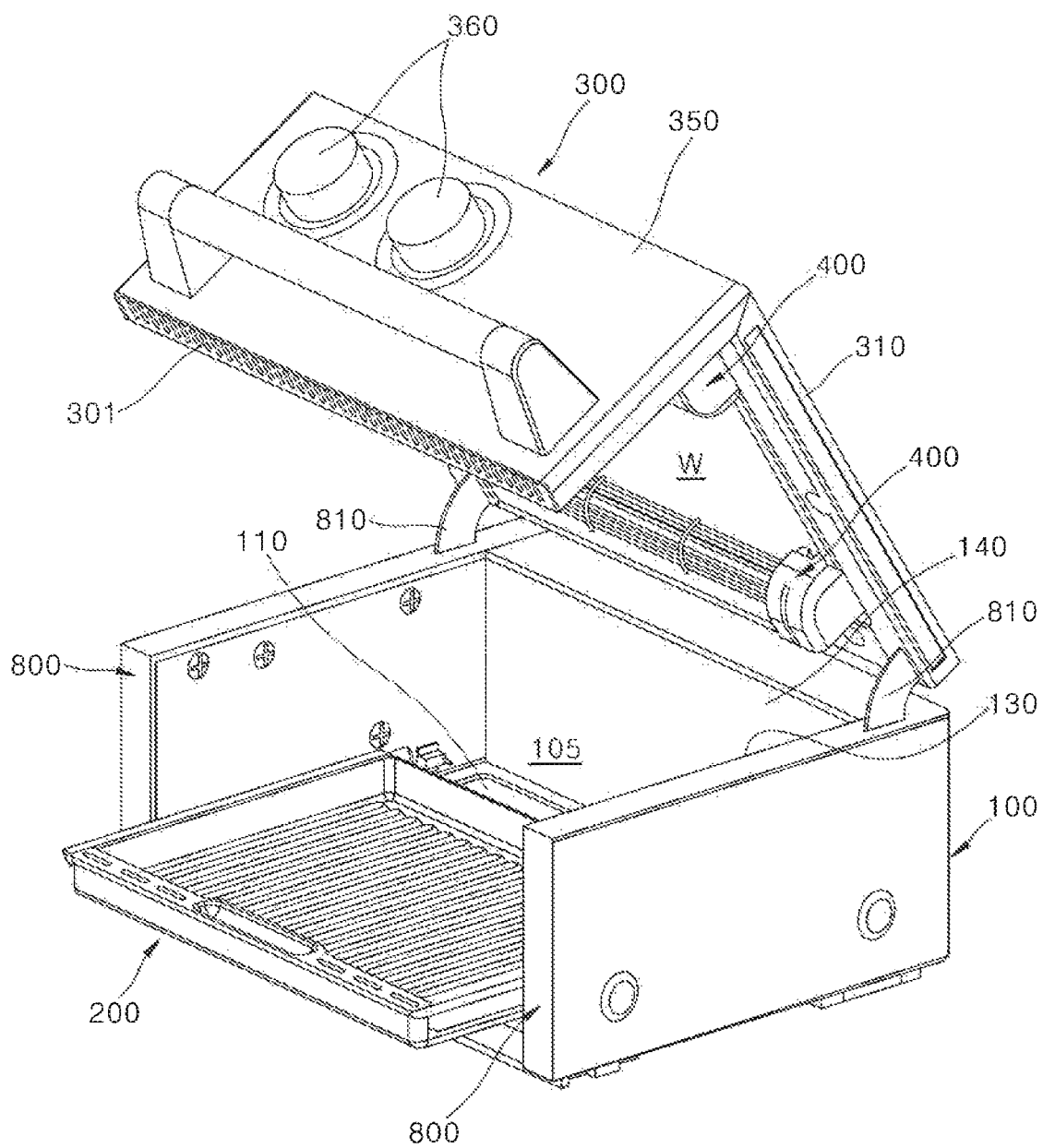
FIG. 2 is a perspective view illustrating a door-opened state of the cooking appliance illustrated in FIG. 1.
Figure 3:
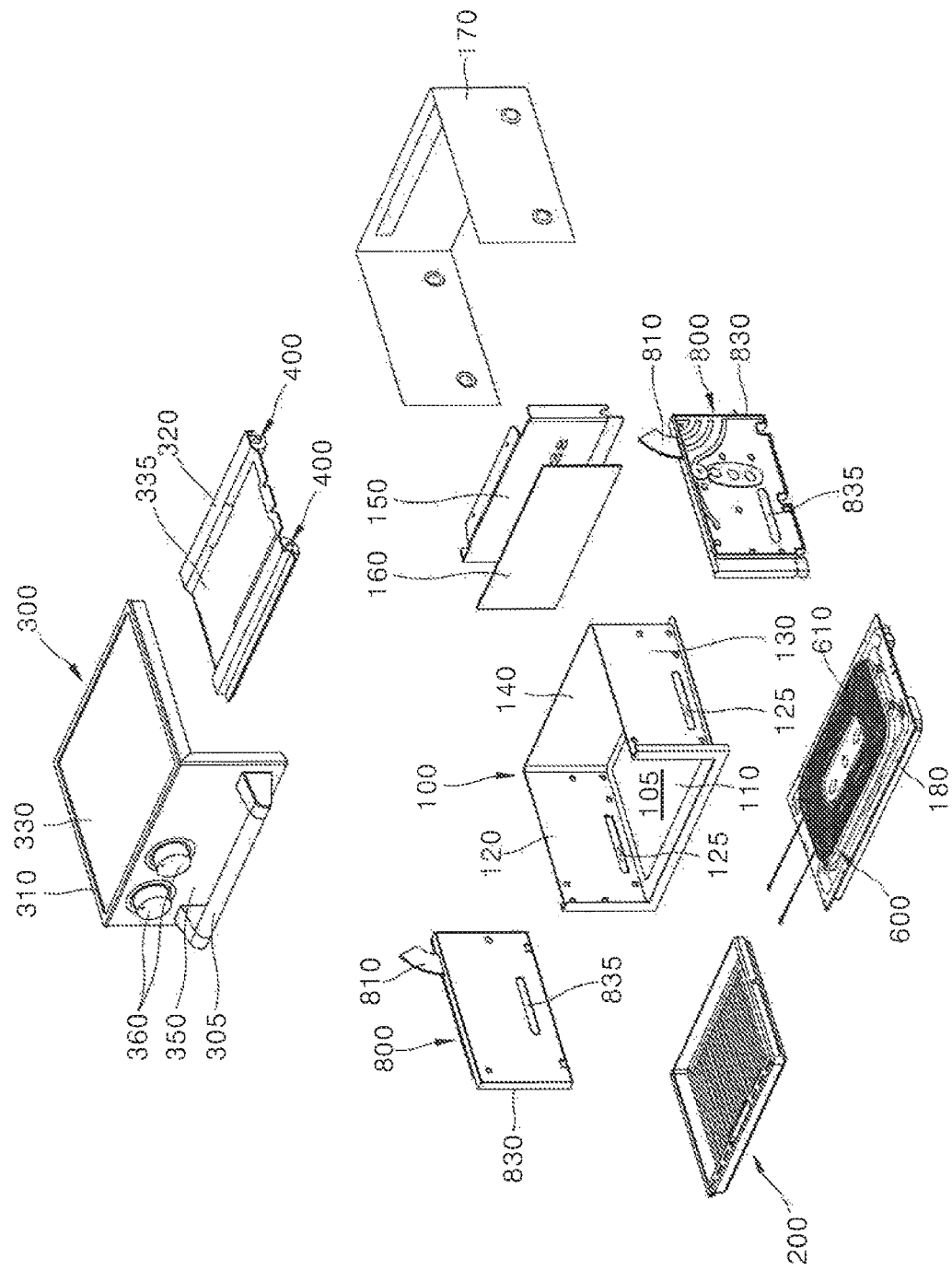
FIG. 3 is an exploded perspective view illustrating an exploded state of the cooking appliance illustrated in FIG. 1.

FIG. 1 is a perspective view illustrating a cooking appliance according to an embodiment of the present disclosure, FIG. 2 is a perspective view illustrating a door-opened state of the cooking appliance illustrated in FIG. 1, and FIG. 3 is an exploded perspective view illustrating an exploded state of the cooking appliance illustrated in FIG. 1.

Referring to FIGS. 1 to 3, the cooking appliance according to an embodiment of the present disclosure may include a housing 100, a door 300, a tray 200, and heating parts 400 and 600.

The housing 100 forms a frame of the cooking appliance according to the present embodiment. According to this, various components constituting the cooking appliance are installed in the housing 100. A cooking compartment 105 which provides a space for cooking food is formed inside the housing 100.

In the present embodiment, the housing 100 is illustrated as being formed in a hexahedral shape with open upper and front surfaces. That is, the housing 100 includes a bottom surface 110, a pair of side surfaces 120 and 130, and a back surface 140, which forms a space therein, and is provided in a form in which the upper surface and the front surface may open. The cooking compartment 105 surrounded by the bottom surface 110, both the side surfaces 120 and 130, and the back surface 140 of the housing 100 is formed inside the housing 100.

The tray 200 is disposed in the cooking compartment 105 inside the housing 100. The tray 200 is provided so that an object to be cooked is seated thereon. The tray 200 may be detachably installed inside the cooking compartment 105. Also, for convenience of a user, the tray 200 may be provided to be withdrawable from the front side of the cooking compartment 105.

The tray 200 may be installed to be movable in a front-rear direction by interlocking with an operation of opening or closing the door 300, and the movement of the tray 200 in the front-rear direction may be guided by hinge assemblies 800 which will be described below.

The door 300 is provided to open or close the open upper and front surfaces of the housing 100. In the present embodiment, the housing 100 forms an exterior of a bottom surface, side surfaces, and a back surface of the cooking appliance while the door 300 forms an exterior of an upper surface and a front surface of the cooking appliance. The door 300 may include a door upper surface part 310 and a door front surface part 350.

The door upper surface part 310 forms an upper surface of the door 300 and corresponds to an element which covers the open upper surface of the housing 100 when the door 300 closes the cooking compartment 105 inside the housing 100. Also, the door front surface part 350 forms a front surface of the door 300 and corresponds to an element which covers the open front surface of the housing 100 when the door 300 closes the cooking compartment 105.

In the present embodiment, the door 300 is illustrated as being formed in an L-shape. That is, at the door 300, the door upper surface part 310 forming the upper surface of the door 300 and the door front surface part 350 forming the front surface of the door 300 are formed in the form of being connected to each other in an L-shape. The door 300 formed in this way opens or closes the cooking compartment 105 as the door upper surface part 310 and the door front surface part 350 connected to each other in an L-shape rotate together when the door 300 rotates for opening or closing the cooking compartment 105.

The door 300 is rotatably installed at an upper portion of the housing 100 and is rotatably coupled to the housing 100 via the hinge assemblies 800 installed at the housing 100. In this case, the hinge assemblies 800 are disposed at each side portions of the housing 100, and a rear side of the door upper surface part 310 is rotatably coupled to the hinge assemblies 800.

Also, a handle 305 may be provided at the front surface of the door 300, and a user may open or close the cooking compartment 105 by holding the handle 305 and rotating the door 300 in the up-down direction.

The heating parts 400 and 600 may be installed at the housing 100 and/or the door 300 to heat the tray 200 disposed in the cooking compartment 105. In the present embodiment, the heating parts 400 and 600 are illustrated as including a first heating part 400 disposed at the door 300 and a second heating part 600 disposed in the housing 100.

The first heating part 400 is installed at the door 300 such that, when the door 300 closes the cooking compartment 105, the first heating part 400 is housed inside the cooking compartment 105. The first heating part 400 is installed at the door upper surface part 310 in such a way that the first heating part 400 is disposed at a bottom surface side of the door upper surface part 310 facing the bottom surface of the housing 100.

In the present embodiment, the first heating part 400 is illustrated as being provided in the form including an electric heater. The first heating part 400 may heat the object to be cooked which is seated on the tray 200 from an upper portion of the object.

The second heating part 600 is installed at the housing 100, and is disposed at a lower portion of the tray 200. The second heating part 600 is provided in the form of a heating part which heats the tray 200 using a different heating method from the first heating part 400, e.g., an induction heating part.

The second heating part 600 may be provided in the form including a working coil 610 installed at a lower portion of the bottom surface 110 of the housing 100 and may induce heating of the tray 200 from the lower portion of the bottom surface 110. To this end, the tray 200 may be formed of a material which may be inductively heated by the second heating part 600.

In summary, the cooking appliance according to the present embodiment includes the housing 100 in which the cooking compartment 105 is formed, the door 300 provided to be able to simultaneously open the front and the top of the cooking compartment 105, the first heating part 400 provided to be able to heat the inside of the cooking compartment 105 from the top, and the second heating part 600 provided to be able to inductively heat the tray 200 inside the cooking compartment 105, wherein the withdrawal and insertion of the tray 200 may be performed by interlocking with the operation of opening or closing the door 300.

Detailed descriptions of the above-mentioned elements and other elements not mentioned yet will be sequentially given below.

Figure 4:
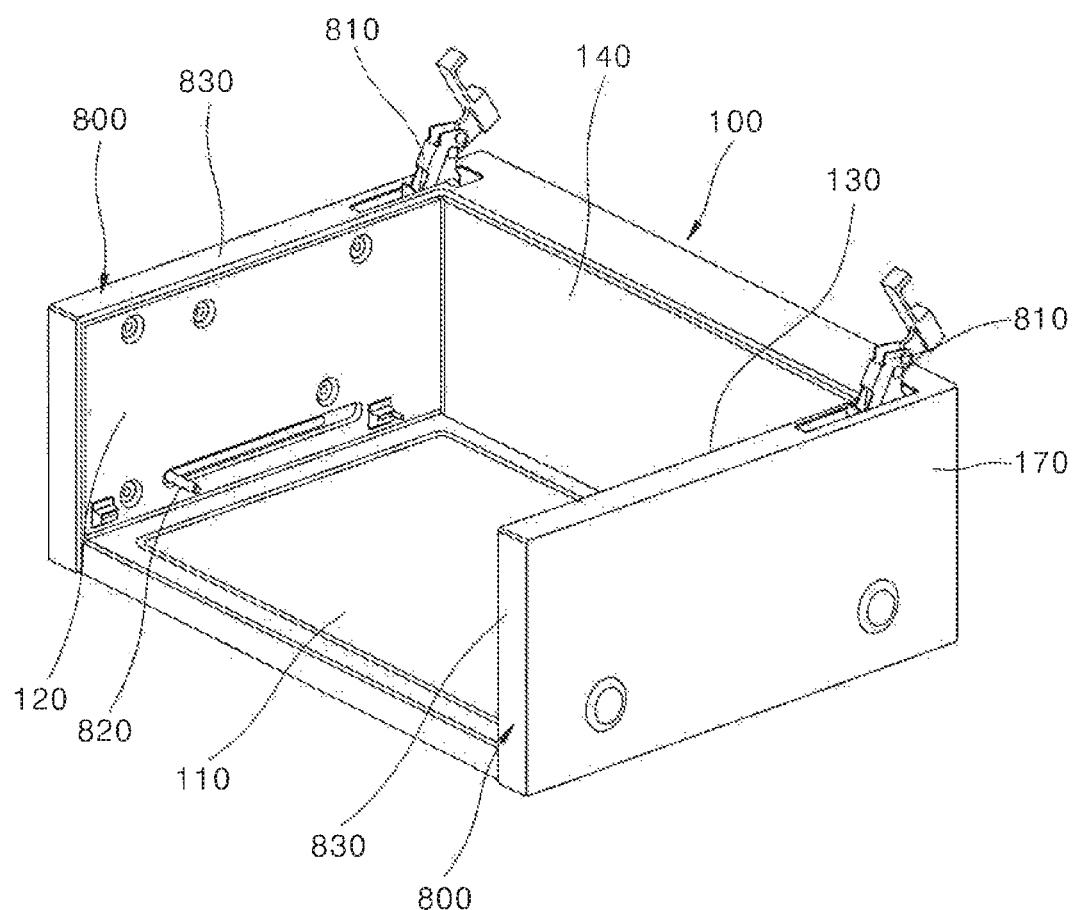
FIG. 4 is a perspective view separately illustrating a housing and hinge assemblies illustrated in FIG. 1.

FIG. 4 is a perspective view separately illustrating a housing and hinge assemblies illustrated in FIG. 1.

Referring to FIGS. 3 and 4, as described above, the housing 100 includes the bottom surface 110, the pair of side surfaces 120 and 130, and the back surface 140, which forms a space therein, and is provided in the form in which the upper surface and the front surface are open.

The cooking compartment 105 may be formed in the inner space surrounded by the bottom surface 110, both the side surfaces 120 and 130, and the back surface 140 of the housing 100, and the tray 200 may be installed in the cooking compartment 105 so as to be withdrawable therefrom.

Also, the second heating part 600 may be installed at the lower portion of the bottom surface of the housing 100, and an electronic component, e.g., a second control board 700 which will be described below, related to operation of the second heating part 600 may be installed at the rear of the back surface of the housing 100.

Further, the hinge assemblies 800 may be installed at outer sides of the side surfaces 120 and 130 of the housing 100, and the door 300 may be rotatably installed at the housing 100 by being coupled to the hinge assemblies 800 installed as above.

As one example, the housing 100 may be produced in such a form that a metal plate is bent in a U-shape and the metal plate bent in this way forms the bottom surface and both side surfaces of the housing 100. When the housing 100 is produced in this form, the bottom surface 110 of the housing 100 may be integrally connected to both side surfaces 120 and 130 of the housing 100 without a joint.

Thereby, internal aesthetic of the cooking compartment 105 may be improved, and an effect of preventing foreign materials from being jammed in gaps between the bottom surface 110 and both side surfaces 120 and 130 of the housing 100 or preventing the foreign materials from coming out through the gaps to contaminate the second heating part 600 may be obtained.

As another example, the housing 100 may be produced in such a form that a metal plate includes left and right protrusion portions forming a T-shape which are bent upward to form the bottom surface 110 and both the side surfaces 120 and 130 of the housing 100, and a rear protrusion portion is bent upward to form the back surface 140 of the housing 100. When the housing is produced in this form, the bottom surface 110, both the side surfaces 120 and 130, and the back surface 140 of the housing 100 may be integrally formed without joints between the bottom surface 110 and both the side surfaces 120 and 130 of the housing 100, and between the bottom surface 110 and the back surface 140 of the housing 100.

Thereby, when viewed from the front and the top, an inner surface of the cooking compartment 105 may maintain a smooth surface where internal joints of the cooking compartment 105 are nearly not seen. Thus, the internal aesthetic of the cooking compartment 105 may be further improved, and an effect of easily removing contaminants attached to the inner surface of the cooking compartment 105 may be additionally obtained.

Meanwhile, the bottom surface 110 of the housing 100 may include a ceramic glass. The ceramic glass may have the shape of a rectangular flat plate having a prescribed thickness.

For example, the ceramic glass may be disposed at a cut middle portion of the bottom surface 110 formed of a metal material. The ceramic glass may be disposed between the second heating part 600 and the tray 200.

Also, a back surface case 150 which houses the second control board 700 which will be described below is disposed at the rear of the back surface 140 of the housing 100. The second control board 700 is housed in the back surface case 150 and installed at the rear of the housing 100, and an insulating plate 160 is disposed between the back surface 140 of the housing 100 and the back surface case 150.

The insulating plate 160 serves to block transfer of hot air from the inside of the cooking compartment 105 to the second control board 700 via the back surface 140 of the housing 100 and insulate the housing 100 and the back surface case 150, in which the second control board 700 is installed, from each other.

Further, the housing 100 of the present embodiment may further include a cabinet 170. The cabinet 170 is provided to cover both the side surfaces 120 and 130 and the back surface 140 of the housing 100. The cabinet 170 may surround and protect the hinge assemblies 800 installed at both the side surfaces 120 and 130 of the housing 100 and the second control board 700 installed at the back surface 140 of the housing 100 from the outside and form an exterior of the side portions and the rear of the cooking appliance.

Figure 5:
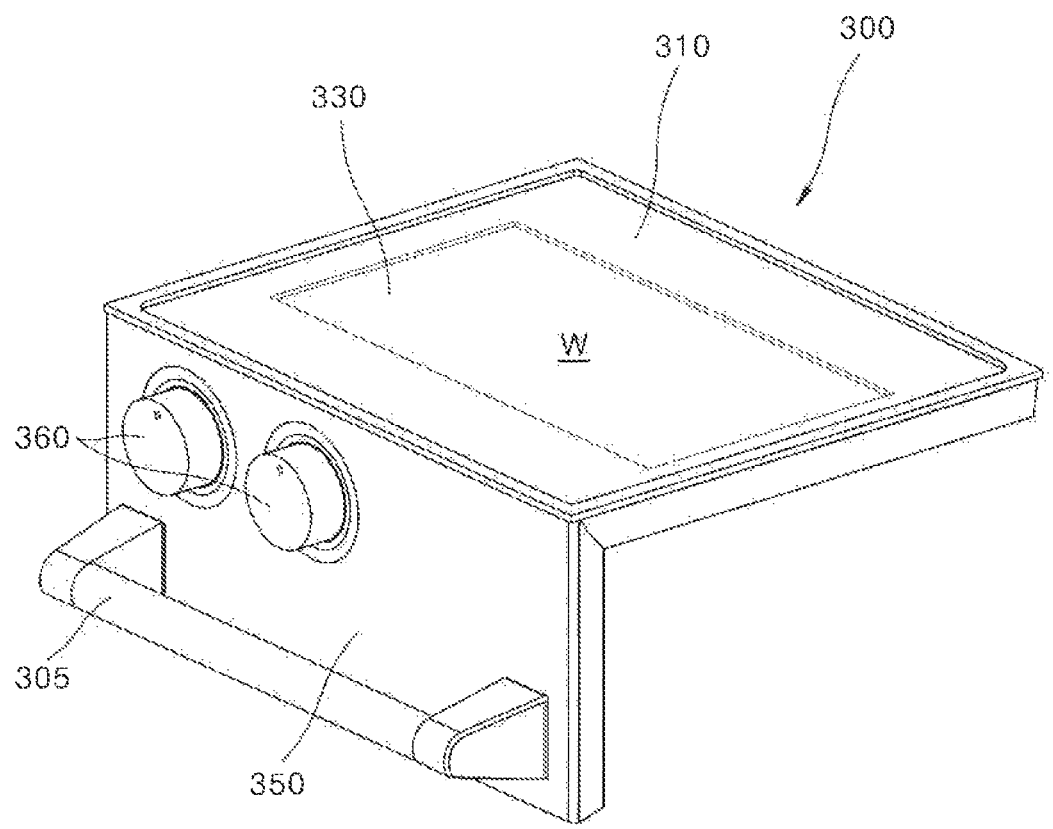
FIG. 5 is a perspective view separately illustrating a door according to an embodiment of the present disclosure.
Figure 6:
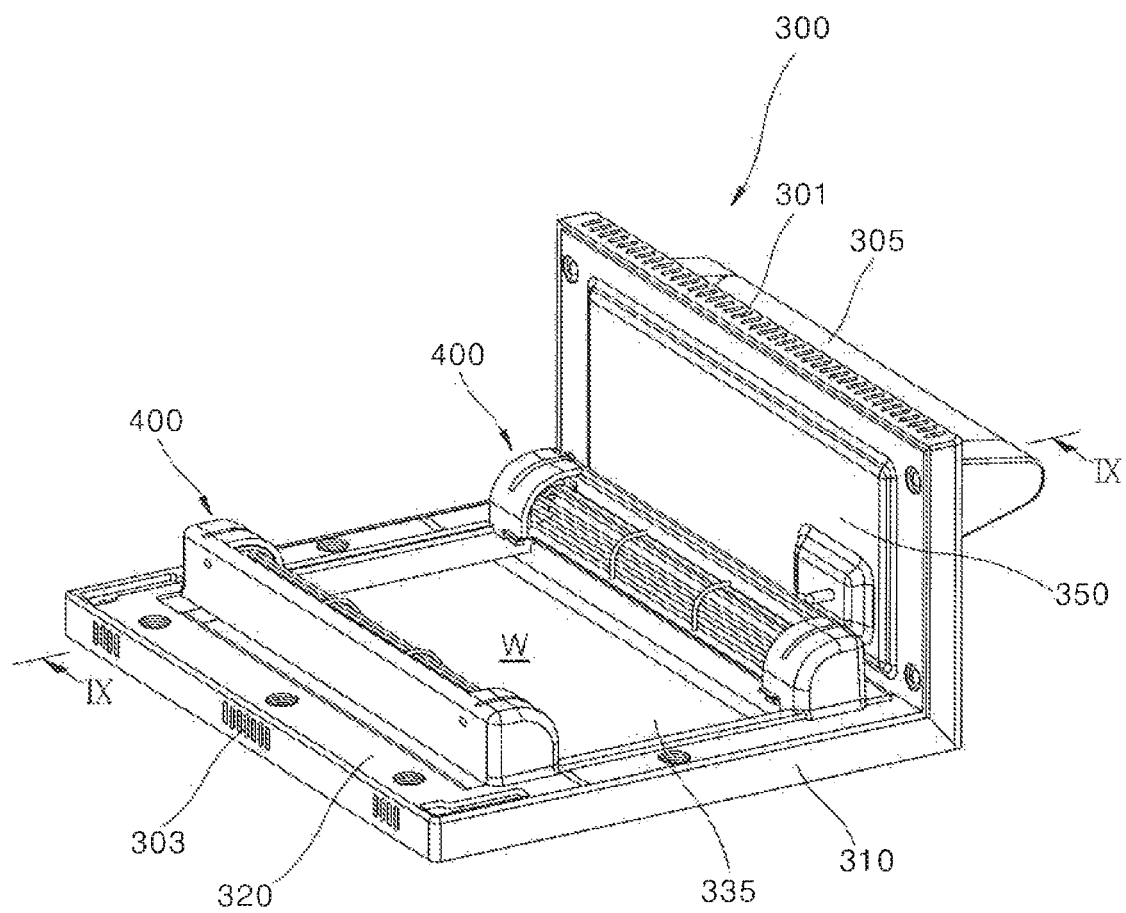
FIG. 6 is a bottom perspective view illustrating a bottom surface side of the door illustrated in FIG. 5.
Figure 7:
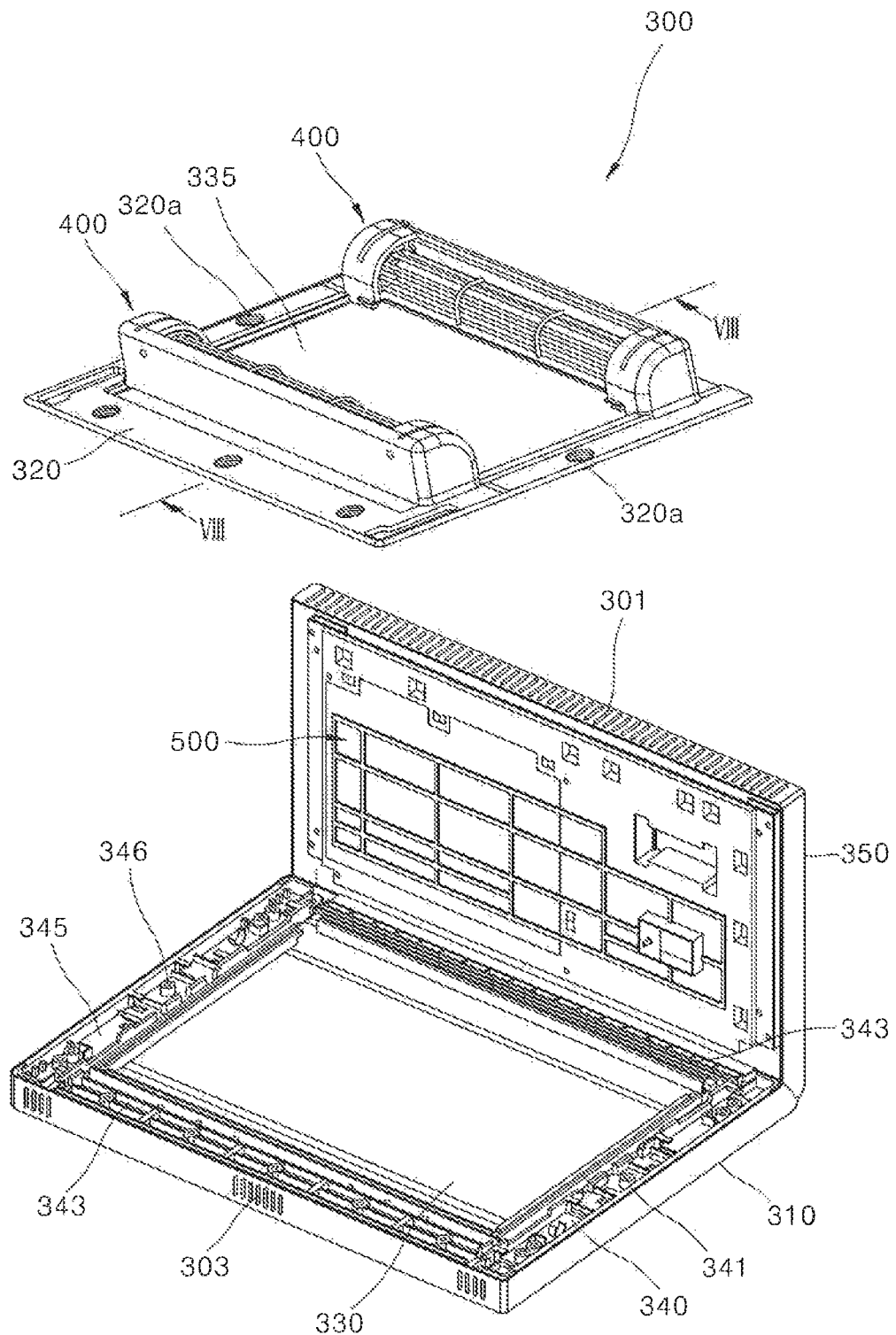
FIG. 7 is an exploded perspective view illustrating configuration of the door illustrated in FIG. 6 in an exploded manner.
Figure 8:
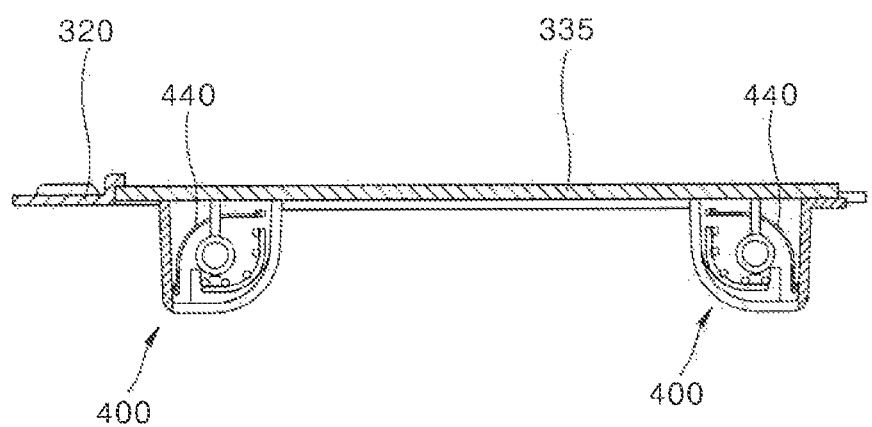
FIG. 8 is a cross-sectional view taken along line "VIII-VIII" of FIG. 7.
Figure 9:
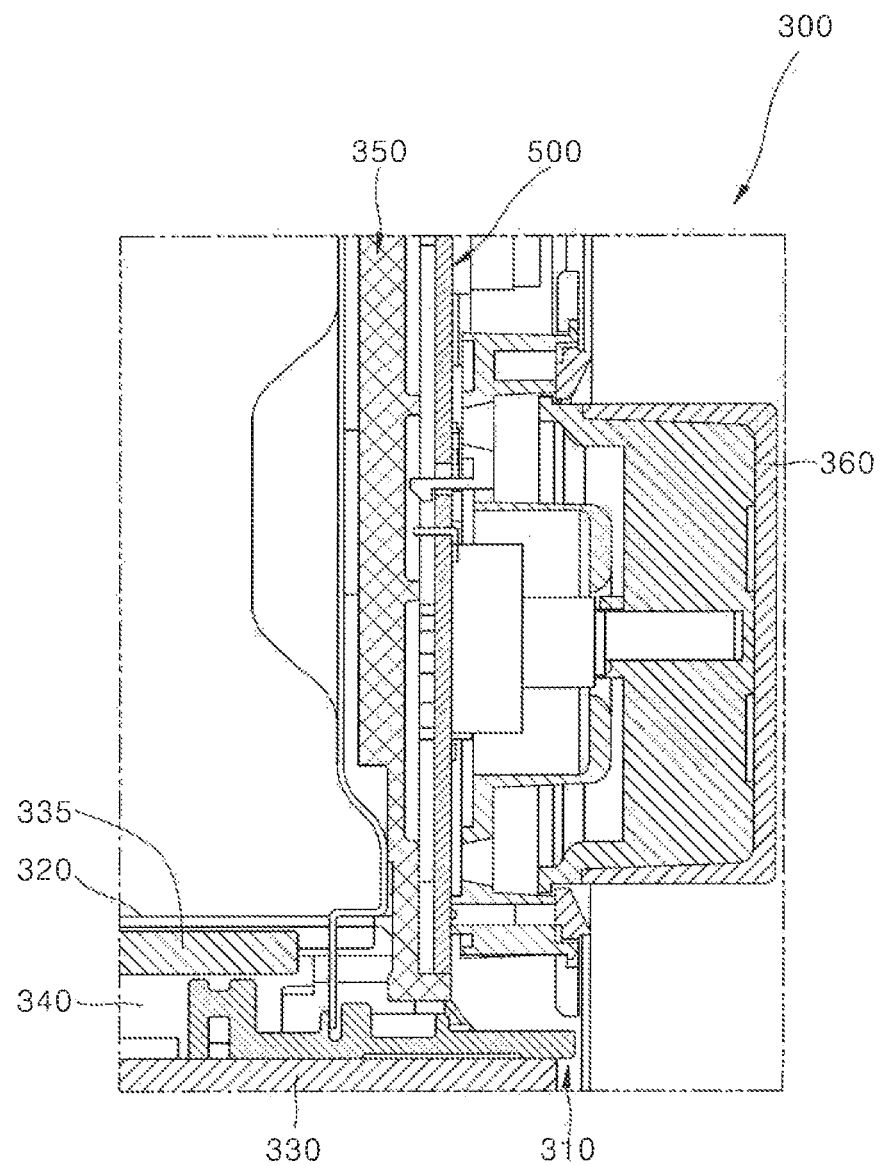
FIG. 9 is a cross-sectional view taken along line "IX-IX" of FIG. 6.
Figure 10:
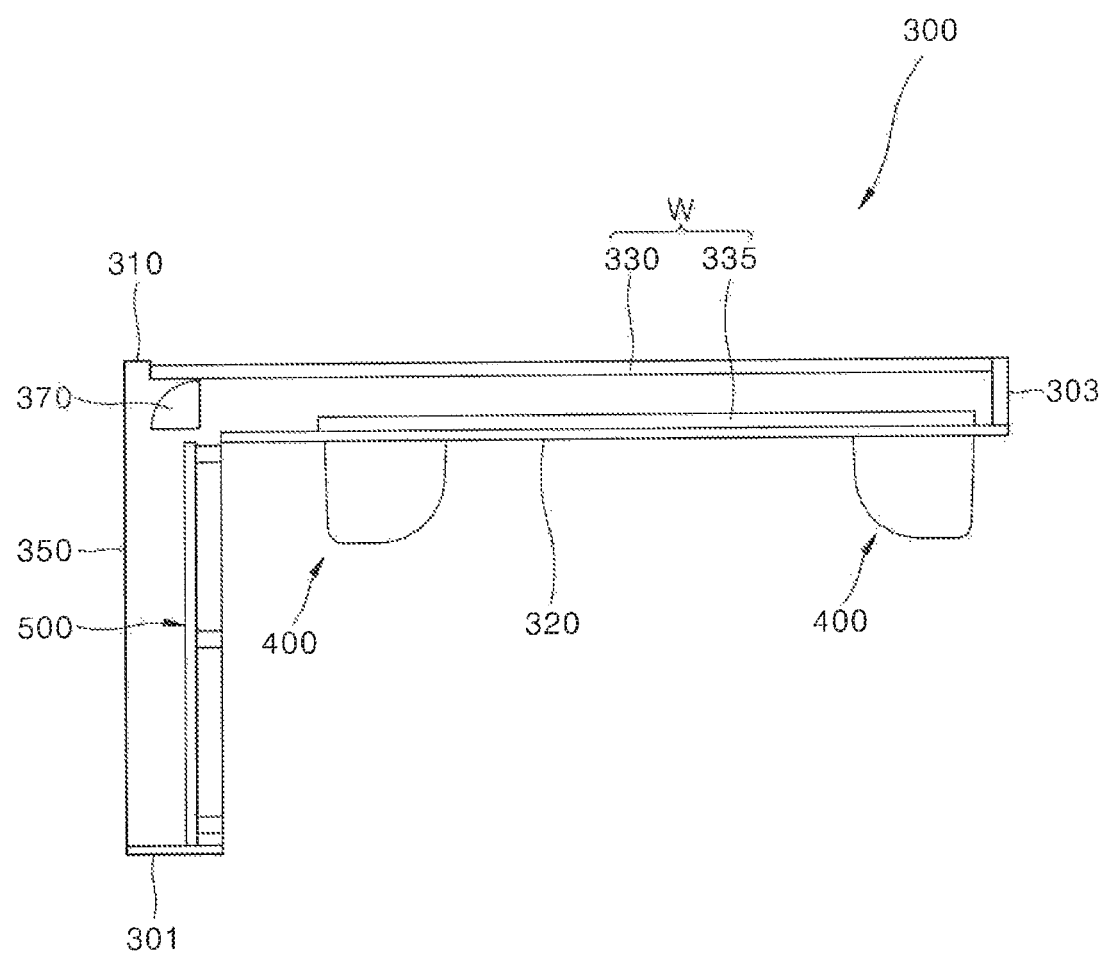
FIG. 10 is a cross-sectional view schematically illustrating a flow of air inside the door according to an embodiment of the present disclosure.

FIG. 5 is a perspective view separately illustrating a door according to an embodiment of the present disclosure, and FIG. 6 is a bottom perspective view illustrating a bottom surface side of the door illustrated in FIG. 5. Also, FIG. 7 is an exploded perspective view illustrating configuration of the door illustrated in FIG. 6 in an exploded manner, and FIG. 8 is a cross-sectional view taken along line "VIII-VIII" of FIG. 7. Also, FIG. 9 is a cross-sectional view taken along line "IX-IX" of FIG. 6, and FIG. 10 is a cross-sectional view schematically illustrating a flow of air inside the door according to an embodiment of the present disclosure.

Referring to FIGS. 5 to 9, the door 300 is provided in the form in which the door upper surface part 310 forming the upper surface of the door 300 and the door front surface part 350 forming the front surface of the door 300 are integrally connected to each other in an L-shape.

The door upper surface part 310 may be formed in a quadrilateral shape such that the door upper surface part 310 is formed in a rectangular shape in which a front-rear length is longer than a left-right length. A door frame 320 may be installed at the door upper surface part 310. The door frame 320 may be installed at a lower portion of the door upper surface part 310, and the first heating part 400 may be installed at the lower portion of the door upper surface part 310 while being coupled to the door frame 320.

The door 300 may include a see-through window W. The see-through window W may be disposed at the door upper surface part 310 such that the see-through window W is provided to be located at a central portion of the door upper surface part 310 in a planar direction.

The see-through window W may include a pair of glasses 330 and 335 which are disposed to be spaced a predetermined distance apart from each other in the up-down direction so that a space portion is formed inside the see-through window W. For example, of the glasses 330 and 335, the glass 330 (hereinafter referred to as "first glass") may be installed at the door upper surface part 310, and the other glass 335 (hereinafter referred to as "second glass") may be installed at the door frame 320.

A through-hole may be formed in each of the door upper surface part 310 and the door frame 320. The through-holes may be formed at the center of the door upper surface part 310 in the planar direction and at the center of the door frame 320 in the planar direction, respectively.

According to the present embodiment, the first glass 330 is installed in the door upper surface part 310 in such a way that the through-hole formed in the door upper surface part 310 is covered by the first glass 330 from the top, and the second glass 335 is installed in the door frame 320 in such a way that the through-hole formed in the door frame 320 is covered by the second glass 335 from the top.

The first glass 330 and the second glass 335 may be formed of glass formed of a transparent or translucent material. The see-through window W may be formed at portions of the through-holes covered by the first glass 330 and the second glass 335.

The user may view the inside of the cooking compartment 105 from the top through the see-through window W formed as above, and in this way, a cooking state of food inside the cooking compartment 105 may be checked. Due to characteristics of a mini oven, the cooking appliance of the present embodiment is often used at a point which is significantly lower than the user's face. Therefore, the see-through window W formed at the upper surface of the door 300 may be provided as a means that allows the user to easily and conveniently check the cooking state of food without lowering their posture or bending their waist forward.

Further, the pair of glasses 330 and 335 forming the see-through window W are coupled to different elements, that is, one is coupled to the door upper surface part 310 and the other is coupled to the door frame 320, and are disposed to be spaced a predetermined distance apart from each other. Accordingly, a separation space between the two glasses 330 and 335 is formed inside the see-through window W.

An air layer formed in the separation space formed in this way serves to block transfer of heat, which has heated the second glass 335 directly exposed to the cooking compartment 105, to the first glass 330 disposed at the door upper surface part 310.

In this way, the see-through window W provided in the double-window structure as described above has a function of preventing, to a significant level, the occurrence of safety accidents caused by the overheating of the see-through window W, the occurrence of steaming up of the see-through window W due to a temperature rise of the see-through window W, and the like.

Meanwhile, the first heating part 400 is installed at the door upper surface part 310 in such a way that the first heating part 400 is disposed in a region not exposed through the see-through window W when viewed from the top. The first heating part 400 is disposed at a front outer side and a rear outer side of the see-through window W on a plane in a horizontal direction corresponding to the door upper surface part 310. In other words, the first heating part 400 may be disposed at outer sides of the through-holes formed in the door upper surface part 310 and the door frame 320. That is, the cooking appliance of the present embodiment may include a pair of first heating parts 400 disposed at the front outer side and the rear outer side of the see-through window W.

When the first heating part 400 is disposed in a region exposed through the see-through window W, it is aesthetically not desirable. Also a problem may occur in securing the field of view through the see-through window W, and a problem in that a temperature of a portion of the see-through window W rises may also occur.

Also, in consideration of the shape of the door front surface part 350 having a rectangular shape in which a front-rear length is longer than a left-right length, the first heating part 400 should be disposed at the front outer side and the rear outer side of the see-through window W for a length of the first heating part 400 to be increased accordingly, and improvement in thermal power of the first heating part 400 may be expected in proportion to the increase in the length of the first heating part 400.

In consideration of such aspects, the first heating part 400 is disposed at each of the front outer side and the rear outer side of the see-through window W. In this way, it may be advantageous to secure functional advantages such as maintaining aesthetics, maintaining a secured field of view, suppressing a temperature rise of the see-through window W, and improving the thermal power of the first heating part 400.

The door front surface part 350 may be formed in a rectangular shape like the door upper surface part 310. However, when the door upper surface part 310 forms a plane in the horizontal direction, the door front surface part 350 forms a plane in a vertical direction.

For example, the door front surface part 350 may be formed extending downward from a front end portion of the door upper surface part 310. Also, the door front surface part 350 and the door upper surface part 310 may be connected in the form in which an inner space of the door front surface part 350 and an inner space of the door upper surface part 310 are connected to each other. That is, the door 300 may be provided in the form in which the door front surface part 350 and the door upper surface part 310, whose inner spaces are connected to each other, are integrally connected in an L-shape.

An input part 360 and a first control board 500 may be disposed in the door front surface part 350. In the present embodiment, a space portion is illustrated as being formed inside the door front surface part 350 (see FIG. 9). In the space portion, at least a portion of the input part 360 and the first control board 500 may be housed.

The input part 360 may include various manipulation switches for controlling and manipulating operation of the cooking appliance according to the present embodiment. For example, the input part 360 may include a manipulation switch for controlling on/off states or thermal power of the first heating part 400, a manipulation switch for controlling on/off states or thermal power of the second heating part 600, a timer manipulation switch for controlling operation time of the first heating part 400 or the second heating part 600 (see FIG. 3), and the like. The input part 360 may be provided to be exposed at the front surface of the door front surface part 350, and the user may directly manipulate the input part 360 to control operation of the cooking appliance.

The first control board 500 is installed inside the door front surface part 350. Various elements and circuits related to reception of manipulation signals input via the input part 360, generation of control signals for controlling operations of the first heating part 400 and the second heating part 600, and the like are provided in the first control board 500.

The first control board 500 may be electrically connected to the input part 360, the first heating part 400, and the second heating part 600. The first control board 500 is disposed in the door front surface part 350 like the input part 360 and may be disposed at a position very close to the input part 360. The first control board 500 may be disposed at a position which is also very close to the first heating part 400 disposed on the door 300.

According to the present embodiment, the input part 360 may be electrically connected to the first control board 500 in the form of being directly mounted on the first control board 500, and the first heating part 400 may be electrically connected to the input part 360 and the first control board 500 via a cable installed through the inside of the door front surface part 350 and the inside of the door upper surface part 310 which are connected to each other.

That is, since the first control board 500, the input part 360, and the first heating part 400 which have to be electrically connected to one another are disposed at positions very close and spatially connected to one another, not only is it possible to easily and promptly perform a task for electrically connecting the first control board 500, the input part 360, and the first heating part 400, but also it is possible to maintain a connection structure thereof in a very stable state.

Also, the cooking appliance of the present embodiment may further include cable mounting parts 340 and 345. The cable mounting parts 340 and 345 are disposed between the door upper surface part 310 and the door frame 320, which are disposed in the up-down direction, in such a way that the cable mounting parts 340 and 345 are disposed at both outer sides of the see-through window W.

Further, a connecting member 341 is disposed at each of the front outer side and the rear outer side of the see-through window W. The pair of connecting members 341 connect the pair of cable mounting parts 340 and 345 spaced apart from each other. That is, the pair of cable mounting parts 340 and 345 and the pair of connecting members 341 may be provided in a square shape surrounding the see-through window W from the outside.

An assembly of the cable mounting parts 340 and 345 and the connecting members 341 provided as above is installed in the door upper surface part 310 in the form of being inserted into the space portion formed between the door upper surface part 310 and the door frame 320.

The inside of the door upper surface part 310 in which the cable mounting parts 340 and 345 are installed as described above is connected to the inside of the door front surface part 350. Also, cables which connect the first control board 500 and the first heating part 400 through the inside of the door upper surface part 310 and the inside of the door front surface part 350, which are connected to each other, are installed at the cable mounting parts 340 and 345 installed in the door upper surface part 310.

A power cable which supplies power to the first heating part 400 and the first control board 500 may be installed at any one of the cable mounting parts 340 and 345 disposed at both outer sides of the see-through window W. Also, a signal cable which transmits a control signal generated in the first control board 500 to the first heating part 400 may be installed at the other one of the cable mounting parts 340 and 345 disposed at both outer sides of the see-through window W.

That is, in the door 300, the first heating part 400 is disposed at both sides of the see-through window W in the front-rear direction, and the power cable and the signal cable are disposed at both sides of the see-through window W in the left-right direction.

The arrangement structure of the first heating part 400, the power cable, and the signal cable is a result of designing in consideration of the arrangement structure of the first heating part 400 and the hinge assembly 800.

According to the present embodiment, each first heating part 400 is disposed in the form in which a heating element thereof extends longitudinally in the left-right direction. Also, the hinge assembly 800 (see FIG. 2) is disposed at both sides of the see-through window W in the left-right direction.

Figure 30:
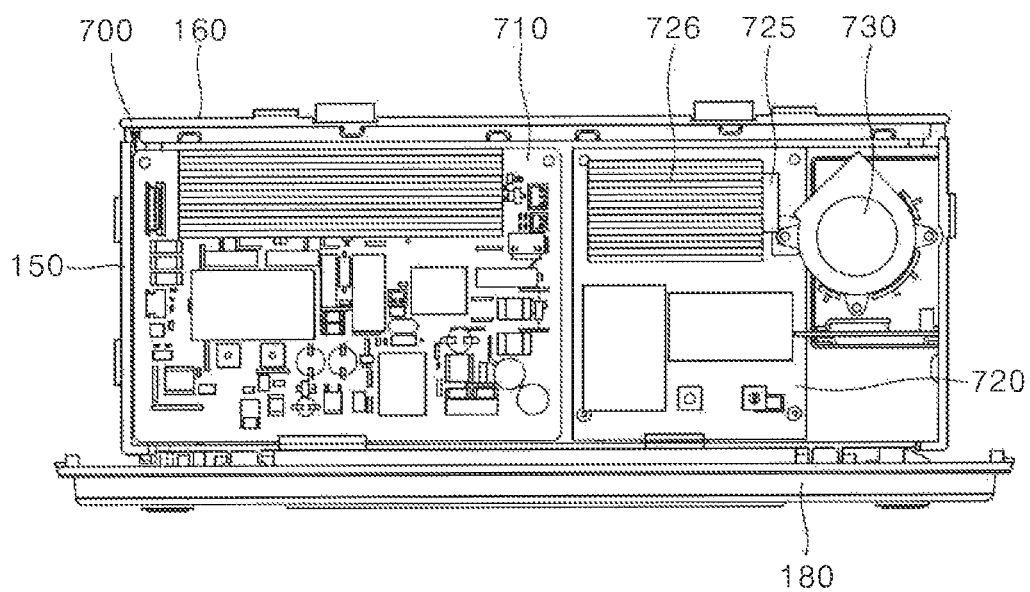
FIG. 30 is a rear view illustrating a second control board illustrated in FIG. 26.

The power cable and the signal cable are not only connected to the elements disposed in the door 300 such as the first heating part 400 and the first control board 500, but also connected to the elements disposed in the housing 100 such as the second control board 700 (see FIG. 30).

In order to pass through a portion between the door 300 and the housing 100 with the least possible exposure to the outside, the power cable and the signal cable may pass through the portion in which the hinge assembly 800 is disposed, which is a connecting portion between the door 300 and the housing 100.

For example, sections of the power cable and the signal cable connecting the housing 100 and the door 300 to each other may be disposed in the form of passing through the inside of the hinge assembly 800. In this way, exposure of the power cable and the signal cable to the outside of the cooking appliance may be suppressed in a section between the housing 100 and the door 300, and the power cable and the signal cable may be protected from the risk of damage.

Further, considering that the heating element of the first heating part 400 extends longitudinally in the left-right direction, the power cable and the signal cable may be disposed at the farthest possible side from the heating element and disposed to extend in a direction different from a direction in which the heating element extends.

This is a result of designing to avoid an influence of heat generated in the first heating part 400 on the power cable and the signal cable. Also, considering that a plurality of first heating parts 400 are disposed to be spaced apart from each other in the front-rear direction, a structure in which the power cable and the signal cable are disposed at both sides of the first heating parts 400 in the left and right direction may be advantageous for connecting the first heating parts 400 using the power cable and the signal cable.

Also, in the present embodiment, the power cable and the signal cable may be disposed to be spaced apart from each other in the left-right direction with the see-through window W disposed therebetween and may be installed at the cable mounting parts 340 and 345 different from each other.

In this case, the power cable passes through the inside of any one of the hinge assemblies 800 disposed at both side surfaces of the housing 100 and is installed at the cable mounting parts 340 and 345 adjacent thereto. Also, the signal cable passes through the inside of the other one of the hinge assemblies 800 disposed at both side surfaces of the housing 100 and is installed at the cable mounting parts 340 and 345 adjacent thereto.

For example, the power cable may pass through the inside of the hinge assembly 800 disposed at the left side of the housing 100 and be installed at the cable mounting parts 340 and 345 disposed at the left side of the door 300. Also, the signal cable may pass through the inside of the hinge assembly 800 disposed at the right side of the housing 100 and be installed at the cable mounting parts 340 and 345 disposed at the right side of the door 300.

Through the structure in which the cables having different functions are disposed at different positions, a wiring task for electrically connecting the components constituting the cooking appliance may be more easily and promptly performed, and maintenance and repair tasks related thereto may also be easily performed.

FIG. 10 is a cross-sectional view schematically illustrating a flow of air inside the door according to an embodiment of the present disclosure.

Referring to FIG. 10, a space portion is formed inside each of the door upper surface part 310 and the door front surface part 350. Particularly, a space portion is formed between the pair of glasses 330 and 335, which are disposed to be spaced a predetermined distance apart from each other in the up-down direction, inside the see-through window W installed in the door upper surface part 310. Also, the space portion inside the door upper surface part 310 including the see-through window W and the space portion inside the door front surface part 350 are connected to each other.

An air intake port 301 is formed at a lower end of the door front surface part 350. The air intake port 301 is formed to pass through the lower end of the door front surface part 350 and forms a passage which opens the space portion inside the door front surface part 350 to the outside on the door front surface part 350.

An air exhaust port 303 is formed at a rear end of the door upper surface part 310. The air exhaust port 303 is formed to pass through the rear end of the door upper surface part 310 and forms a passage which opens the space portion inside the door upper surface part 310 to the outside on the door upper surface part 310.

Further, the cooking appliance of the present embodiment may further include a first cooling fan 370 disposed inside the door 300. The first cooling fan 370 may be installed inside the door upper surface part 310 or inside the door front surface part 350. In the present embodiment, the first cooling fan 370 is illustrated as being installed in the space portion inside the door front surface part 350. This is a design considering that, since the see-through window W, the first heating part 400, and the like are installed in the door upper surface part 310, an available space in the door upper surface part 310 may be limited.

The first cooling fan 370 provided as above generates a flow of air which causes outside air to be introduced into the door 300 via the air intake port 301 and causes air inside the door to be discharged via the air exhaust port 303.

By the flow of air generated by the first cooling fan 370 as above, the outside air is introduced into the door front surface part 350 via the air intake port 301, and the outside air introduced into the door front surface part 350 cools the first control board 500. Also, the air which has cooled the first control board 500 is introduced into the door upper surface part 310, passes through the space portion inside the see-through window W, and then is discharged to the outside of the door 300 via the air exhaust port 303.

During operation of the cooking appliance, the temperature of the first control board 500 is at a level significantly lower than the temperature of the see-through window W heated by the first heating part 400. Therefore, the air which has cooled the first control board 500 after being introduced into the door 300 via the air intake port 301 may pass through the inside of the see-through window W while the temperature of the air is sufficiently low for cooling the see-through window W. Therefore, the cooling of the first control board 500 and the cooling of the see-through window W may be sufficiently efficiently performed by the flow of air generated by the first cooling fan 370.

By the cooling structure inside the door 300 formed as above, the occurrence of overheating and deterioration of the components inside the door 300 such as the first control board 500 is suppressed. In this way, the occurrence of breakdown of the cooking appliance, deterioration of performance of the cooking appliance, etc., may be effectively suppressed.

Also, since the cooling air passing through the inside of the door 300 blocks heat transfer between the pair of glasses 330 and 335 constituting the see-through window W and suppresses the occurrence of overheating of the see-through window W, the occurrence of accidents in which the user suffers an injury such as a burn due to coming into contact with the see-through window W may be effectively reduced.

Figure 11:
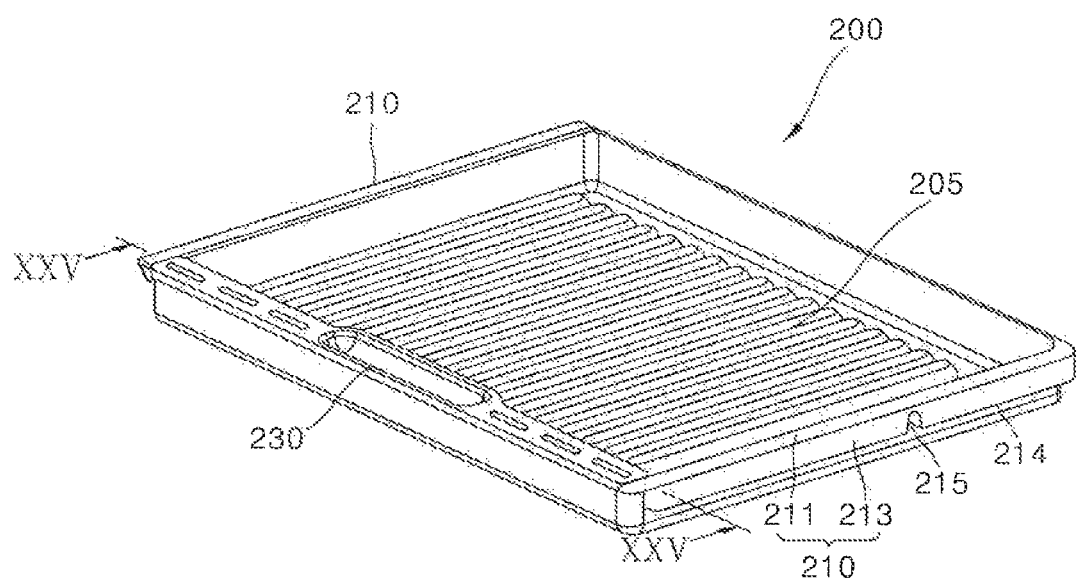
FIG. 11 is a perspective view illustrating a tray according to an embodiment of the present disclosure.
Figure 12:
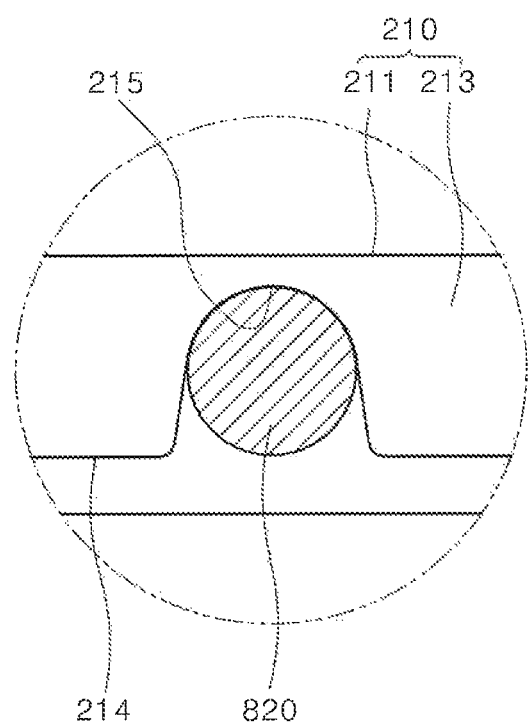
FIG. 12 is a cross-sectional view schematically illustrating a coupling structure between the tray illustrated in FIG. 11 and a mounting protrusion.

FIG. 11 is a perspective view illustrating a tray according to an embodiment of the present disclosure, and FIG. 12 is a cross-sectional view schematically illustrating a coupling structure between the tray illustrated in FIG. 11 and a mounting protrusion.

Referring to FIGS. 2 and 3 and FIGS. 11 and 12, the tray 200 is disposed in the cooking compartment 105 formed inside the housing 100. The tray 200 may be installed to be movable in the front-rear direction by interlocking with an operation of opening or closing the door 300, and the movement of the tray 200 in the front-rear direction may be guided by the hinge assembly 800.

The tray 200 may include a tray main body 205 and a mounting part 210.

The tray main body 205 has a bottom surface formed in a shape corresponding to the bottom surface 110 of the housing 100. In the present embodiment, the tray main body 205 is illustrated as being formed in the shape of a box which has an open upper portion and is flat in the up-down direction. The bottom surface of the tray main body 205 is formed in a shape corresponding to the bottom surface 110 of the housing 100, e.g., the shape of a quadrilateral plate, and four side surfaces of the tray 200 are formed in the form of extending in upward from edges of the bottom surface of the tray 200.

The mounting part 210 is provided at each side surfaces facing both side surfaces of the housing 100 in the left-right direction among the four side surfaces of the tray 200. The mounting part 210 may include a first protrusion 211 protruding toward the outside of the tray 200 from an upper end portion of the side surface of the tray 200 and a second protrusion 213 extending downward from an outer end portion of the first protrusion 211. For example, the mounting part 210 may be formed in which the first protrusion 211 and the second protrusion 213 are connected to each other in an L-shape.

The hinge assemblies 800 interlock with the rotation of the door 300 and cause the tray 200 to be withdrawn forward from the inside of the cooking compartment 105 when the door is opened. Also, the hinge assemblies 800 may interlock with the rotation of the door 300 and cause the tray 200 to be inserted inward towards the inside of the cooking compartment 105 when the door is closed. The hinge assemblies 800 may be installed at both sides of the housing 100 in the left-right direction so that the hinge assemblies 800 are disposed at both outer sides of the tray 200 in the left-right direction. Also, each of the hinge assemblies 800 may include a hinge part 810 and a mounting protrusion 820.

The hinge part 810 is provided to be hinge-coupled to the rear side of the door upper surface part 310. A state of the hinge part 810 may be changed by the hinge part 810 interlocking with rotation of the door 300.

The mounting protrusion 820 is connected to one of the connecting members of the hinge part 810 inside the hinge case 830 and protrudes toward the inside of the cooking compartment 105 via the first slot 835 formed in the hinge case 830 and a second slot 125 formed in the housing 100 (see FIG. 3). Here, the second slot 125 may be formed in a side surface of the housing 100 and formed with a shape overlapping the first slot 835 and at a position overlapping the first slot 835.

The tray 200 may be mounted on the mounting protrusion 820. Specifically, the tray 200 may be mounted on the mounting protrusion 820 by the mounting protrusion 820 being fitted to the mounting groove 215 formed in the side portion of the tray 200 (see FIG. 12).

According to the present embodiment, the mounting groove 215 is formed in the mounting part 210 provided at each side surfaces of the tray 200. The mounting groove 215 may be formed in which a groove is cut out from the mounting part 210, more specifically, from the lower end of the second protrusion 213. The mounting protrusion 820 may be fitted into the mounting groove 215, and the tray 200 and the mounting protrusion 820 may be fitted and coupled to each other by the mounting groove 215.

Further, a sliding surface 214 may be formed at the mounting part 210, more specifically, at the lower end of the second protrusion 213. The sliding surface 214 is provided to allow sliding of the mounting protrusion 820 coming into contact with the lower end of the second protrusion 213. The sliding surface 214 may extend in the front-rear direction and be connected to the mounting groove 215.

The user may perform cooking using the cooking appliance while the tray 200 is installed inside the cooking compartment 105 or take the tray 200 out of the cooking compartment 105 in order to take out the cooked food or wash the tray 200.

When taking the tray 200 out of the cooking compartment 105, the tray 200 may be taken out after slightly lifting the tray 200 upward so that the mounting protrusion 820 may disengage with the mounting groove 215.

Also, when attempting to install the withdrawn tray 200 back into the cooking compartment 105, the tray 200 may be pushed to the inside of the cooking compartment 105 so that the mounting protrusion 820 is engaged with the mounting groove 215.

However, since the mounting groove 215 is disposed at the lower portion of the tray 200 and the mounting protrusion 820 is covered by the tray 200, it is difficult for the user to accurately see the positions of the mounting groove 215 and the mounting protrusion 820.

In consideration of such an aspect, in the present embodiment, the sliding surface 214 is formed at the lower end of the second protrusion 213 so as to extend in the front-rear direction, and the sliding surface 214 is connected to the mounting groove 215.

Accordingly, when pushing the tray 200 back into the cooking compartment 105, the user does not have to accurately fit the mounting protrusion 820 into the mounting groove 215 from the beginning. The user just has to push the tray 200 into the cooking compartment 105 so that the sliding surface 214 is placed on the mounting protrusion 820 and then move the tray 200 in the front-rear direction until the mounting protrusion 820 engages with the mounting groove 215.

In this process, the mounting protrusion 820 may slide on the sliding surface 214 due to the tray 200 moving in the front-rear direction and then be engaged with the mounting groove 215.

That is, the mounting protrusion 820 does not have to be accurately fitted to the mounting groove 215 for installing the tray 200 back into the cooking compartment 105. Simply by placing the tray 200 on the mounting protrusion 820 and then moving the tray 200 in the front-rear direction, the mounting protrusion 820 and the mounting groove 215 may be fitted and coupled to each other and, in this way, fitting and coupling the mounting protrusion 820 and the tray 200 to each other may be easily and promptly performed.

The above-described structure for fitting and coupling the mounting groove 215 and the mounting protrusion 820 to each other is merely an example, and various other modifications may be possible.

Figure 13:
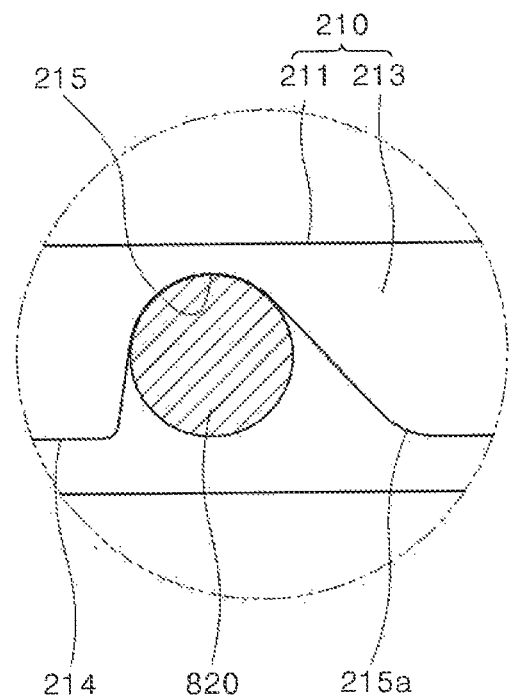
FIG. 13 is a cross-sectional view schematically illustrating a coupling structure between the tray and the mounting protrusion according to another embodiment of the present disclosure.
Figure 14:
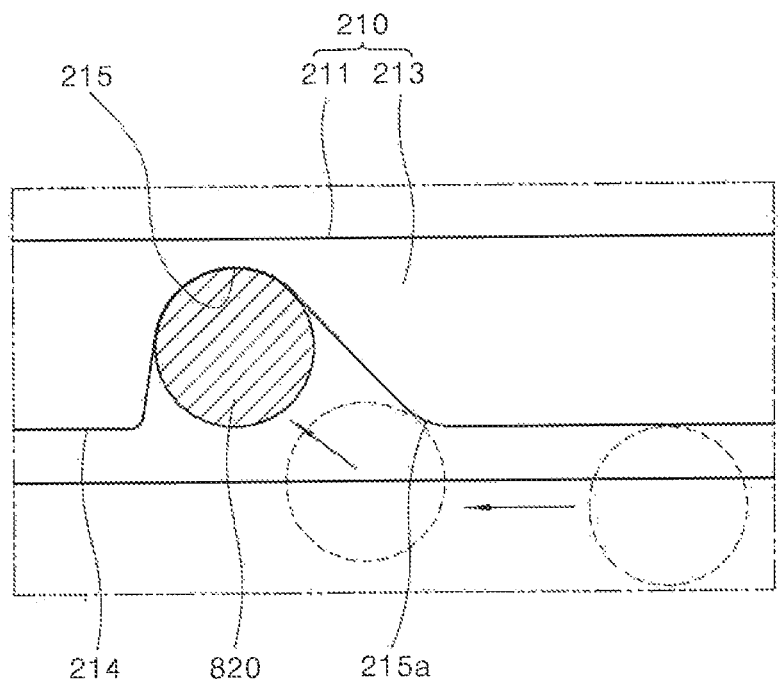
FIG. 14 is a view illustrating a coupling process between the tray and the mounting protrusion illustrated in FIG. 13.
Figure 15:
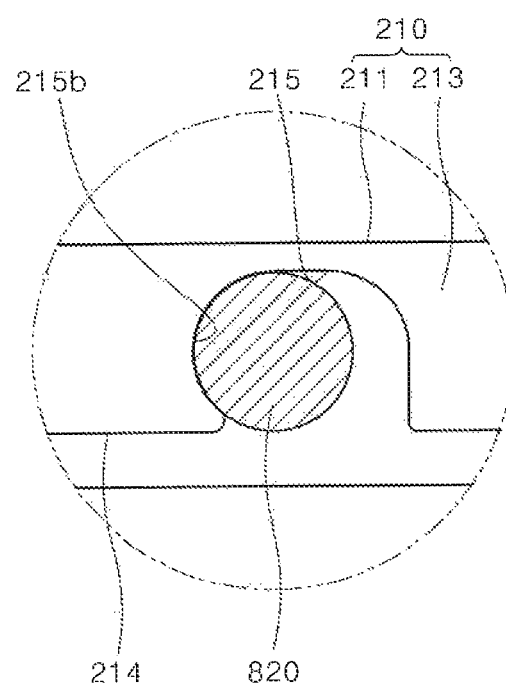
FIG. 15 is a cross-sectional view schematically illustrating a coupling structure between the tray and the mounting protrusion according to another embodiment of the present disclosure.
Figure 16:
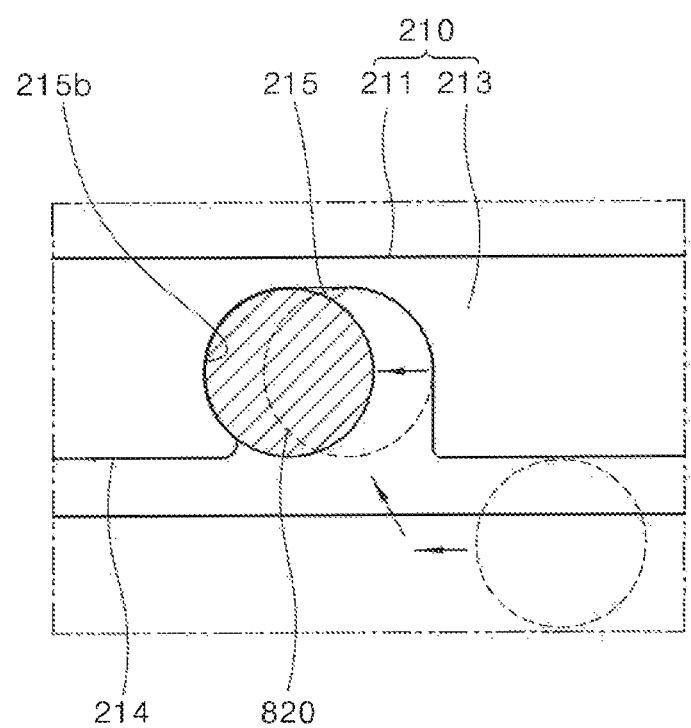
FIG. 16 is a view illustrating a coupling process between the tray and the mounting protrusion illustrated in FIG. 15.

FIG. 13 is a cross-sectional view schematically illustrating another example of the coupling structure between the tray and the mounting protrusion illustrated in FIG. 12, and FIG. 14 is a view illustrating a coupling process between the tray and the mounting protrusion illustrated in FIG. 13. Also, FIG. 15 is a cross-sectional view schematically illustrating still another example of the coupling structure between the tray and the mounting protrusion illustrated in FIG. 12, and FIG. 16 is a view illustrating a coupling process between the tray and the mounting protrusion illustrated in FIG. 15.

As one of the modifications of the structure for fitting and coupling the mounting groove 215 and the mounting protrusion 820 to each other, as illustrated in FIG. 13, an inclined surface 215a may be formed between the mounting groove 215 and the sliding surface 214. As illustrated in FIG. 14, the inclined surface 215a may be formed on a path along which the mounting protrusion 820, which slides while in contact with the sliding surface 214, inserts into the mounting groove 215 and may guide the movement of the mounting protrusion 820.

When the inclined surface 215a is formed between the mounting groove 215 and the sliding surface 214 as described above, impact and noise that may be generated during the process in which the mounting protrusion 820 is being fitted into the mounting groove 215 may be reduced, and, in this way, fitting and coupling the tray 200 and the mounting protrusion 820 to each other may be more smoothly and stably performed.

The inclined surface 215a may be disposed at a rear side of the mounting groove 215. This is a result of designing in consideration of the fact that, when the user pushes the tray 200 into the cooking compartment 105 in order to install the tray 200 inside the cooking compartment 105, the tray 200 is often not pushed enough to the position where the mounting groove 215 and the mounting protrusion 820 are fitted and coupled to each other.

When the inclined surface 215a is formed at the rear side of the mounting groove 215 as described above, fitting and coupling between the mounting groove 215 and the mounting protrusion 820 may be smoothly and stably guided even when the tray 200 is mounted on the mounting protrusion 820 in a state in which the tray 200 is not pushed enough to position where the mounting groove 215 and the mounting protrusion 820 are fitted and coupled to each other.

As another one of the modifications of the structure for fitting and coupling the mounting groove 215 and the mounting protrusion 820 to each other, as illustrated in FIG. 15, a fitting groove 215b may be further provided in the second protrusion 213. The fitting groove 215b may be formed in which a portion of the second protrusion 213 is cut out. The fitting groove 215b may be formed in a groove which is concavely depressed in the front-rear direction. The fitting groove 215b may be formed to be connected to the mounting groove 215 in such a way that the fitting groove 215b is concavely depressed in the front-rear direction at an upper end of the mounting groove 215. The fitting groove 215b may be disposed at a front side of the mounting groove 215. Accordingly, when the mounting protrusion 820 is engaged with the mounting groove 215, and the user further pushes the tray 200 rearward towards the inside of the cooking compartment 105 as illustrated in FIG. 16, the mounting protrusion 820 which has engaged with the mounting groove 215 may be engaged with the fitting groove 215b extending to the front of the mounting groove 215.

When the mounting protrusion 820 and the fitting groove 215b are fitted and coupled to each other as described above, since movement of the tray 200 in the up-down direction is restricted by the coupling between the mounting protrusion 820 and the fitting groove 215b, the risk of the tray 200 toppling forward is significantly lowered.

Meanwhile, the mounting protrusion 820 may be interlocked with a change in the state of the hinge part 810 to move in the front-rear direction. The mounting protrusion 820 may move the tray 200 mounted on the mounting protrusion 820 in the front-rear direction. That is, the tray 200 mounted on the mounting protrusion 820 may be moved in the front-rear direction by interlocking with the movement of the mounting protrusion 820 in the front-rear direction.

Figure 17:
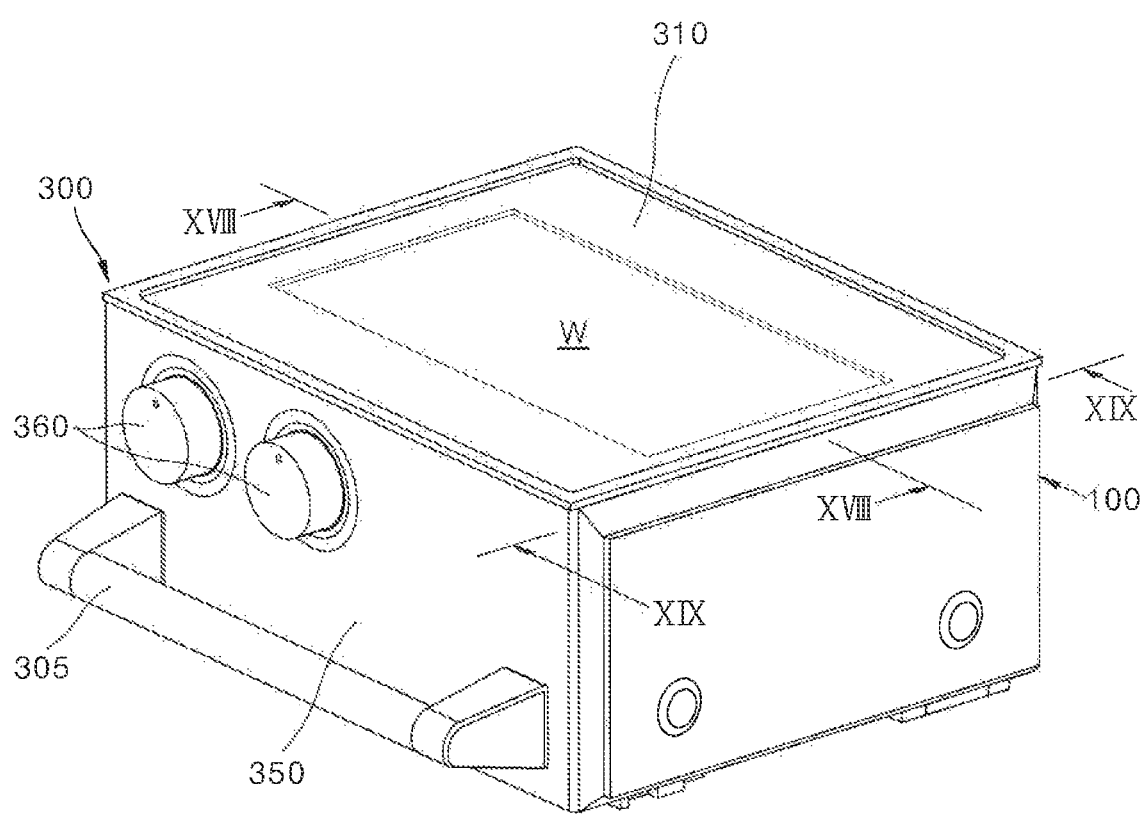
FIG. 17 is a perspective view illustrating a door-closed state of the cooking appliance according to an embodiment of the present disclosure.
Figure 18:
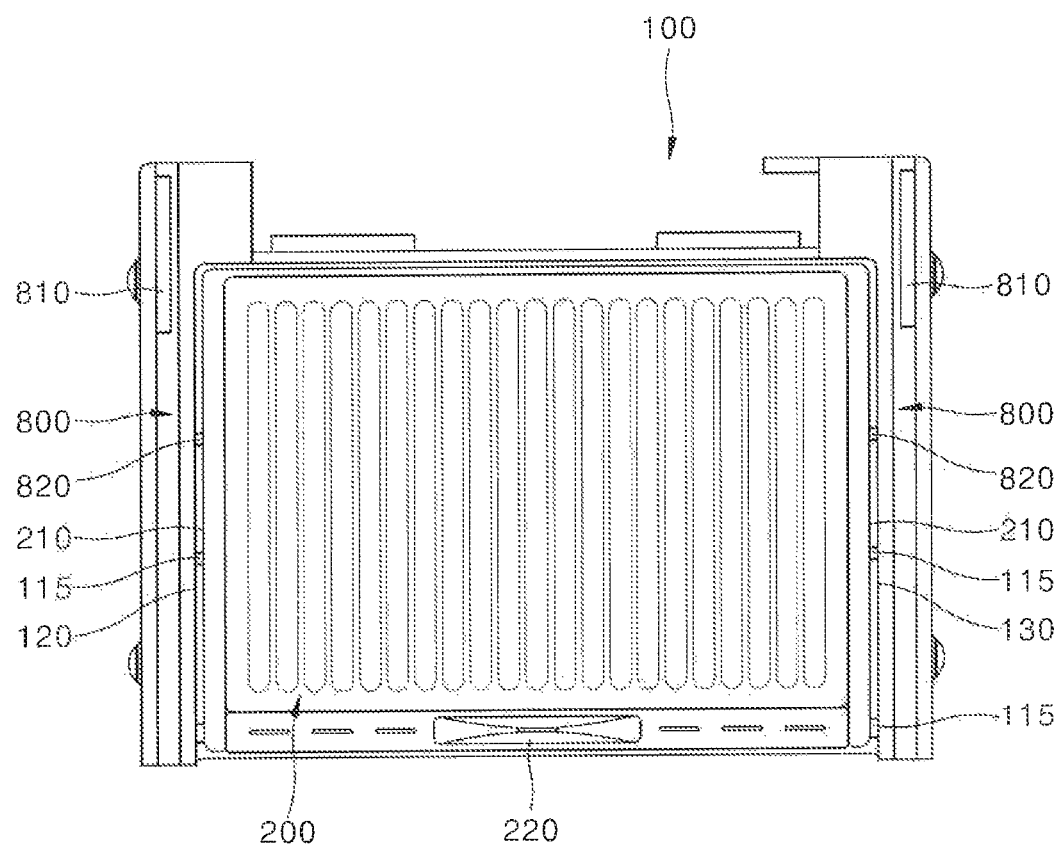
FIG. 18 is a cross-sectional view taken along line "XVIII-XVIII" of FIG. 17.
Figure 19:
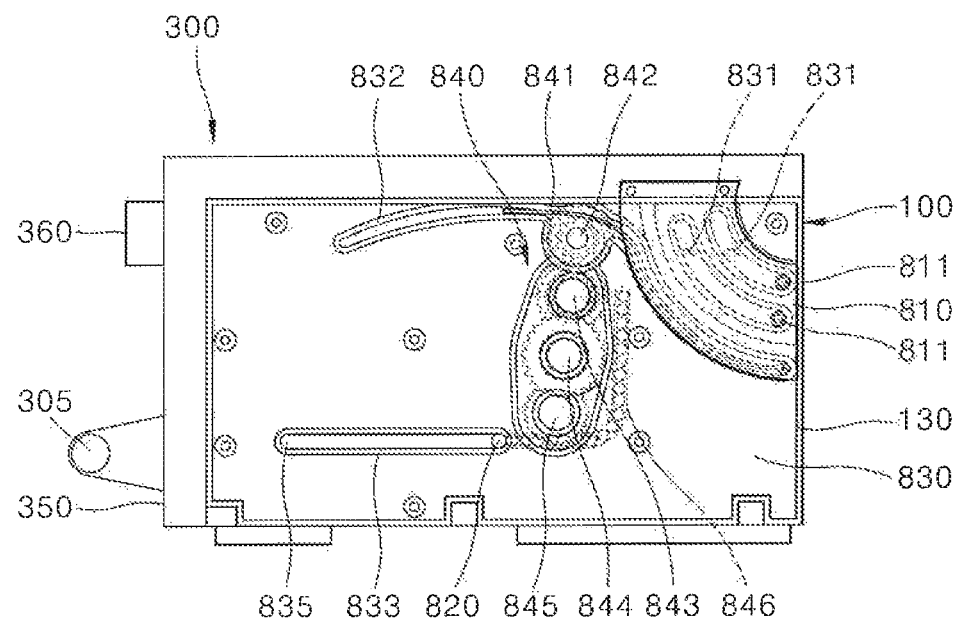
FIG. 19 is a cross-sectional view taken along line "XIX-XIX" of FIG. 17.
Figure 20:
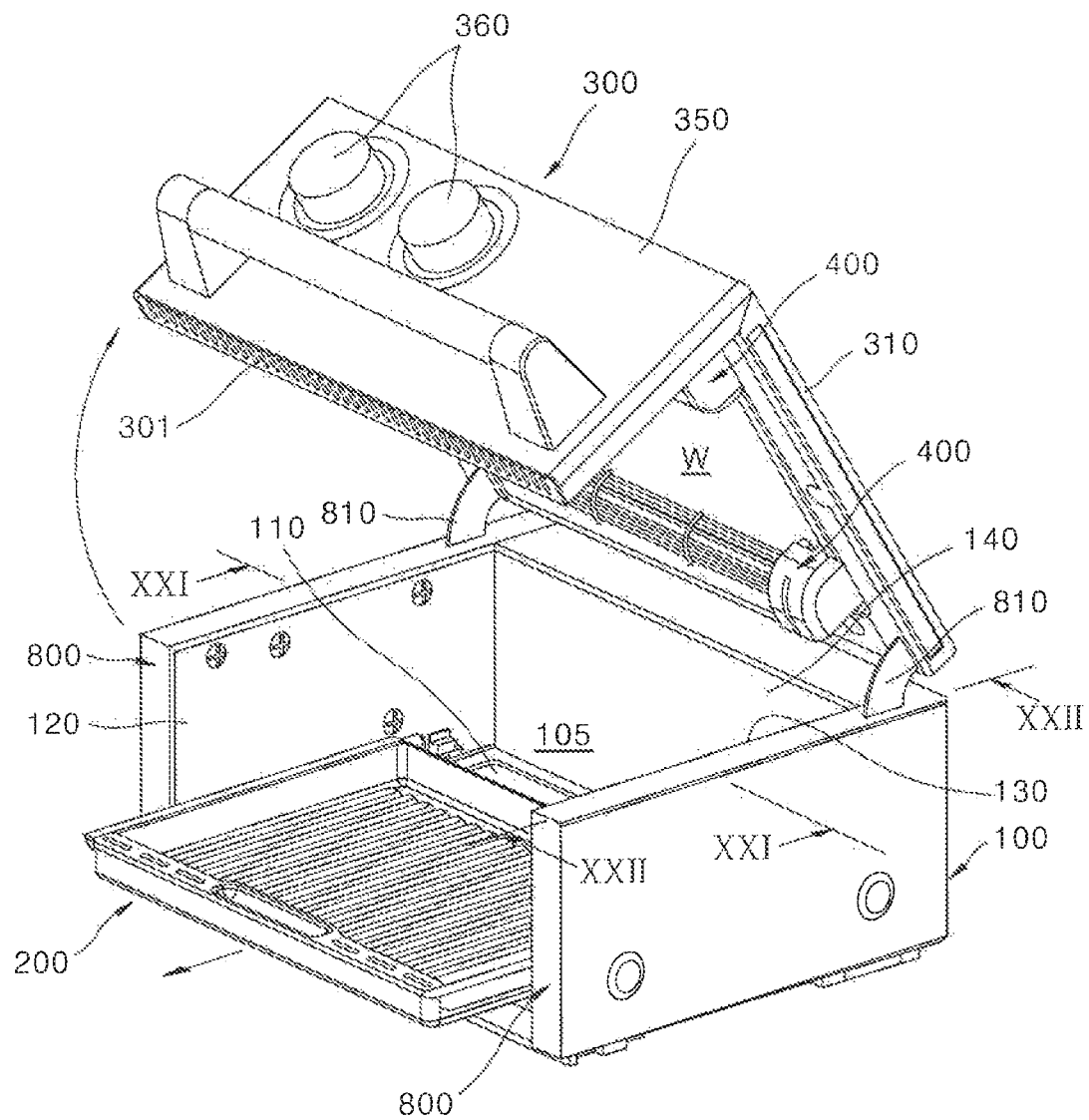
FIG. 20 is a perspective view illustrating a door-opened state of the cooking appliance illustrated in FIG. 17.
Figure 21:
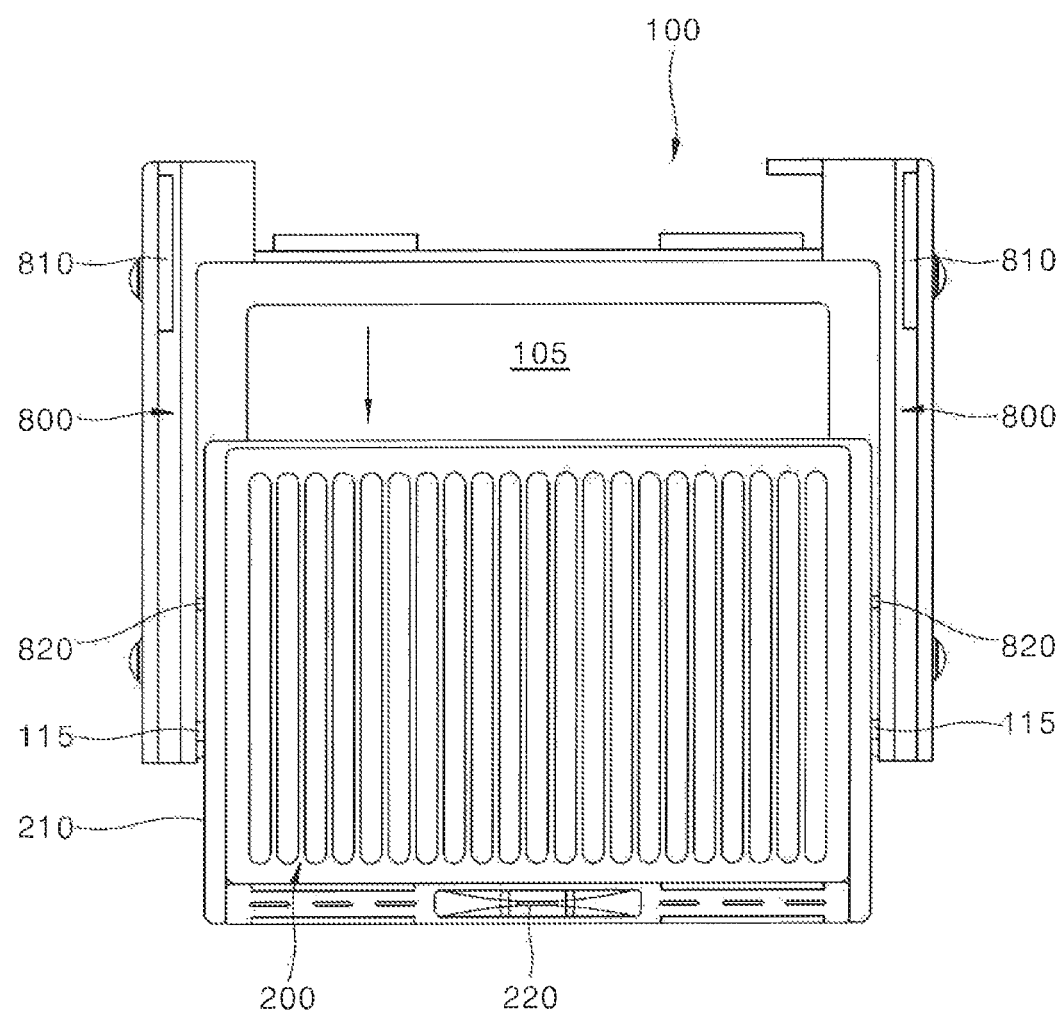
FIG. 21 is a cross-sectional view taken along line "XXI-XXI" of FIG. 20.
Figure 22:
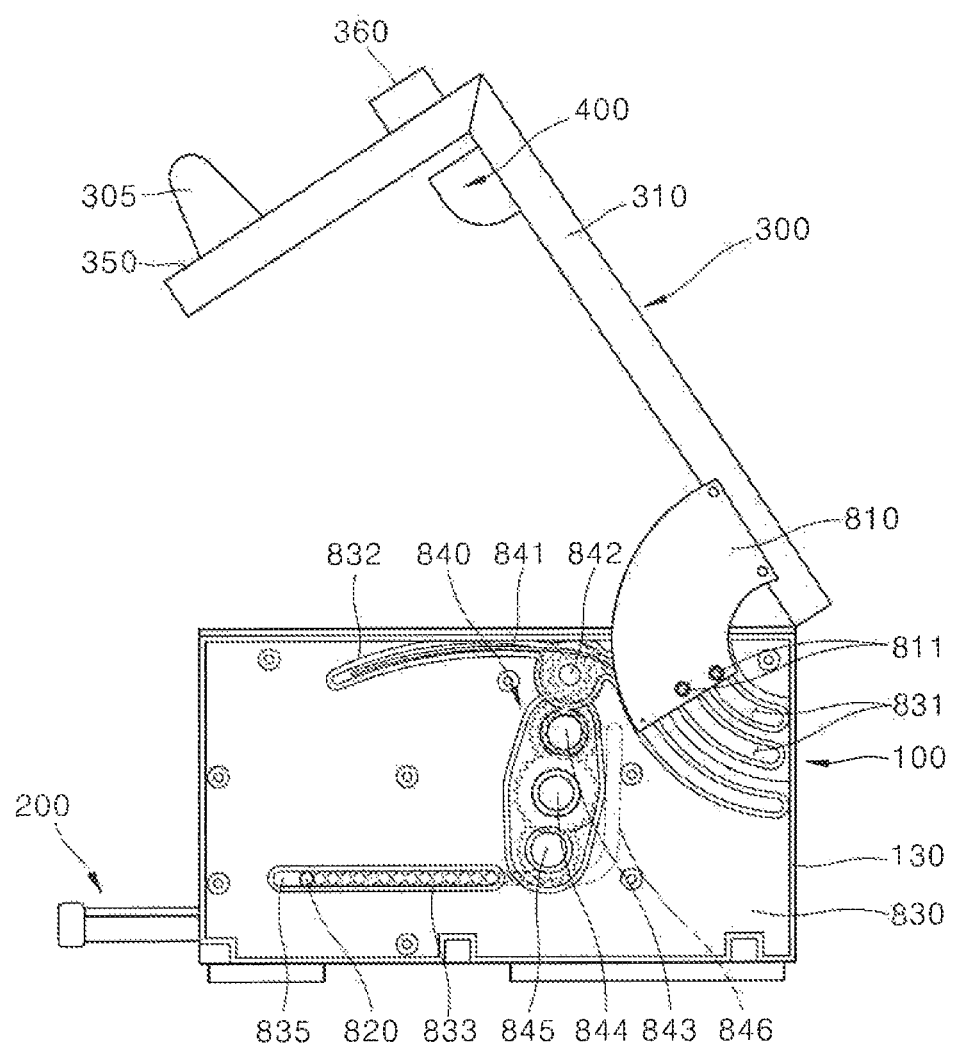
FIG. 22 is a cross-sectional view taken along line "XXII-XXII" of FIG. 20.

FIG. 17 is a perspective view illustrating a door-closed state of the cooking appliance according to an embodiment of the present disclosure, FIG. 18 is a cross-sectional view taken along line "XIII-XIII" of FIG. 17, and FIG. 19 is a cross-sectional view taken along line "XIX-XIX" of FIG. 17. Also, FIG. 20 is a perspective view illustrating a door-opened state of the cooking appliance illustrated in FIG. 17, FIG. 21 is a cross-sectional view taken along line "XXI-XXI" of FIG. 20, and FIG. 22 is a cross-sectional view taken along line "XXII-XXII" of FIG. 20.

According to the present embodiment, in a state in which the cooking compartment 105 is closed by the door 300 as illustrated in FIGS. 17 and 18, the tray 200 is inserted into the cooking compartment 105 (see FIG. 18). Also, the mounting protrusion 820 on which the tray 200 is mounted is disposed at a position biased towards the rear side of the cooking compartment 105.

The rear side of the tray 200 may be supported by a pair of mounting protrusions 820. Also, the front side of the tray 200 may be supported by a pair of support rollers 115.

That is, the tray 200 may be stably supported by the pair of mounting protrusions 820 disposed at the rear side and the pair of support rollers 115 disposed at the front side and may be installed in the cooking compartment 105 so as to be movable in the front-rear direction.

The support rollers 115 may be disposed at both the side surfaces 120 and 130 of the housing 100 in such a way that the support rollers 115 are disposed at the front side of the housing 100 adjacent to the door 300. The mounting part 210, more specifically, the sliding surface 214 (see FIG. 12), of the tray 200 may be seated on the support roller 115. The support roller 115 may roll along with the movement of the tray 200 and support the tray 200 so that the tray 200 may move smoothly.

Also, the door 300 may be rotatably installed at the housing 100 via the hinge assemblies 800 and rotate in the up-down direction to open or close the cooking compartment 105.

The hinge assemblies 800 are disposed at both side portions of the housing 100, and a rear side of the door upper surface part 310 is rotatably coupled to the hinge assemblies 800.

That is, a left side corner portion and a right side corner portion at the rear side of the door upper surface part 310 are rotatably coupled to the hinge assemblies 800 disposed at both the side portions of the housing 100. The door 300 opens or closes the upper surface and the front surface of the housing 100 by rotating in an up-down direction about the rear side of the door upper surface part 310 rotatably coupled to the hinge assemblies 800.

Referring to FIGS. 17 to 19, each of the hinge assemblies 800 may include a hinge case 830, the hinge part 810, the mounting protrusion 820, and a converting and outputting part 840.

The hinge case 830 forms an exterior of the hinge assembly 800 and houses portions of the hinge part 810 and the mounting protrusion 820 and the converting and outputting part 840 therein. Various structures for supporting the hinge part 810, the mounting protrusion 820, and the converting and outputting part 840 may be formed in the hinge case 830.

The hinge part 810 is installed in the hinge case 830 such that the position of the hinge part 810 is changeable. The hinge part 810 may be installed in the hinge case 830 such that the hinge part 810 may rotate along a trajectory corresponding to a rotational trajectory of the door 300. An upper end of the hinge part 810 may be coupled to the door 300. The posture of the hinge part 810 coupled to the door 300 in this way may be changed by the hinge part 810 interlocking with the rotation of the door 300. Also, the trajectory and range of rotation of the door 300 coupled to the hinge part 810 may be guided by the hinge part 810.

For example, the hinge part 810 may be provided in the form of a flat plate. The hinge part 810 maybe formed to be curved along the shape corresponding to the rotational trajectory of the door 300.

Also, a guide hole 831 formed in the shape corresponding to the rotational trajectory of the door 300 may be provided in the hinge case 830. The guide hole 831 may be formed in the hinge case 830 to pass through the hinge case 830 in the left-right direction. The guide hole 831 formed in this way may provide a passage for guiding a rotation path of the hinge part 810 in the hinge case 830.

For example, the guide hole 831 may be provided to form a passage which gradually ascends toward the front and gradually descends toward the rear.

A stopper 811 may be provided in the hinge part 810. The stopper 811 may be provided to protrude from the hinge part 810 so as to protrude in the left-right direction. The stopper 811 may be inserted into the guide hole 831 and move along the passage formed by the guide hole 831. That is, the stopper 811 may guide the rotation of the hinge part 810 by moving along the guide hole 831.

Also, at the front and upper end portions of the guide hole 831, the stopper 811 may interfere with the hinge case 830 which restricts further forward and upward movements of the hinge part 810. a At the rear and lower end portions of the guide hole 831, the stopper 811 may interfere with the hinge case 830 which restricts further rearward and downward movements of the hinge part 810. That is, the hinge part 810 may limit the range of movement of the stopper 811 to a range corresponding to the range in which the guide hole 831 is formed.

The mounting protrusion 820 is connected to any one of the elements constituting the converting and outputting part 840 inside the hinge case 830 and protrudes toward the inside of the cooking compartment 105 via the first slot 835 formed in the hinge case 830 and the second slot 125 formed in the housing 100. Here, the second slot 125 may be formed in the side surface of the housing 100 and formed with a shape overlapping the first slot 835 and at a position overlapping the first slot 835.

The converting and outputting part 840 is provided inside the hinge case 830. The converting and outputting part 840 may convert a rotary force input by a change in the posture of the hinge part 810 to a linear force for moving the mounting protrusion 820 in the front-rear direction. The converting and outputting part 840 may include a moving member and a converting member.

The moving member corresponds to an element which moves the mounting protrusion 820 in the front-rear direction. Also, the converting member corresponds to an element which moves the moving member in the front-rear direction by interlocking with a change in the posture of the hinge part 810, that is, movement of the hinge part 810.

For example, the converting and outputting part 840 may include a belt 841, a plurality of rotary gears 842, 843, 844, and 845, and a rack gear 846. Among the elements, the belt 841 and the plurality of rotary gears 842, 843, 844, and 845 are illustrated as corresponding to the converting members. The rack gear 846 is illustrated as corresponding to the moving member.

The belt 841 is provided in the form of an open timing belt in which teeth are formed on at least one of an upper surface and a lower surface. A first guide rib 832 provided to protrude from an inner side surface of the hinge case 830 may restrict a vertical position of the belt 841 and guide a front-rear movement path of the belt 841.

A rear side end portion of the belt 841 may be connected to the hinge part 810. The belt 841 may be moved in the front-rear direction by interlocking with a change in the posture of the hinge part 810. For example, when the hinge part 810 moves forward and upward, the belt 841 may move forward by interlocking with the movement of the hinge part 810. Also, when the hinge part 810 moves rearward and downward, the belt 841 may move rearward by interlocking with the movement of the hinge part 810.

The teeth formed at the belt 841 may be engaged with the plurality of rotary gears 842, 843, 844, and 845.

The first rotary gear 842 is disposed most adjacent to the belt 841 among the plurality of rotary gears 842, 843, 844, and 845. In the present embodiment, the first rotary gear 842 is illustrated as being formed including a timing gear. The first rotary gear 842 may be engaged with the belt 841 and be rotated by interlocking with the movement of the belt 841.

The second rotary gear 843 and the third rotary gear 844 are disposed between the first rotary gear 842 and the fourth rotary gear 845 to transmit rotation of the first rotary gear 842 to the fourth rotary gear 845.

That is, the movement of the belt 841 is performed by interlocking with a change in the posture of the hinge part 810, and the rotation of the plurality of rotary gears 842, 843, 844, and 845 is performed by interlocking with the movement of the belt 841. Therefore, a change in the posture of the hinge part 810 causes the rotation of the fourth rotary gear 845.

The fourth rotary gear 845 rotated as described above may be engaged with the rack gear 846 disposed below the fourth rotary gear 845. A second guide rib 833 provided to protrude from the inner side surface of the hinge case 830 may restrict a vertical position of the rack gear 846 and guide a front-rear movement path of the rack gear 846.

The rack gear 846 may be moved in the front-rear direction by interlocking with rotation of the fourth rotary gear 845. For example, when the hinge part 810 moves forward and upward and the fourth rotary gear 845 is rotated in a first direction according to the movement of the hinge part 810, the rack gear 846 interlocked therewith may move forward (see FIG. 22). Also, when the hinge part 810 moves rearward and downward and the fourth rotary gear 845 is rotated in a second direction, which is the reverse of the first direction, according to the movement of the hinge part 810, the rack gear 846 interlocked therewith may move rearward (see FIG. 19).

The mounting protrusion 820 is coupled to the rack gear 846. Accordingly, the mounting protrusion 820 may interlock with movement of the rack gear 846 and move in the front-rear direction. For example, when the rack gear 846 moves forward, the mounting protrusion 820 may also move forward according to the movement of the rack gear 846, and, when the rack gear 846 moves rearward, the mounting protrusion 820 may also move rearward according to the movement of the rack gear 846.

In summary, each of the hinge assemblies 800 having the above-described configuration is provided so that states of the elements constituting each of the hinge assemblies 800, that is, the hinge part 810 and the converting and outputting part 840, may be changed by interlocking with the rotation of the door 300 and the elements whose states are changed in this way may move the mounting protrusion 820 in the front-rear direction.

As illustrated in FIGS. 20 to 22, when the door 300 rotates upward to open the cooking compartment 105, a rotary force due to the rotation of the door 300 changes the state of the hinge part 810 of the hinge assembly 800, and the mounting protrusion 820 moves forward as a result. Also, the tray 200 may move forward due to the mounting protrusion 820 moving forward and be withdrawn to the outside of the cooking compartment 105.

That is, when the door 300 is opened, the tray 200 is automatically withdrawn. Accordingly, the user may easily and safely put food to be cooked on the tray 200 or take out the cooked food on the tray 200 from the tray 200 and may easily take out the tray 200, which has withdrawn forward, from the inside of the cooking compartment 105 and move the tray 200.

Furthermore, in the cooking appliance of the present embodiment, the door 300 is provided to be able to open both the front surface and the upper surface of the cooking compartment 105. Accordingly, the user may insert or withdraw food or the tray 200 into or from the cooking compartment 105 through a much larger opening as compared with a cooking appliance where the door only opens at the front side of the cooking compartment 105.

That is, the cooking appliance of the present embodiment may not only provide a much larger opening for allowing the user to easily and conveniently insert or withdraw food or the tray 200 into or from the cooking compartment 105 but also provide a function of allowing the food or the tray 200 to be more easily and conveniently withdrawn by the automatic withdrawal of the tray 200 when the door 300 is opened.

The cooking appliance of the present embodiment may also provide a function of allowing the tray 200 to be automatically inserted into the cooking compartment 105 when the door 300 is closed as long as the tray 200 is mounted on the mounting protrusion 820. The function may contribute to improving convenience and safety of the cooking appliance by eliminating the need for the user to put their hand inside the cooking compartment 105 filled with hot air when the user wants to put the tray 200 back into the cooking compartment 105 after taking out the tray 200 from the cooking compartment 105 while cooking is performed.

Further, according to the cooking appliance of the present embodiment, since the door 300 is opened by rotating upward as opposed to the door being unfolded forward, there is little concern about the center of mass of the cooking appliance being biased towards the front even when the door 300 is opened. Rather, when the door 300 is opened, the center of mass of the door 300 moves further to the rear than when the door 300 is closed.

In the structure in which the center of mass of the cooking appliance moves to the rear when the door 300 is opened, the risk of the cooking appliance toppling forward when the door 300 is opened is significantly lowered. Also, in the structure, the weight of the tray 200 may be freely increased because the risk of the cooking appliance toppling forward is low even when the weight of the tray is increased. That is, in the above structure, it is possible to use the tray 200 which is thicker and heavier than that used in the structure in which the door unfolds forward.

The thicker and heavier the tray 200 is, the better the high-temperature cooking performance and the easier it is to maintain warmth for a long time. Therefore, better cooking performance may be expected to an extent that the tray 200 is thicker and heavier.

Also, the tray 200 usable in an environment heated by the induction heating part generally weighs more than an ordinary tray. Therefore, when it becomes possible to use the tray 200 which is much thicker and heavier than the ordinary tray, even when the second heating part 600 is provided in the form of an induction heating part, it is possible to provide the tray 200 suitable for the second heating part 600.

As described above, in the cooking appliance of the present embodiment, the tray 200 may be withdrawn forward when the door 300 is opened. Also, the tray 200 may be provided that is thicker and heavier than ordinary trays in order to improve high-temperature cooking performance and warmth maintaining performance.

In a state in which the tray 200 is withdrawn forward, the center of mass of the cooking appliance is biased towards the front as much as the extent to which the tray 200 is withdrawn, and thus a risk of the cooking appliance toppling forward is inevitably increased.

In consideration of such an aspect, the cooking appliance of the present embodiment includes various forms of configurations for preventing the cooking appliance from toppling forward when the door 300 is opened.

Hereinafter, configurations for preventing the cooking appliance from toppling forward when the door 300 is opened will be described in detail.

Figure 23:
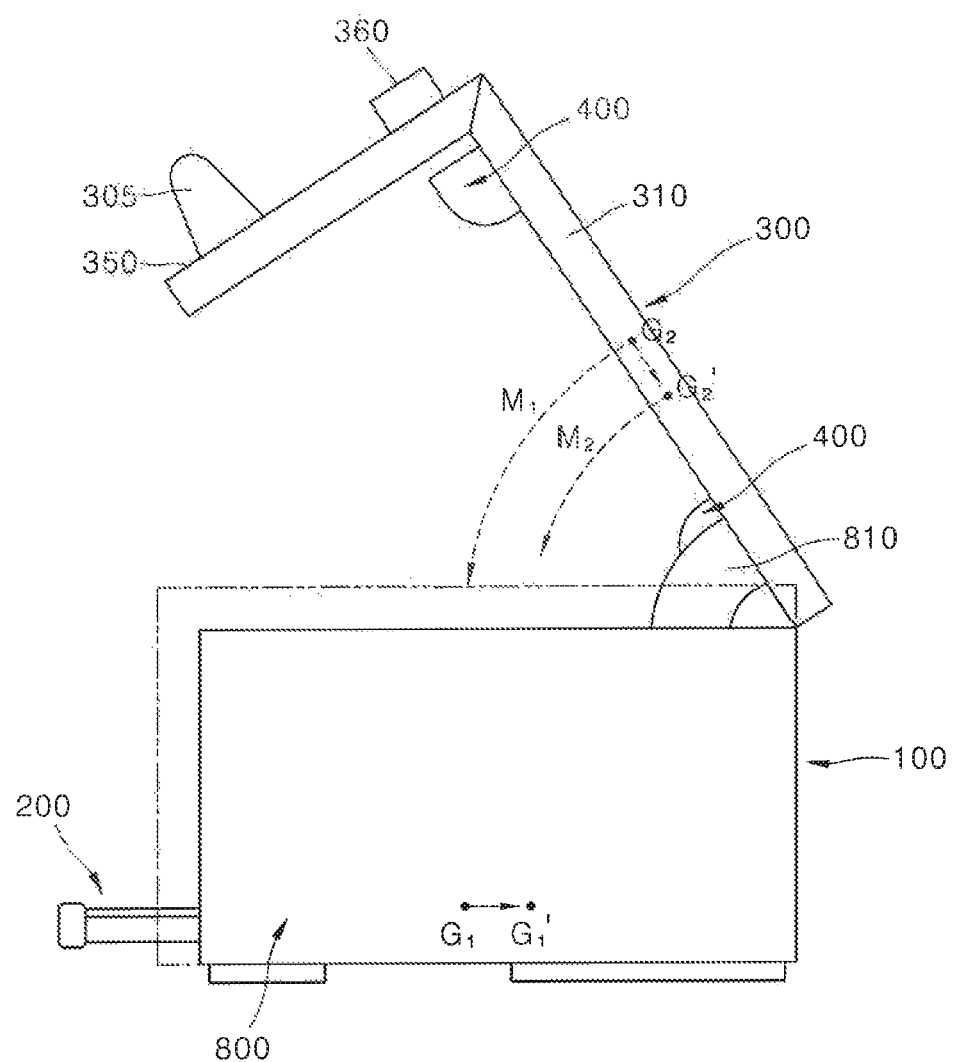
FIG. 23 is a view illustrating a center-of-mass change state in the door-opened state of the cooking appliance.

FIG. 23 is a view illustrating a center-of-mass change state in the door-opened state of the cooking appliance.

Referring to FIGS. 20 to 23, the hinge part 810 is disposed at both the side surfaces 120 and 130 of the housing 100 in such a way that the hinge part 810 is disposed at sides adjacent to the back surface 140 of the housing 100. That is, the hinge part 810 is disposed at the rear of both sides of the housing 100.

The hinge part 810 is coupled to the door 300 in such a way that the hinge part 810 is coupled to the rear side of the door upper surface part 310. That is, the hinge part 810 is coupled to the rear of each sides of the door upper surface part 310, and the door 300 may open or close the cooking compartment 105 by rotating in the up-down direction about the rear side of the door upper surface part 310 coupled to the hinge part 810 as described above.

The door 300 may rotate about the rear side of the door upper surface part 310 such that, in a state in which the front surface and the upper surface of the housing 100 are opened (hereinafter referred to as "opened state"), the door 300 is located further behind than in a state in which the front surface and the upper surface of the housing 100 are closed (hereinafter referred to as "closed state").

By the door 300 rotating about the rear side of the door upper surface part 310 as described above, the position of the door 300 may be further biased towards the rear in the opened state than in the closed state.

The door 300 whose position is relatively further biased towards the rear in the opened state as described above may cause the center of mass of the cooking device to be biased towards the rear from the center of the cooking appliance in the front-rear direction when the door 300 is in the opened state.

That is, the first configuration provided for preventing the cooking appliance from toppling forward when the door 300 is opened is allowing the door 300 to rotate about the rear side of the door upper surface part 310. Accordingly, the position of the door 300 may be further biased towards the rear in the opened state than in the closed state, and, in this way, the center of mass of the cooking appliance may be formed to be biased towards the rear from the center of the cooking appliance in the front-rear direction when the door 300 is in the opened state.

Meanwhile, when looking at the configuration of the door 300 itself, the door 300 is provided in which the up-down length of the door front surface part 350 is shorter than the front-rear length of the door upper surface part 310. That is, when the door 300 is in the closed state, the up-down length of the door front surface part 350 is shorter than the front-rear length of the door upper surface part 310.

Accordingly, in the door 300, the proportion occupied by the volume of the door upper surface part 310 is larger than the proportion occupied by the volume of the door front surface part 350. Accordingly, in the total weight of the door 300, the proportion occupied by the weight of the door upper surface part 310 is larger than the proportion occupied by the weight of the door front surface part 350.

When the door 300 is rotated rearward to be opened, the center of mass of the door 300 gradually moves rearward. In the door 300, the door front surface part 350 is disposed at the front side, and the door upper surface part 310 is disposed behind the door front surface part 350.

Accordingly, the larger the proportion occupied by the weight of the door upper surface part 310 with respect to the total weight of the door 300, the greater the extent to which the center of mass of the door 300 moves rearward when the door 300 rotates rearward.

In other words, the greater the proportion occupied by the weight of the door upper surface part 310 with respect to the total weight of the door 300, the easier it is for the center of mass of the door 300 to promptly move rearward when the door 300 rotates rearward.

That is, the second configuration provided for preventing the cooking appliance from toppling forward when the door 300 is opened is providing the door 300 in which the up-down length of the door front surface part 350 is shorter than the front-rear length of the door upper surface part 310. Accordingly, when the door 300 rotates rearward, the center of mass of the door 300, and thus the center of mass of the cooking appliance may move further rearward more promptly.

Meanwhile, the first heating part 400 and the see-through window W are provided in the door 300, and the first heating part 400 and the see-through window W are disposed in the door upper surface part 310.

As described above, the see-through window W may include the pair of glasses 330 and 335 (see FIG. 10). Generally, glasses are formed of a heavyweight material. Therefore, when the see-through window W formed of glass is disposed in the door upper surface part 310, the weight of the door upper surface part 310 is inevitably increased as much as the weight of the see-through window W.

Furthermore, the see-through window W of the present embodiment may include the pair of glasses 330 and 335, i.e., two layers of glasses. Therefore, the weight of the door upper surface part 310 is inevitably increased as much as the weight of the see-through window W.

Since the see-through window W is disposed in the door upper surface part 310 as described above, the proportion occupied by the weight of the door upper surface part 310 with respect to the total weight of the door 300 is increased as much as the weight of the glasses forming the see-through window W.

Accordingly, when the door 300 rotates rearward, the center of mass of the door 300, and thus the center of mass of the cooking appliance may more promptly move further rearward as much as the increase in the weight of the door upper surface part 310 due to the see-through window W.

Further, the pair of first heating parts 400 are disposed at the bottom surface side of the door upper surface part 310. In this case, the first heating part 400 is disposed at each of the front outer side and the rear outer side of the see-through window W. One of the pair of first heating parts 400 is disposed at the rear side of the door upper surface part 310 adjacent to the hinge part 810.

Since the first heating part 400 is disposed in the door upper surface part 310 as described above, the proportion occupied by the weight of the door upper surface part 310 with respect to the total weight of the door 300 is further increased as much as the weight of the first heating part 400.

Accordingly, when the door 300 rotates rearward, the center of mass of the door 300, and thus the center of mass of the cooking appliance may more promptly move further rearward as much as the increase in the weight of the door upper surface part 310 due to the first heating part 400.

Furthermore, due to the first heating part 400 disposed at the rear side of the door upper surface part 310 adjacent to the hinge part 810, the center of mass of the door 300 may move further rearward. In this way, when the door 300 rotates rearward, the center of mass of the door 300, and thus the center of mass of the cooking appliance may more promptly move further rearward.

That is, the third configuration provided for preventing the cooking appliance from toppling forward when the door 300 is opened is placing the first heating part 400 and the see-through window W in the door upper surface part 310. Accordingly, when the door 300 rotates rearward, the center of mass of the door 300 may more promptly move further rearward.

In summary, the door 300 of the present embodiment is provided in which the position of the door 300 moves rearward when the door 300 rotates rearward, the up-down length of the door front surface part 350 is shorter than the front-rear length of the door upper surface part 310, and the first heating part 400 and the see-through window W are disposed in the door upper surface part 310.

The door 300 is provided so that, when the cooking compartment 105 is opened and the tray 200 is withdrawn forward as a result, the door 300 itself is moved toward the rear of the cooking appliance, and the center of mass of the door 300 promptly moves rearward according to the rearward rotation of the door 300.

Since the door 300 provided as described above causes the center of mass of the cooking appliance to be biased towards the rear from the center in the front-rear direction when the cooking compartment 105 is opened and the tray 200 is withdrawn forward as a result, the door 300 may contribute to significantly lowering the risk of the occurrence of the cooking appliance toppling forward.

Meanwhile, the door 300 rotates about the rear side of the door upper surface part 310 coupled to the hinge part 810. When the door 300 is in the opened state, most of the load of the door 300 acts toward the hinge part 810.

Since the hinge part 810 is disposed at the rear side of the cooking appliance, when the door 300 is in the opened state, most of the load of the door 300 is concentrated on the rear side of the cooking appliance.

Therefore, when the door 300 is in the opened state, the center of mass of the cooking appliance moves towards the rear side of the cooking appliance to the extent that most of the load of the door 300 is concentrated on the rear side of the cooking appliance.

In other words, when the door 300 is in the opened state, in addition to the influence of the change in the position of the door 300 itself and the change in the center of mass of the door 300 itself, an additional influence is caused by most of the load of the door 300 being concentrated on the rear side of the cooking appliance. In this way, the center of mass of the cooking appliance may be further biased towards the rear side.

That is, the fourth configuration provided for preventing the cooking appliance from toppling forward when the door 300 is opened is a configuration in which a coupling point between the door 300 and the hinge part 810 is disposed at the rear side of the cooking appliance so that an additional influence is caused by most of the load of the door 300 being concentrated on the rear side of the cooking appliance.

Also, when the door 300 is in the opened state, moment is applied to the cooking appliance around a portion where the door 300 and the hinge part 810 are coupled to each other. The moment acts as a force rotating the cooking appliance forward. That is, as the moment becomes greater, the force attempting to rotate the cooking appliance forward becomes larger, and the risk of the cooking appliance toppling forward is also increased.

Further, when the door 300 is in the opened state, the tray 200 is withdrawn forward, and moment acting from the tray 200 withdrawn in this way is applied to the cooking appliance. The moment also acts as the force rotating the cooking appliance forward.

Accordingly, the force equivalent to the sum of the moment acting from the door 300 and the moment acting from the tray 200 may act as a force further increasing the risk of the cooking appliance toppling forward.

The size of the moment acting from the door 300 may be determined by a force acting on the door 300 and a distance between a position on which the force acts and a rotation shaft (portion where the door and the hinge part are coupled to each other). In this case, only gravity acts on the door 300 unless a separate force is applied thereto. Since gravity acts on the entire part of the door 300, it can be seen that gravity acts on the center of mass of the door 300. Therefore, the moment increases as the center of mass of the door 300 moves away from the portion where the door 300 and the hinge part 810 are coupled to each other and decreases as the center of mass of the door 300 approaches the portion where the door 300 and the hinge part 810 are coupled to each other.

According to the present embodiment, as the door 300 rotates rearward to open the cooking compartment 105, the center of mass of the door 300 also moves rearward, and, as a result, the size of the moment acting from the door 300 may be decreased together.

That is, when the door 300 is in the opened state, the moment acting from the tray 200 may increase due to the tray 200 being withdrawn forward, but the moment acting from the door 300 may relatively decrease.

In this way, since the cooking appliance of the present embodiment allows the size of the moment acting on the cooking appliance due to the door 300 to be decreased, the risk of the cooking appliance toppling forward due to the tray 200 withdrawn forward may be significantly lowered.

That is, the fifth configuration provided for preventing the cooking appliance from toppling forward when the door 300 is opened is a configuration in which the center of mass of the door 300 is allowed to be more biased towards the rear so that the size of the moment acting on the cooking appliance due to the door 300 is decreased.

Meanwhile, the mounting protrusion 820 may protrude towards the inside of the cooking compartment 105 via the first slot 835 formed in the hinge case 830 and the second slot 125 formed in the housing 100.

The first slot 835 and the second slot 125 may provide a passage for allowing the mounting protrusion 820, which is connected to the converting and outputting part 840 inside the hinge case 830, to protrude towards the inside of the cooking compartment 105 and provide a passage required for the mounting protrusion 820 to move in the front-rear direction.

To this end, the first slot 835 and the second slot 125 may be formed to pass through the hinge case 830 and the side surface 120 of the housing 100, respectively, and each of the first slot 835 and the second slot 125 may be formed as a slot having an up-down width corresponding to the thickness of the mounting protrusion 820 and a length extending in the front-rear direction.

Preferably, the front-rear lengths of the first slot 835 and the second slot 125 may be less than ½ of the front-rear length of the tray 200.

The lengths of the first slot 835 and the second slot 125 are related to a withdrawal range of the tray 200. That is, the tray 200 may be withdrawn as the mounting protrusion 820 moves forward. Since a forward movement range of the mounting protrusion 820 is limited by the first slot 835 and the second slot 125, the withdrawal range of the tray 200 may be determined by the first slot 835 and the second slot 125.

Therefore, when the front-rear lengths of the first slot 835 and the second slot 125 are less than ½ of the front-rear length of the tray 200, a distance along which the tray 200 is movable is limited to less than ½ of the front-rear length of the tray 200.

Accordingly, when it is assumed that the tray 200 is completely inserted into the cooking compartment 105 when the mounting protrusion 820 is disposed at the rearmost end portions of the first slot 835 and the second slot 125, in a case in which the mounting protrusion 820 is disposed at the foremost end portions of the first slot 835 and the second slot 125, the tray 200 may be withdrawn to the outside of the cooking compartment 105 only as much as a length less than ½ of the longitudinal length of the tray 200.

This is a result of designing so that the center of mass of the tray 200 is located inside the cooking compartment 105 even when the tray 200 is withdrawn. That is, in consideration of the fact that, when the tray 200 is excessively withdrawn, the risk of the tray 200 toppling forward increases to the extent that the tray 200 is excessively withdrawn. Thus, the center of mass of the tray 200 is allowed to be located inside the cooking compartment 105 even when the tray 200 is withdrawn. Also, when the tray 200 is excessively withdrawn and the center of mass of the cooking appliance is biased to the front, the size of the moment acting on the cooking appliance increases to the extent that the center of mass of the cooking appliance is biased to the front, and, as a result, the risk of the cooking appliance itself toppling forward also increases.

In consideration of such aspect, in the present embodiment, the tray 200 is allowed to be withdrawn to the outside of the cooking compartment 105 only as much as a length less than ½ of the longitudinal length of the tray 200. In this way, since the tray 200 is automatically withdrawn when the door 300 is opened, advantageous effects in that withdrawal of food or the tray 200 is more easily and conveniently performed and the risk of the tray 200 and the cooking appliance toppling forward is lowered.

In the case of a conventional cooking appliance in which the door only opens the front of a cooking compartment, when, as described above, the tray 200 is withdrawn to the outside of the cooking compartment 105 only as much as the length less than ½ of the longitudinal length of the tray 200, various inconveniences may occur.

That is, since the tray 200 is not completely exposed to the outside of the cooking compartment, it is difficult to properly check the cooking state of food placed on the tray 200, and there is an inconvenience in placing food on the tray 200 or taking out the food placed on the tray 200.

In contrast, in the cooking appliance of the present embodiment, since the upper surface of the cooking compartment 105 as well as the front surface thereof are opened together when the door 300 is opened, the entire tray 200 may be exposed to the outside even when, as described above, the tray 200 is withdrawn to the outside of the cooking compartment 105 only as much as the length less than ½ of the longitudinal length of the tray 200.

Therefore, even when the tray 200 is withdrawn to the outside of the cooking compartment 105 only as much as the length less than ½ of the longitudinal length of the tray 200, it is easy to check the cooking state of the entire food placed on the tray 200, and placing food on the tray 200 or taking out the food placed on the tray 200 may be easily and promptly performed.

That is, the sixth configuration provided for preventing the cooking appliance from toppling forward when the door 300 is opened is a configuration in which the tray 200 is allowed to be withdrawn to the outside of the cooking compartment 105 only as much as the length less than ½ of the longitudinal length of the tray 200 so that the tray 200 may be exposed to the outside while the risk of the occurrence of the cooking appliance toppling forward is lowered.

Figure 24:
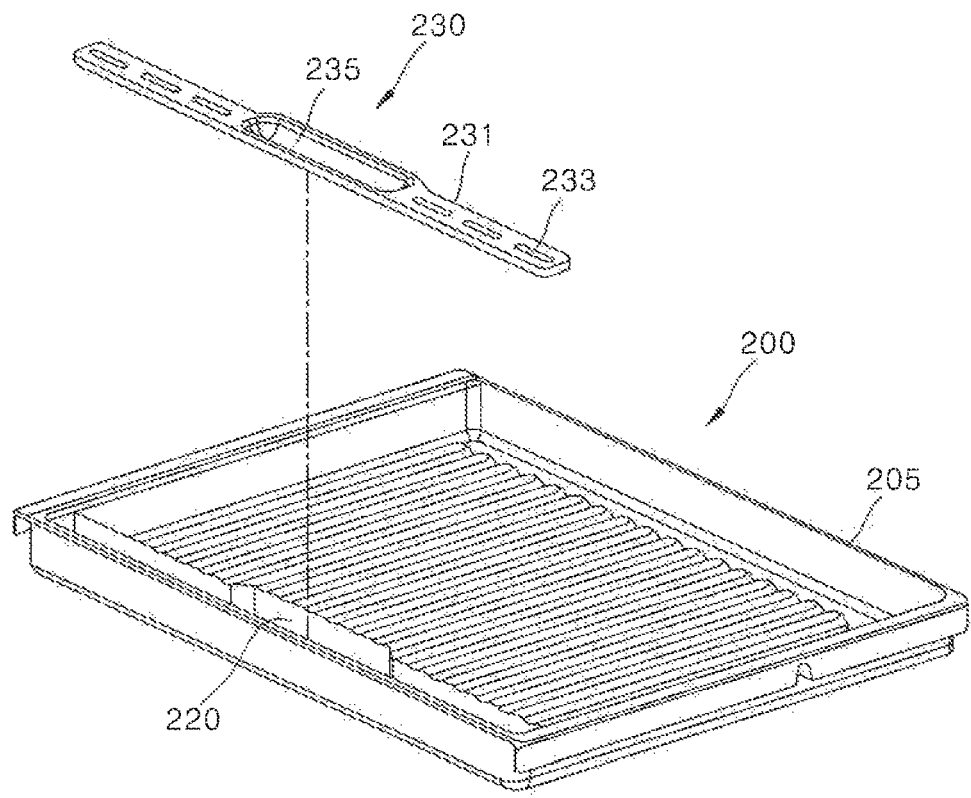
FIG. 24 is an exploded perspective view of the tray illustrated in FIG. 11.
Figure 25:
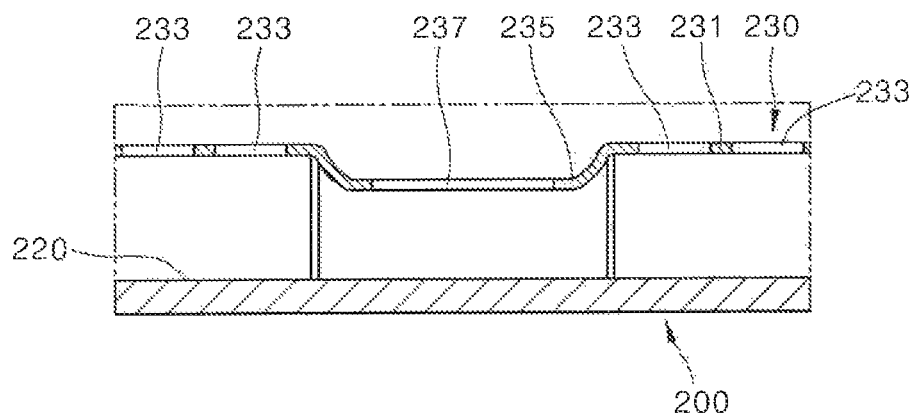
FIG. 25 is a cross-sectional view taken along line "XXV-XXV" of FIG. 11.

FIG. 24 is an exploded perspective view of the tray illustrated in FIG. 11, and FIG. 25 is a cross-sectional view taken along line "XXV-XXV" of FIG. 11.

Referring to FIG. 3 and FIGS. 24 and 25, a water receiving groove 220 may be formed in the tray 200. The water receiving groove 220 may be disposed in at least one of the four side surfaces of the tray 200. In the present embodiment, the water receiving groove 220 is illustrated as being disposed in the side surface disposed at the front of the tray main body 205. The water receiving groove 220 may be formed in the form of a groove which is concavely depressed downward from an upper end of the side surface of the tray 200.

Water may be held in the water receiving groove 220, and the water held in the water receiving groove 220 may be evaporated when the inside of the cooking compartment 105 or the tray 200 is heated and then be provided as steam acting in the cooking compartment 105.

Further, the tray 200 may further include a steam cover 230. The steam cover 230 may be provided as an element which covers the water receiving groove 220 from the top and may include a cover main body part 231 and a water entrance guide surface 235.

The cover main body part 231 may cover the water receiving groove 220 from the top and be detachably coupled to the tray 200. A plurality of steam holes 233 may be disposed in the cover main body part 231. Each steam hole 233 is formed in the cover main body part 231 to pass through the cover main body part 231 in the up-down direction. By having each steam hole 233 formed in this way, a passage connecting the cooking compartment 105 and the inside of the water receiving groove 220 covered by the steam cover 230 may be formed in the steam cover 230.

According to the present embodiment, the water receiving groove 220 and the steam cover 230 are disposed in front of the tray 200 and extend in the left-right direction. Also, the plurality of steam holes 233 are disposed in the cover main body part 231 of the steam cover 230 in such a way that the plurality of steam holes 233 are arranged to be spaced a predetermined distance apart from each other in the left-right direction. That is, the steam holes 233 are provided to be evenly disposed inside the cooking compartment 105 in the left-right direction.

Also, the water entrance guide surface 235 is formed on the cover main body part 231 so as to be concave in the up-down direction. A water entrance hole 237 is formed in the water entrance guide surface 235 to pass through the water entrance guide surface 235 in the up-down direction.

The water entrance hole 237 forms a passage connecting the water receiving groove 220 and an upper surface of the steam cover 230 to each other in the steam cover 230. Also, the water entrance guide surface 235 guides the flow of water so that the flow of water supplied through the upper surface of the steam cover 230 is guided toward the water entrance hole 237.

Preferably, the water entrance hole 237 may be disposed at a central side of the water entrance guide surface 235 in the left-right direction, and the water entrance guide surface 235 may be inclined to connect the cover main body part 231 and the water entrance hole 237 to each other. Accordingly, water supplied to the water entrance guide surface 235 may flow towards the water entrance hole 237 guided by the inclined surface formed by the water entrance guide surface 235 and then be supplied into the water receiving groove 220 through the water entrance hole 237.

The water supplied into the water receiving groove 220 as described above may be used as water for generating steam to be supplied in the cooking appliance.

For example, when operation of the cooking appliance begins in a state in which water is housed in the water receiving groove 220 and the tray 200 is inserted into the cooking compartment 105, heating of the tray 200 is performed by operation of at least one of the first heating part 400 and the second heating part 600.

When the tray 200 is heated in this way, the water housed in the water receiving groove 220 is heated and steam is generated. The steam generated inside the water receiving groove 220 may pass through the steam cover 230 through the steam holes 233 and be introduced into the cooking compartment 105. In this case, since the water receiving groove 220 is formed to extend in the left-right direction, and the plurality of steam holes 233 are evenly disposed inside the cooking compartment 105 in the left-right direction, steam may be evenly spread inside the cooking compartment 105. The steam may also be discharged through the water entrance hole 237 disposed at the center of the steam cover 230.

Since the steam is evenly spread inside the cooking compartment 105 as described above instead of being concentrated on any one portion of the cooking compartment 105, the steam may be evenly supplied to the entire food which is an object to be cooked. In this way, the cooking appliance of the present embodiment may provide a cooking function which allows moisture to be effectively maintained in the food by the steam evenly supplied to the inside of the cooking compartment 105.

Also, since the steam cover 230 is provided to be separable from the tray 200, the inside of the water receiving groove 220 may be easily washed, and, when necessary, only the steam cover 230 may be replaced easily and promptly. Therefore, it is possible to provide a cooking appliance which facilitates hygiene care, and maintenance and repair.

Figure 26:
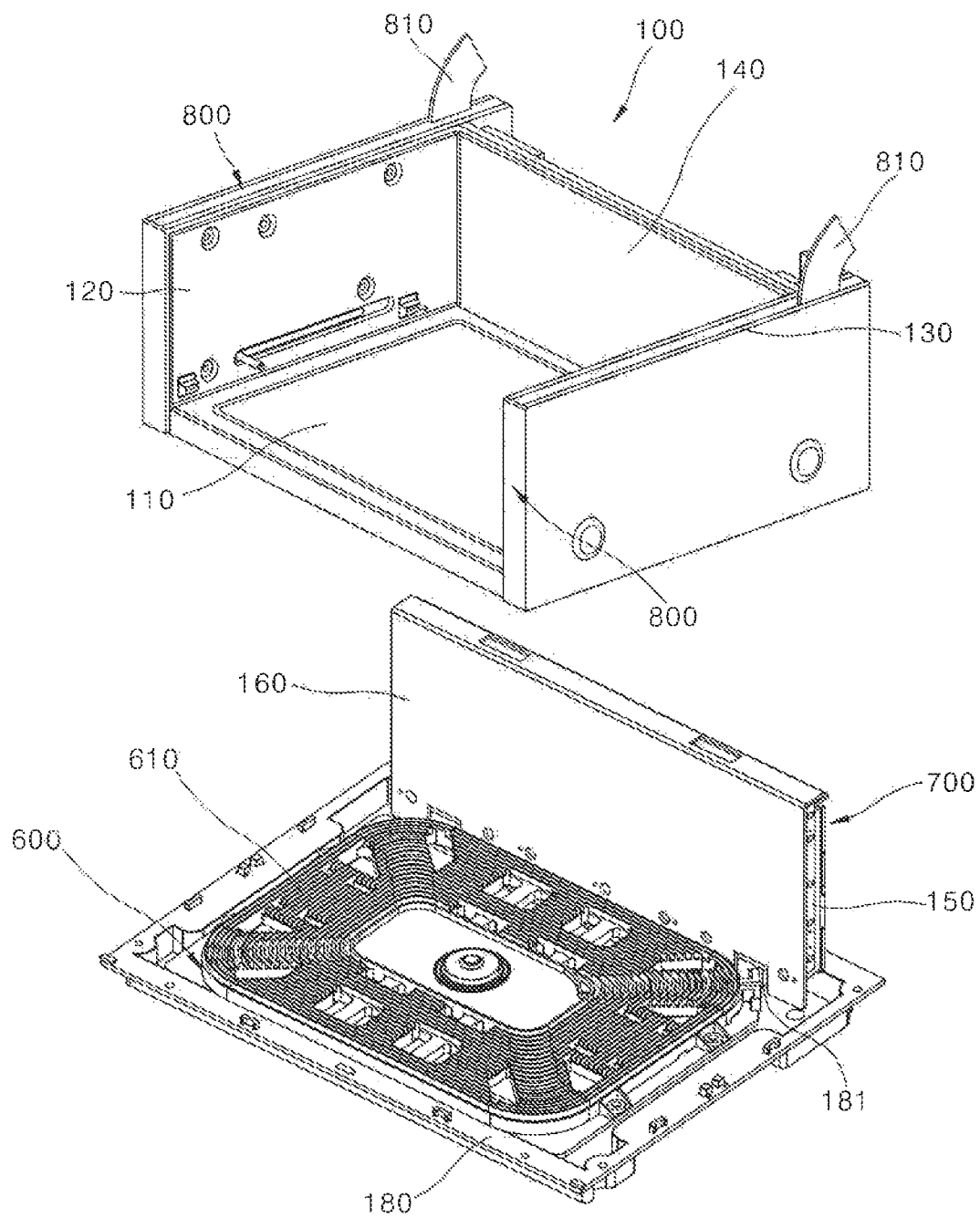
FIG. 26 is an exploded perspective view separately illustrating a housing and a second heating part according to an embodiment of the present disclosure.
Figure 27:
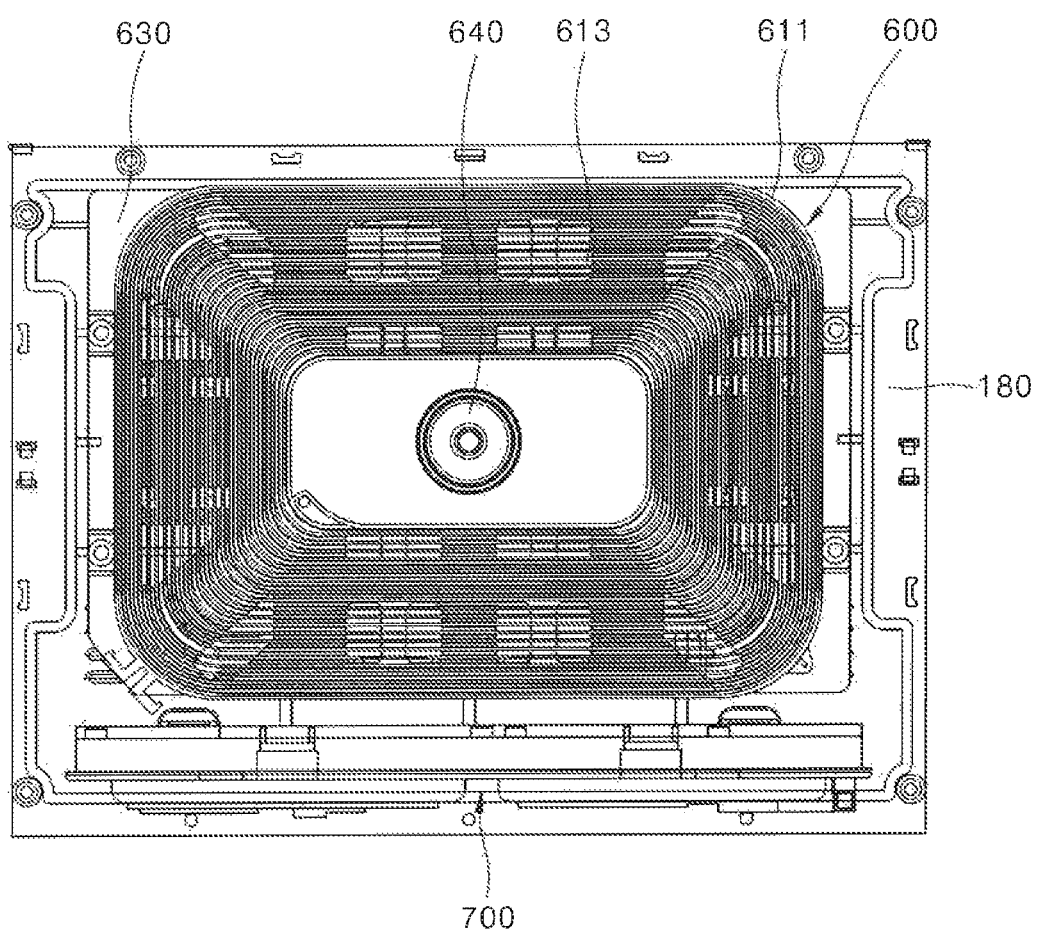
FIG. 27 is a plan view illustrating the second heating part illustrated in FIG. 26.
Figure 28:
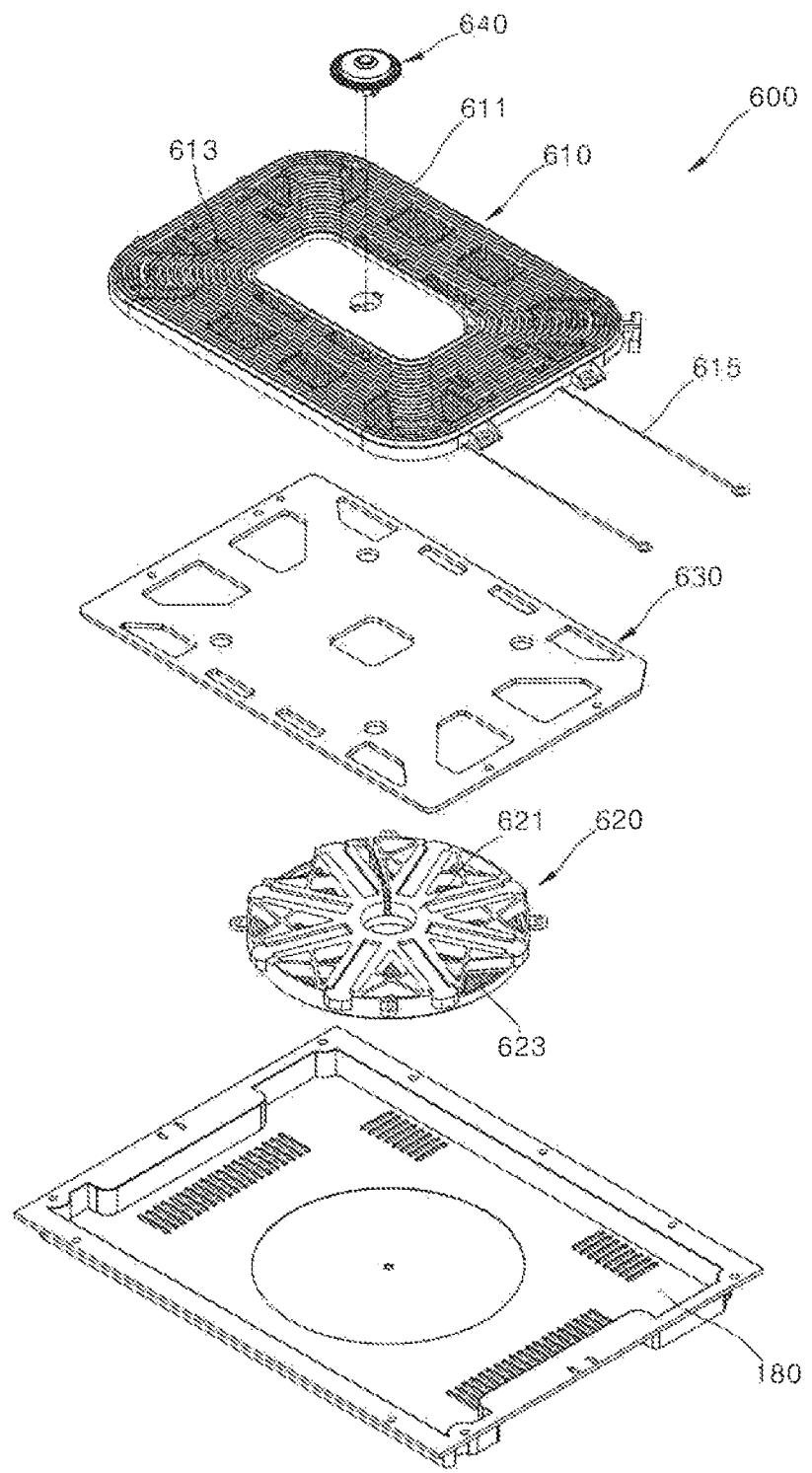
FIG. 28 is an exploded perspective view separately illustrating the second heating part illustrated in FIG. 26, a receiver coil, and an electromagnetic shielding plate.
Figure 29:
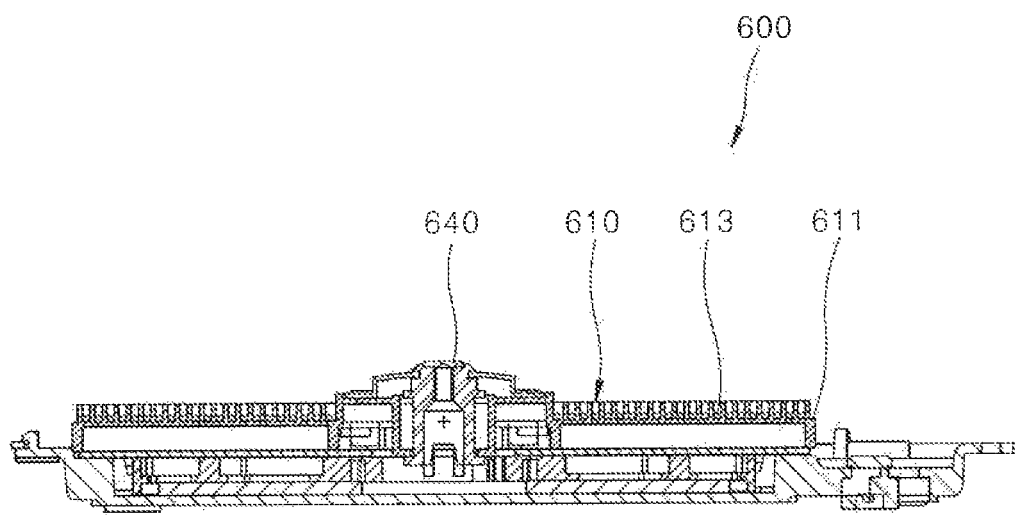
FIG. 29 is a cross-sectional view illustrating a coupled state among the second heating part illustrated in FIG. 26, a temperature sensor, the receiver coil, and the electromagnetic shielding plate.

FIG. 26 is an exploded perspective view separately illustrating a housing and a second heating part according to an embodiment of the present disclosure, and FIG. 27 is a plan view illustrating the second heating part illustrated in FIG. 26. FIG. 28 is an exploded perspective view separately illustrating the second heating part illustrated in FIG. 26, a receiver coil, and an electromagnetic shielding plate. FIG. 29 is a cross-sectional view illustrating a coupled state among the second heating part illustrated in FIG. 26, a temperature sensor, a receiving coil, and the electromagnetic shielding plate. FIG. 30 is a rear view illustrating a second control board illustrated in FIG. 26.

Referring to FIG. 3 and FIGS. 26 and 27, the second heating part 600 is disposed at the lower portion of the tray 200. The second heating part 600 is installed at the lower portion of the bottom surface 110 of the housing 100 and is provided in the form of a heating part which heats the tray 200 using a heating method different from that of the first heating part 400, e.g., an induction heating part. The induction heating part may a working coil 610 installed at the lower portion of the bottom surface 110 of the housing 100 and may induce heating of the tray 200 from the lower portion of the tray 200.

The working coil 610 includes a coil installation base 611. In the present embodiment, the coil installation base 611 is illustrated as being formed in a quadrilateral shape similar to the shape of the tray 200. This is a result of designing the size and shape of the working coil 610 to be similar to those of the tray 200 so that the entire region of the tray 200 may be heated by the working coil 610.

As illustrated in FIGS. 28 and 29, the coil installation base 611 has a spiral groove, in which a coil 613 may be installed. The coil 613 is housed in the spiral groove and fixed by being densely wound at an upper portion of the coil installation base 611. A coil connection wiring 615 connected to a coil control printed circuit board (PCB) for controlling the coil 613 is provided at an end portion of the coil 613.

Further, the second heating part 600 may further include a receiver coil 620. The receiver coil 620 is an element provided to receive wirelessly-transmitted power and is disposed at a lower portion of the second heating part 600. Also, a base 180 is disposed at a lower portion of the receiver coil 620. The base 180 is coupled to the lower portion of the bottom surface 110 of the housing 100 and supports the working coil 610, the receiver coil 620, and the like from the lower portion of the receiver coil 620 while forming an exterior of the bottom surface of the cooking appliance.

Like the working coil 610, the receiver coil 620 may include a coil installation base 621 and a coil 623. Unlike the coil installation base 611 of the working coil 610, the coil installation base 621 of the receiver coil 620 is formed in a substantially circular shape. This is a result of designing the shape of the receiver coil 620 to be similar to the shape of a working coil of an induction heating part provided at a cooktop.

According to the present embodiment, the receiver coil 620 is provided to be able to receive power from an induction heating part of another cooking appliance that is separately provided from the cooking appliance of the present embodiment.

For example, the cooking appliance of the present embodiment may be used while being placed on a cooktop. In this case, power required for operation of the cooking appliance may be received from an induction heating part of the cooktop.

For example, when the working coil of the cooktop and the cooking appliance of the present embodiment are operated together while the cooking appliance of the present embodiment is placed on the cooktop, power supplied through the cooktop may be transmitted to the receiver coil 620.

In this case, a current is induced towards the receiver coil 620 through a magnetic field which changes in the working coil of the cooktop due to magnetic induction phenomenon. In this way, power supplied through the cooktop may be transmitted to the receiver coil 620. In this process, in order to improve power reception efficiency of the receiver coil 620, the cooking appliance of the present embodiment may be placed on the cooktop such that the position of the receiver coil 620 overlaps with the position of the working coil provided in the induction heating part of the cooktop in the up-down direction.

Further, the induction heating part may further include an electromagnetic shielding plate 630 disposed between the working coil 610 and the receiver coil 620. The electromagnetic shielding plate 630 may be provided in the form of a metal plate. The electromagnetic shielding plate 630 is disposed between the working coil 610 and the receiver coil 620 and serves to minimize an influence of electromagnetic interference (EMI) due to the working coil 610 on the receiver coil 620 or an influence of EMI due to the receiver coil 620 on the working coil 610.

The cooking appliance of the present embodiment including the receiver coil 620 may be operated by wirelessly receiving power from the induction heating part of the cooktop. Since the cooking appliance does not require untidy power cables, the cooking appliance may be provided with a simple and neat exterior, and may be operated by wirelessly receiving power just by being placed on the cooktop, and thus the user's satisfaction may be further improved.

As illustrated in FIGS. 26, 27, and 30, the receiver coil 620 is electrically connected to the second control board 700 disposed behind the working coil 610 and the receiver coil 620. The power wirelessly transmitted from the working coil of the cooktop to the receiver coil 620 is transmitted to the second control board 700 electrically connected to the receiver coil 620.

According to the present embodiment, the inner space at the lower portion of the bottom surface 110 of the housing 100 and the inner space at the rear of the back surface 140 of the housing 100 are connected to each other. The working coil 610 of the induction heating part disposed at the lower portion of the bottom surface 110 of the housing 100 and the second control board 700 disposed at the rear of the back surface 140 of the housing 100 may be electrically connected to each other by a cable. The cable connects the working coil 610 and the second control board 700 through the inner space at the lower portion of the bottom surface 110 of the housing 100 and the inner space at the rear of the back surface 140 of the housing 100 which are connected to each other.

A power processing part provided at the second control board 700 supplies power required for operation of the induction heating part and the like of the second heating part 600. The power processing part is connected to the receiver coil 620 and receives power from the receiver coil 620 and processes the received power to a form suitable for use in the second heating part 600 and the like. The power processing part may include a noise filter PCB 710, and a coil control PCB 720 for controlling operation of the working coil 610 may be provided at the second control board 700.

The noise filter PCB 710 serves to remove noise from power to be supplied to the working coil 610, and the coil control PCB 720 controls the operation of the working coil 610. A chip for controlling the operation of the working coil 610, e.g., an insulated gate bipolar transistor (IGBT) chip 725, may be mounted on the coil control PCB 720.

The IGBT chip 725 is a kind of high heat generation chip that may require temperature management. When the IGBT chip 725 is overheated to a predetermined temperature or more, the IGBT chip 725 is unable to control the working coil 610.

In consideration of such aspect, a second cooling fan 730 is installed at the second control board 700. The second cooling fan 730 may be a sirocco fan which sucks air from an outside environment of the housing 100 and discharges the air toward the IGBT chip 725.

The second cooling fan 730 may be disposed at the side of the IGBT chip 725 and may suck air from the rear side of the housing 100 and discharge the air sideward toward the IGBT chip 725.

The air introduced into the space portion at the rear of the back surface of the housing 100 through the second cooling fan 730 may first come into contact with the IGBT chip 725 and a heat sink 726 for cooling the IGBT chip 725, cool the IGBT chip 725 and the heat sink 726, cool a portion of the noise filter PCB 710, and then be discharged to the outside environment.

Meanwhile, as illustrated in FIGS. 26 to 29, the second heating part 600 of the present embodiment may further include a temperature measurement module 640. The temperature measurement module 640 is provided to measure a temperature of the tray or a temperature of the inside of the cooking compartment 105 in which the tray is disposed.

The temperature measurement module 640 may be disposed at the center of the working coil 610. Specifically, the temperature measurement module 640 may be disposed at a portion where the coil 613 is not disposed on the coil installation base 611, e.g., a central portion of the coil installation base 611.

The temperature measurement module 640 may be fitted and coupled to the working coil 610 via a through-hole formed in the central portion of the coil installation base 611. Also, the temperature measurement module 640 installed in this way may include a temperature sensor such as a thermistor and may be disposed at the lower portion of the bottom surface 110 of the housing 100 and measure the temperature of the tray or the temperature of the inside of the cooking compartment 105 in which the tray is disposed.

Referring to FIG. 3 and FIGS. 26 to 30, the hinge assemblies 800, the second heating part 600, and the second control board 700 are disposed in the housing 100.

The cooking compartment 105 may be formed inside the housing 100, and the tray 200 may be installed in the cooking compartment so as to be withdrawable therefrom. The second heating part 600 for heating the tray 200 is disposed at the lower portion of the housing 100. Also, the hinge assembly 800 which rotatably supports the door 300 is disposed at each side portions of the housing 100.

The hinge assemblies 800 are disposed at both side portions of the housing 100 in order to stably support the door 300 from both sides of the door 300. Also, the hinge assemblies 800 interlock with rotation of the door 300 and causes the tray 200 to be withdrawn or inserted. To allow the hinge assemblies 800 to be coupled to the tray 200 so that the hinge assemblies 800 may move the tray 200 in the front-rear direction, the hinge assemblies 800 are disposed at both side portions of the housing 100.

That is, the hinge assemblies 800 is disposed at both side portions of the housing 100 for the hinge assemblies 800 to be coupled to the tray 200 so that the hinge assemblies 800 may stably support the door 300 and move the tray 200 in the front-rear direction.

Further, since the upper surface and the front surface of the housing 100 are open and the second heating part 600 is installed at the lower portion of the housing 100, the hinge assemblies 800 are inevitably disposed at the rear or both side portions of the housing 100. Due to the above-described reasons, in many ways, it is advantageous for the hinge assemblies 800 to be disposed at both side portions of the housing 100.

The receiver coil 620 is disposed at the lower portion of the housing 100, more specifically, at the lower portion of the second heating part 600. Since the receiver coil 620 is disposed at a position most adjacent to a target of wireless power transmission, e.g., the working coil of the cooktop, the receiver coil 620 may be disposed at the lower portion of the housing 100.

When the receiver coil 620 is disposed at the lower portion of the housing 100 together with the working coil 610 of the second heating part 600 as described above, the EMI of the working coil 610 or the receiver coil 620 may affect each other. In consideration of such an aspect, the electromagnetic shielding plate 630 may be disposed between the working coil 610 and the receiver coil 620.

Since the second control board 700 is an element closely related to power reception through the receiver coil 620 and the operation of the working coil 610, the second control board 700 may be disposed at a position adjacent to the receiver coil 620 and the working coil 610.

Since the second heating part 600 and the receiver coil 620 are disposed at the lower portion of the housing 100, and the hinge assemblies 800 are disposed at both side portions of the housing 100, the rear of the housing 100 may be the most suitable position for arrangement of the second control board 700.

In consideration of such aspect, the second control board 700 may be installed in a space at the rear of the back surface 140 of the housing 100. The second control board 700 installed in this way may be disposed at a position very close to the working coil 610 and the receiver coil 620. Accordingly, wires for connecting the second control board 700, the working coil 610, and the receiver coil 620 may be simply configured.

Also, the position of the second control board 700 disposed at the rear of the housing 100 as described above is also close to the hinge assemblies 800. Accordingly, when configuring wires for connecting the second control board 700 and the elements disposed in the door 300, the wires may be easily concealed inside the hinge assemblies 800. There is an advantage in that it is possible to configure the wires in a neat and simple manner such that the wires are not easily exposed to the outside.

As described above, the second heating part 600 and the receiver coil 620, the hinge assemblies 800, and the second control board 700 are disposed at the lower portion of the housing 100, both side portions of the housing 100, and the rear of the housing 100, respectively. The elements are those suitable to be disposed in the housing 100 and are disposed at optimal positions that allow the elements to function optimally, have high structural stability, have neat and simple wiring configurations, and efficiently avoid interference therebetween.

Meanwhile, referring to FIGS. 5 and 9, the see-through window W, the first heating part 400, the input part 360, and the first control board 500 are disposed in the door 300. The elements are those more suitable to be disposed in the door 300 than in the housing 100 due to functions thereof. Also in consideration of an aspect that various other elements are already disposed in the housing 100 and thus it is difficult for other elements to be disposed in the housing 100, the see-through window W, the first heating part 400, the input part 360, and the first control board 500 are more suitable to be disposed in the door 300 than in the housing 100.

The see-through window W is disposed at the upper portion of the cooking appliance. In consideration of a characteristic of the cooking appliance provided in the form of a mini oven in that the cooking appliance is generally used at a position lower than a user's gaze, the see-through window W may be disposed at the upper portion of the cooking appliance rather than being disposed at the front of the cooking appliance.

The see-through window W is disposed at the upper surface of the door 300, more specifically, at the door upper surface part 310. In this case, the larger the size of the see-through window W, the more advantageous it is for securing the field of view for the inside of the cooking compartment 105. However, the size of the see-through window W may be set to a size that allows a space required for installation of the first heating part 400 and the cable mounting parts 340 and 345 to be secured in the door upper surface part 310.

Like the see-through window W, the first heating part 400 is disposed in the door upper surface part 310. This is a result of designing the first heating part 400 to be disposed at an upper portion facing the second heating part 600 with the tray 200 disposed therebetween. That is, the first heating part 400 is disposed on the door upper surface part 310 so as to be disposed higher than the tray 200.

The first heating part 400 installed in the door upper surface part 310 together with the see-through window W as described above may be disposed at a position at which the first heating part 400 is not exposed through the see-through window W when viewed from the top. When the first heating part 400 is disposed in a region exposed through the see-through window W, it is aesthetically not pleasing, a problem may occur in securing the field of view through the see-through window W, and a problem that the temperature of a portion of the see-through window W rises may also occur.

Also, in consideration of the shape of the door front surface part 350 having a rectangular shape in which a front-rear length is longer than a left-right length, the first heating part 400 may be disposed at the front outer side and the rear outer side of the see-through window W so that a length of the first heating part 400 may be increased accordingly, and improvement in thermal power of the first heating part 400 may be expected as much as the increase in the length of the first heating part 400.

In consideration of such aspects, the first heating part 400 is disposed at each of the front outer side and the rear outer side of the see-through window W. In this way, it may be advantageous to secure functional advantages such as maintaining aesthetics, maintaining a secured field of view, suppressing a temperature rise of the see-through window W, and improving thermal power of the first heating part 400.

Since the see-through window W and the first heating part 400 are disposed in the door upper surface part 310 as described above, most of the region of the door upper surface part 310 is occupied by the see-through window W and the first heating part 400. Also, the input part 360 and the first control board 500 are disposed in the door front surface part 350 instead of the door upper surface part 310.

In consideration of the state in which most of the region of the door upper surface part 310 is occupied by the see-through window W and the first heating part 400, it is not easy to secure a space for installing the input part 360 in the door upper surface part 310. Also, when the input part 360 is disposed in the door upper surface part 310, in the process of opening the door 300, a collision may occur between the input part 360 and an obstacle disposed at the upper portion of the cooking appliance, and there is a risk of damage of the input part 360. Particularly, when the input part 360 is provided in the form protruding from the door 300, the risk is even greater.

Also, the door upper surface part 310 in which the first heating part 400 is disposed is likely to have a higher temperature than the door front surface part 350. Considering that the input part 360 is an element held by the user's hand and manipulated, when the input part 360 is disposed in the door upper surface part 310, the possibility that the user will come into contact with a hot portion of the door upper surface part 310 in the process of manipulating the input part 360 may be increased. That is, when the input part 360 is disposed in the door upper surface part 310, a risk that the user will suffer an injury such as a burn in the process of manipulating the input part 360 may be increased.

In consideration of such aspect, the input part 360 is disposed in the door front surface part 350 instead of the door upper surface part 310. Since the input part 360 is disposed in the door front surface part 350, the user may safely and conveniently control the operation of the cooking appliance from the front of the cooking appliance.

In addition to the input part 360, the first control board 500 is also disposed in the door front surface part 350. Various elements and circuits related to reception of manipulation signals input via the input part 360, generation of control signals for controlling operations of the first heating part 400 and the second heating part 600, and the like may be provided in the first control board 500. Therefore, in particular, the first control board 500 may be electrically connected to the input part 360.

According to the present embodiment, like the input part 360, the first control board 500 is installed in the door front surface part 350 and disposed at a position very close to the input part 360. Therefore, connection between the input part 360 and the first control board 500 may be configured in the form in which the input part 360 is directly connected to the first control board 500, and, accordingly, a very simple and stable connection structure may be provided for the input part 360 and the first control board 500.

Also, since the first control board 500 is installed in the door front surface part 350 instead of the door upper surface part 310 in which the first heating part 400, which is a heat generating component, is disposed, the first control board 500 may be disposed at a position deviated, to some extent, from an influence of heat generated by the first heating part 400. In this way, since an influence of heat, which is generated during operation of the first heating part 400, on the first control board 500 may be reduced accordingly, and the stability and operational reliability of the cooking appliance may be further improved.

Figure 31:
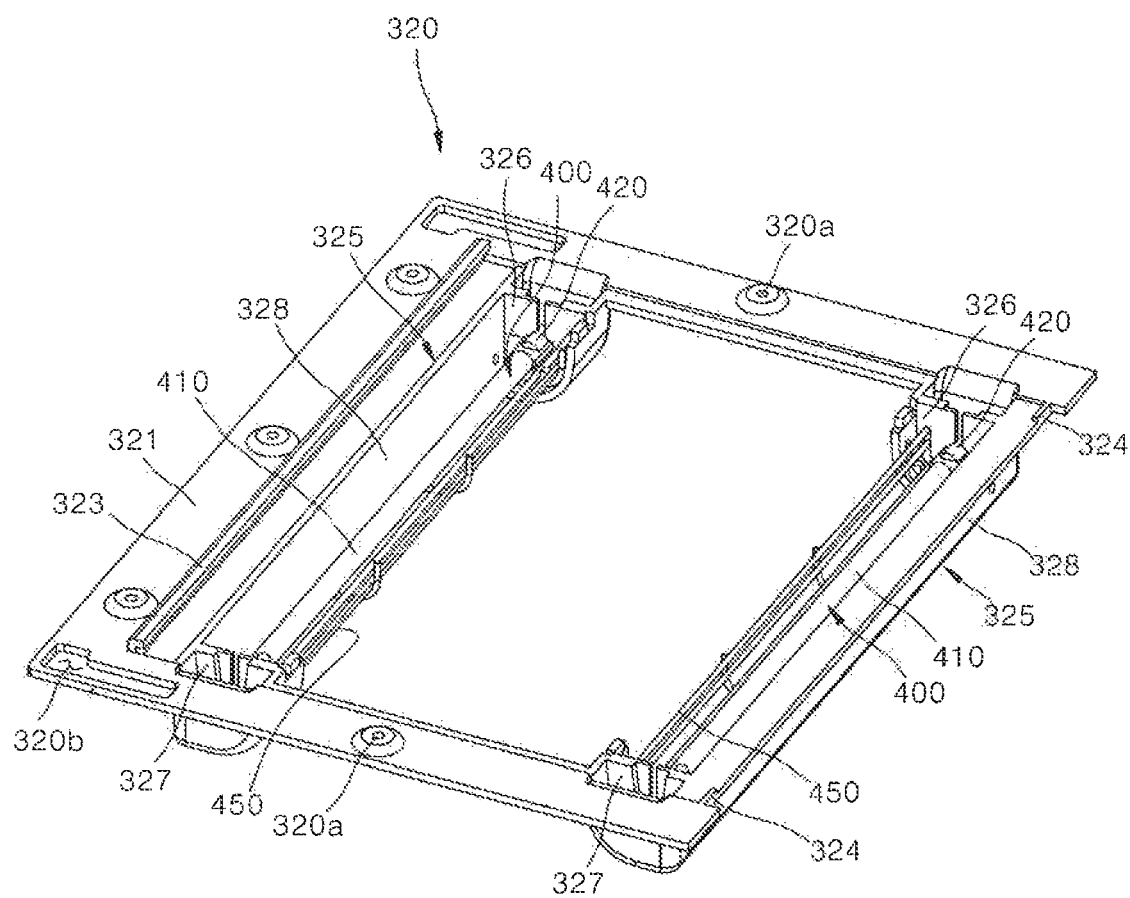
FIG. 31 is an exploded perspective view illustrating a door frame and elements installed in the door frame according to an embodiment of the present disclosure.
Figure 32:
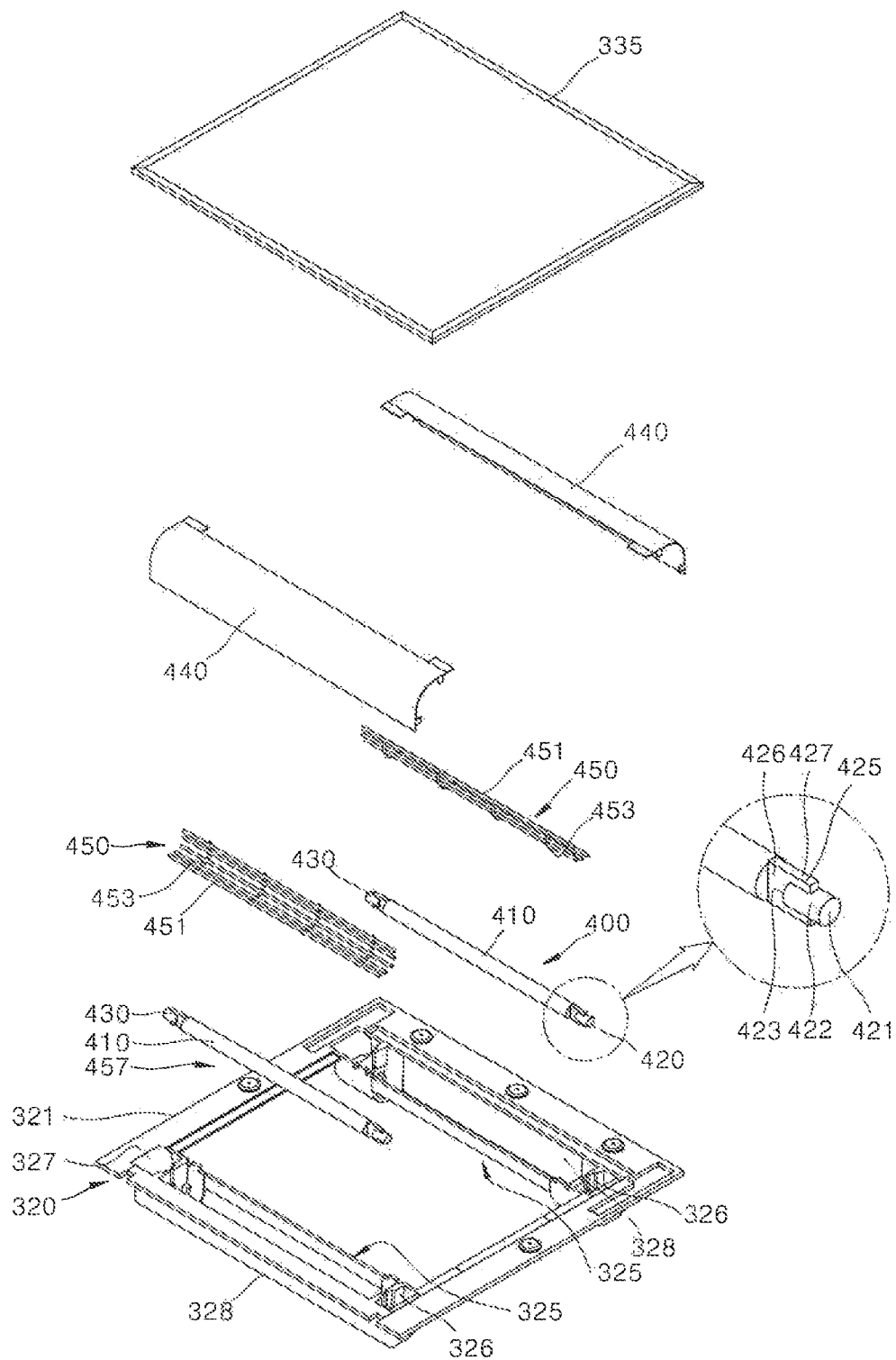
FIG. 32 is an exploded perspective view illustrating the door frame and the elements installed in the door frame, which are illustrated in FIG. 31.

FIG. 31 is an exploded perspective view illustrating a door frame and elements installed in the door frame according to an embodiment of the present disclosure, and FIG. 32 is an exploded perspective view illustrating the door frame and the elements installed in the door frame, which are illustrated in FIG. 31, in an exploded manner. Also, FIG. 33 is an enlarged view of portions of the door frame and the elements installed in the door frame, which are illustrated in FIG. 31, and FIG. 34 is a view illustrating a state in which a first heating part and a protective grille are removed from the door frame illustrated in FIG. 33.

Figure 33:
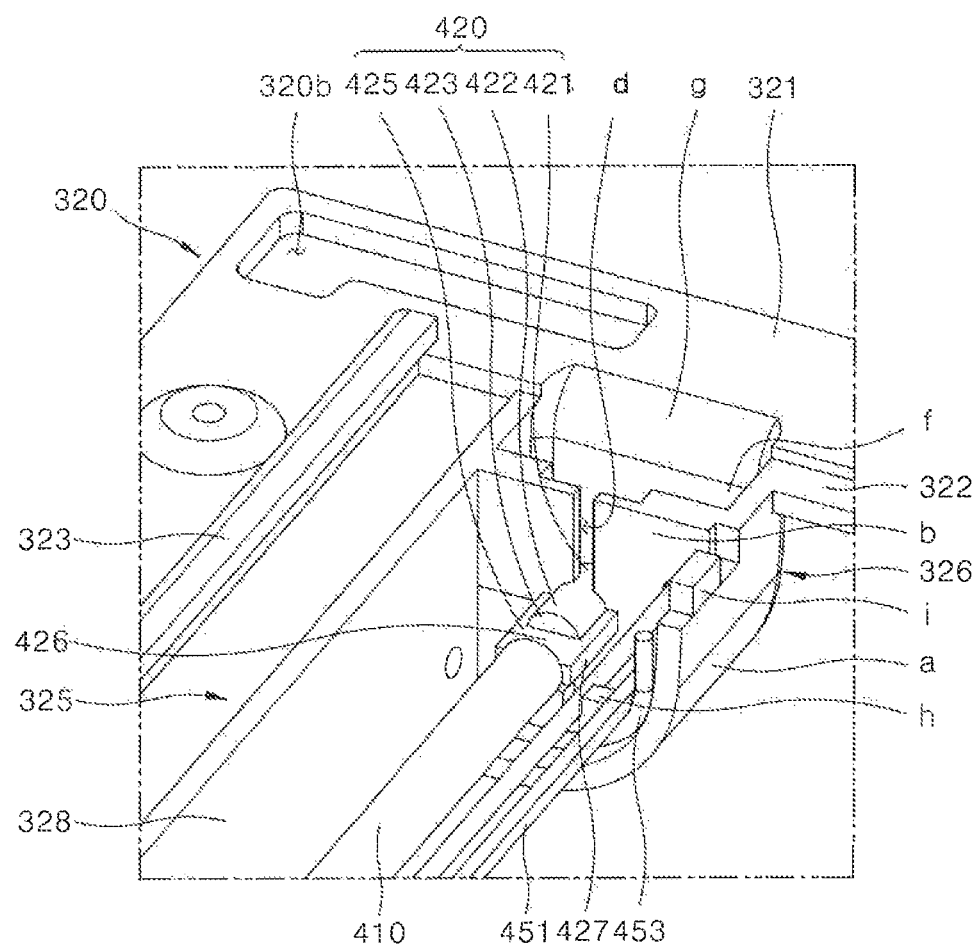
FIG. 33 is an enlarged view of portions of the door frame and the elements installed in the door frame, which are illustrated in FIG. 31.
Figure 34:
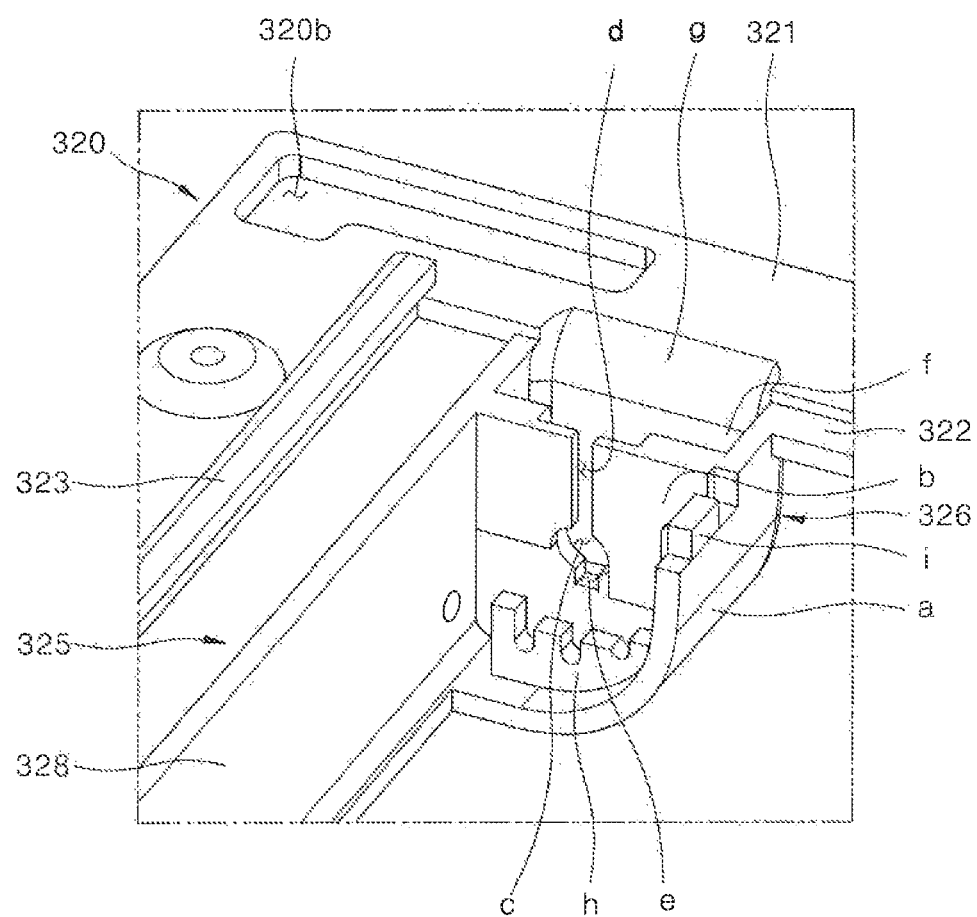
FIG. 34 is a view illustrating a state in which a first heating part and a protective grille are removed from the door frame illustrated in FIG. 33.

In FIGS. 31, 33, and 34, a glass and a reflector are not illustrated.

Referring to FIGS. 31 to 34, the door frame 320 is coupled to the door 300 in such a way that the door frame 320 covers the lower portion of the door upper surface part 310. The door frame 320 may be coupled to the door 300 in such a way that the door frame 320 supports the first heating part 400. Also, the first heating part 400 coupled to the door frame 320 may be maintained in a state of being disposed in the door 300, more specifically, at the lower portion of the door upper surface part 310.

The door frame 320 may include a coupling part 321 and a heater mounting part 325. The heater mounting part 325 may be provided in the form protruding from the coupling part 321, and the first heating part 400 may be coupled to the heater mounting part 325.

The coupling part 321 may be coupled to the door upper surface part 310 so that the heater mounting part 325 is supported by the door upper surface part 310. The coupling part 321 may be provided in the form of a square-shaped frame in which a through-hole is formed.

A seating surface 322 may be formed at an inner side surface of the coupling part 321 adjacent to the through-hole. The seating surface 322 may form a plane whose height is lower than that of an upper surface of the coupling part 321, and surrounding portions of edges of the glass 335 may be seated on the seating surface 322.

In this way, the glass 335 seated on the seating surface 322 may be disposed at upper portions of the heater mounting part 325 and the first heating part 400 installed at the heater mounting part 325 in such a way that the glass 335 covers the through-hole from the top. In this case, the seating surface 322 may form a plane whose height is lower than that of the upper surface of the coupling part 321. The seating surface 322 may form a plane whose height is lower than that of the coupling part 321 as much as a height substantially corresponding to a thickness of the glass 335. In this way, the glass 335 may be installed in the door frame 320 while being disposed at a position where the glass 335 does not protrude upward past the upper surface of the coupling part 321.

The seating surface 322 may be disposed at both sides of the through-hole in the left-right direction. The seating surface 322 may also be disposed at one side or the other side of the through-hole in the front-rear direction. In the present embodiment, the seating surface 322 is disposed at both sides of the through-hole in the left-right direction and the front side of the through-hole. Accordingly, the glass 335 may be stably installed in the door frame 320 such that surrounding portions of three edges of the glass 335 are supported by the seating surface 322.

Also, since movement of the glass 335 in the left-right direction is restricted by the inner side surface of the coupling part 321 surrounding the seating surface 322, an installation position of the glass 335 may be guided in the left-right direction, and shaking of the glass 335 may be suppressed in the left-right direction such that the installation of the glass 335 may be stably performed.

Further, a restricting rib 323 and a stopper 324 may be further provided in the door frame 320. The restricting rib 323 may be disposed at one side of the through-hole in the front-rear direction, and the stopper 324 may be disposed at the other side of the through-hole in the front-rear direction. In the present embodiment, the restricting rib 323 is illustrated as being disposed at the rear of the through-hole, and the stopper 324 is illustrated as being disposed at the front of the through-hole.

The restricting rib 323 may be formed to protrude from the coupling part 321. Specifically, the restricting rib 323 may be formed in a shape in which a portion protruding upward from the coupling part 3321 and a portion protruding toward the through-hole from the portion protruding upward are connected in an L-shape. The restricting rib 323 interferes with a rear edge and an upper surface of the glass 335 from the rear of the glass 335, thereby restricting rearward and upward movements of the glass 335.

The stopper 324 may be formed to protrude upward from the coupling part 321. The stopper 324 interferes with a front edge of the glass 335 from the front of the glass 335, thereby restricting forward movement of the glass 335.

That is, the glass 335 may be seated on the seating surface 322 such that the surrounding portions of the three edges of the glass 335 are supported by the seating surface 322 and both sides of the glass 335 in the left-right direction are supported by the inner side surface of the coupling part 321. Also, the forward movement of the glass 335 may be restricted by the stopper 324, and the rearward and upward movements of the glass may be restricted by the restricting rib 323. In this way, the glass 335 may be stably supported and installed in the door frame 320.

Meanwhile, the first heating part 400 may include a heating element 410, a first connecting end 420, and a second connecting end 430.

The heating element 410 corresponds to a portion emitting heat in the first heating part 400 provided in the form of an electric heater. The heating element 410 may be formed in the shape of a rod having a predetermined length.

The first connecting end 420 is disposed at an end of one side of the heating element 410 in the longitudinal direction, and the second connecting end 430 is disposed at an end of the other side of the heating element 410 in the longitudinal direction.

At least one of the first connecting end 420 and the second connecting end 430 includes a cylindrical part 421 and a key-shaped part 425. In the present embodiment, both the first connecting end 420 and the second connecting end 430 are illustrated as including the cylindrical part 421 and the key-shaped part 425.

The cylindrical part 421 is disposed at an end of the heating element 410 in the longitudinal direction. The cylindrical part 421 may be formed in a cylindrical shape in which an underside of a circular shape is disposed at the outermost end of the first heating part 410.

The key-shaped part 425 is disposed between the heating element 410 and the cylindrical part 421. That is, the key-shaped part 425 is disposed at both side ends of the heating element 410 in the longitudinal direction, and the cylindrical part 421 is disposed at the outermost side of the heating element 410 in the longitudinal direction.

The key-shaped part 425 may be formed in a flat hexahedral shape whose thickness is smaller than a diameter of the cylindrical part 421 and whose width is larger than the diameter of the cylindrical part 421. For example, a pair of quadrilateral surfaces 426 (hereinafter referred to as "first surfaces") parallel to a width direction of the key-shaped part 425 may be disposed to be spaced apart from each other in a thickness direction of the key-shaped part 425 and form two side surfaces of the key-shaped part 425. Also, two pairs of quadrilateral surfaces 427 (hereinafter referred to as "second surfaces") parallel to the thickness direction of the key-shaped part 425 may be disposed between the pair of first surfaces 426 and form an upper surface and a lower surface of the key-shaped part 425.

In this case, the first surface 426 may be formed of a quadrilateral surface having a side longer than the diameter of the cylindrical part 421, and the second surface 427 may be formed of a quadrilateral surface having a side shorter than the diameter of the cylindrical part 421.

Therefore, when the first connecting end 420 or the second connecting end 430 is viewed in the longitudinal direction of the first heating part 410, the cylindrical part 421 may protrude outward past the key-shaped part 425 in the radial direction of the cylindrical part 421 in most of the region, and the key-shaped part 425 may protrude outward past the cylindrical part 421 in the radial direction of the cylindrical part 421 only in a portion of the region.

The heater mounting part 325 is provided to fix the first connecting end 420 and the second connecting end 430 as described above. The heater mounting part 325 may include a first connecting end fixing part 326 which fixes the first connecting end 420 and a second connecting end fixing part 327 which fixes the second connecting end 430.

At least one of the first connecting end fixing part 326 and the second connecting end fixing part 327 may include a cover a and a support wall b. In the present embodiment, both the first connecting end fixing part 326 and the second connecting end fixing part 327 are illustrated as identically including the cover a and the support wall b.

The cover a is provided in the form of surrounding the surrounding portions of the connecting end from the outer side of the connecting end in the circumferential direction. The cover a may be formed in a curved shape surrounding a lower portion and one side portion of the connecting end and may be formed in a length corresponding to a length of the connecting end or in a length slightly longer than the length of the connecting end.

Further, the heater mounting part 325 may further include a shielding plate 328. The shielding plate 328 is disposed at a side farther from the center of the cooking compartment in the front-rear direction than the first heating part 400 and connects the first connecting end fixing part 326 and the second connecting end fixing part 327 to each other. The shielding plate 328 may be formed in the shape of a plate having a length extending in the longitudinal direction of the first heating part 400.

According to the present embodiment, the first connecting end fixing part 326 and the second connecting end fixing part 327 are disposed at both end portions of the first heating part 400 in the longitudinal direction. Also, the shielding plate 328 is disposed at a side farther from the center of the cooking compartment in the front-rear direction than the first heating part 400, and of a front side and a rear side of the first heating part 400.

Also, the cover a is disposed at a side closer to the center of the cooking compartment in the front-rear direction than the first heating part 400, and of the front side and the rear side of the first heating part 400. The cover a may surround the connecting end at a lower portion of the first heating part 400 and at the side closer to the center of the cooking compartment in the front-rear direction than the first heating part 400.

A lower side of the cover a is connected to the shielding plate 328. Accordingly, a space surrounded by the cover a and the shielding plate 328, which are connected in a U-shape, is formed around the connecting end.

The support wall b is disposed in the space surrounded by the cover a and the shielding plate 328 as described above. The support wall b may be formed to protrude towards the space from the cover a and the shielding plate 328. The support wall b formed in this way may divide the space surrounded by the cover a and the shielding plate 328 into an inner side space and an outer side space in the longitudinal direction of the first heating part 400. Also, the connecting end may be fitted and coupled to the support wall b.

A coupling hole c and a through-hole d may be formed in the support wall b.

The coupling hole c may be formed to pass through the support wall b. The coupling hole c may have a shape corresponding to the shape of an outer circumferential surface of the cylindrical part 421, e.g., a hollow circular shape. By the cylindrical part 421 being fitted into the coupling hole c having the above-described shape, the connecting end may be fitted and coupled to the support wall b.

The through-hole d may be formed to pass through the support wall b. The through-hole d may be formed by being cut out up to the coupling hole c from an upper side end portion of the support wall b. The through-hole d may be formed to pass through the support wall b while having a width corresponding to the length of the short side of the key-shaped part 425. In this way, the through-hole d may form a passage connecting the coupling hole c and an outer portion of the support wall b to each other.

The through-hole d may be formed in a width corresponding to the length of the short side of the key-shaped part 425, in other words, the thickness of the key-shaped part 425.

Any one of the first connecting end 420 and the second connecting end 430 may pass through the through-hole d and be inserted into the coupling hole c in a state in which the first heating part 400 takes a first posture. Here, the first posture is defined as a posture of the first heating part 400 in which the surface parallel to the thickness direction of the key-shaped part 425, that is, the second surface 427, is disposed parallel to a width direction of the through-hole d (see FIG. 36).

Further, an extension hole e may be further formed in the support wall b. The extension hole e may be formed to pass through the support wall b like the through-hole d. The extension hole e may be formed in the shape in which the through-hole d formed at an upper portion of the coupling hole c, and passes through the coupling hole c and extends to the lower portion of the coupling hole c.

When the connecting end takes the first posture, the key-shaped part 425 protrudes more upward and downward than the cylindrical part 421. Also, when the connecting end takes the first posture, for the cylindrical part 421 to reach a state in which the cylindrical part 421 is allowed to be inserted into the coupling hole c, the cylindrical part 421 and the coupling hole c should be disposed at the same height. However, for the cylindrical part 421 and the coupling hole c to be disposed at the same height, the portion of the key-shaped part 425 protruding downward should be disposed at a lower position than the coupling hole c.

To this end, the extension hole e may be formed at the lower portion of the coupling hole c, and the portion of the key-shaped part 425 protruding downward may be inserted into the extension hole e. That is, the extension hole e may provide a passage that allows the portion protruding downward of the key-shaped part 425, which is inserted into the coupling hole c to take the first posture, by passing through the coupling hole c downward.

Also, the connecting end may further include an extension part 422. The extension part 422 may be formed by the cylindrical part 421 extending towards the key-shaped part 425. The extension part 422 is formed to protrude outward in the thickness direction of the key-shaped part 425 from the first surface 426 of the key-shaped part 425 so that a step 423 is formed at a surface of the extension part 422 parallel to the width direction of the key-shaped part 425, that is, between the extension part 422 and the first surface 426. By having the extension part 422 formed in this way, a region in which the extension part 422 and the key-shaped part 425 overlap with each other is formed in a portion of the key-shaped part 425 adjacent to the cylindrical part 421.

In this region, the extension part 422 protrudes further in the thickness direction of the key-shaped part 425 than the first surface 426 of the key-shaped part 425, and the second surface 427 of the key-shaped part 425 protrudes further in the width direction of the key-shaped part 425 than the extension part 422.

Since the extension part 422 is formed as described above, a strength of a coupling portion between the cylindrical part 421 and the key-shaped part 425 may be further reinforced. When the extension part 422 is not present, the coupling portion between the cylindrical part 421 and the key-shaped part 425 would be limited to an end portion of a side surface of the key-shaped part 425. However, since the extension part 422 is formed at the connecting end, the coupling portion between the cylindrical part 421 and the key-shaped part 425 may extend to the point where the extension part 422 and the key-shaped part 425 overlap with each other, and thus the strength of the coupling portion between the cylindrical part 421 and the key-shaped part 425 may be further reinforced.

Also, the step 423 formed due to the extension part 422 may serve to guide a position at which the key-shaped part 425 is inserted into the through-hole d when the connecting end and the support wall b are fitted and coupled to each other. This will be described in detail below.

Meanwhile, each of the first connecting end fixing part 326 and the second connecting end fixing part 327 may further include an outer wall f. The outer wall f may be disposed at an outer side of each support wall b in a longitudinal direction of the heating element 410 and may be connected to the inner side surface of the coupling part 321.

The outer wall f forms the outermost side wall of each of the first connecting end fixing part 326 and the second connecting end fixing part 327 in the longitudinal direction of the heating element 410.

A space surrounded by the cover a, the support wall b, the outer wall f, and the shielding plate 328 is formed in each of the first connecting end fixing part 326 and the second connecting end fixing part 327. The corresponding space is a space whose side portions are surrounded by the cover a, the support wall b, the outer wall f, and the shielding plate 328 and whose lower portion is surrounded by the cover a. At least a portion of the cylindrical part 421 at a fixing end fixed to the first connecting end fixing part 326 or the second connecting end fixing part 327 is inserted into the space.

In the space, the cylindrical part 421 may be connected to a cable. The cable connected to the cylindrical part 421 may be a signal cable which transmits a control signal generated in the first control board 500 to the first heating part 400, may be a power cable which supplies power to the first heating part 400, or may be both the signal cable and the power cable.

Referring to FIG. 7, the signal cable and the power cable may be installed at the cable mounting parts 340 and 345 provided in the door upper surface part 310. Also, the coupling between the door upper surface part 310 and the door frame 320 is performed in a state in which the coupling part 321 covers the portions where the cable mounting parts 340 and 345 are disposed.

A plurality of fastening bosses may be disposed in the cable mounting parts 340 and 345. Also, a plurality of fastening holes 320a may be disposed in the door frame 320 so as to correspond to the fastening bosses. When portions where the fastening holes 320a and the fastening bosses are formed are fastened using a fastening member after matching the positions of the door upper surface part 310 and the door frame 320 so that the positions of the fastening holes 320a and the fastening bosses 341 and 346 match with each other, the coupling between the door upper surface part 310 and the door frame 320 may be performed. In this case, the portions where the cable mounting parts 340 and 345 are disposed are covered by the coupling part 321.

Although the glasses 330 and 335 do not cover the portions where the cable mounting parts 340 and 345 are disposed, the first heating part 400 and the heater mounting part 325 are disposed at a lower portion of a region covered by the glass 335. Therefore, for the cables installed at the cable mounting parts 340 and 345 to be connected to the connecting end, as illustrated in FIGS. 32 to 35, a passage should be formed between the region of the coupling part 321 not covered by the glass 335 and the region of the heater mounting part 325 covered by the glass 335.

In consideration of such aspect, in the present embodiment, a concave groove g is provided in a connecting portion between the outer wall f and the coupling part 321. At the connecting portion between the outer wall f and the coupling part 321, the concave groove g forms the upper surface of the coupling part 321, more specifically, a surface more concave than the seating surface 322 of the coupling part 321. The concave groove g formed in this way provides a gap through which the cable may pass to be disposed at a lower portion of the glass 335 seated on the seating surface 322, thereby allowing a passage through which the cable may pass to be disposed between the cable mounting parts 340 and 345 (see FIG. 7) and the space housing the cylindrical part 421 of the connecting end.

Meanwhile, a reference numeral 320b which has not been described above indicates a hole formed in the door frame 320 to pass through the door frame 320 to form, on the door frame 320, a passage for allowing the hinge part 810 (see FIG. 2) to pass through the door frame 320.

Meanwhile, the cooking appliance of the present embodiment may further include a reflector 440 and a protective grille 450.

The reflector 440 is provided as an element which reflects heat of the first heating part 400 so that the heat of the first heating part 400 may be concentrated on the tray 200 (see FIG. 2). In the present embodiment, the reflector 440 is illustrated as being provided in the shape in which a reflective surface forming a plane parallel to the shielding plate 328 and a reflective surface forming a plane parallel to the glass 335 are connected to each other in an L-shape. The reflector 440 may be coupled to the shielding plate 328, thereby being installed in the door frame 320 (see FIG. 8).

The reflector 440 installed as described above may reflect heat of the first heating part 400 while blocking the first heating part 400 and the shielding plate 328 from each other and blocking the first heating part 400 and the glass 335 from each other, thereby contributing to the concentration of the heat of the first heating part 400 on the tray 200.

The protective grille 450 is provided as an element for protecting the first heating part 400 while allowing the heat of the first heating part 400 to be transmitted to the tray 200. The protective grille 450 is disposed to be spaced apart from the shielding plate 238 with the first heating part 400 disposed therebetween.

The protective grille 450 may include a plurality of steel wires 451 and a plurality of fixing members 453. Each steel wire 451 has a length extending in the longitudinal direction of the first heating part 400 in such a way that each steel wire 451 has a length substantially corresponding to the length of the first heating part 400 or a length slightly longer than the length of the first heating part 400.

The plurality of steel wires 451 are arranged in the form surrounding the surrounding portion of the first heating part 400 from the outside of the first heating part 400 in the circumferential direction. The plurality of steel wires 451 may be disposed to be spaced a predetermined distance apart from each other in the circumferential direction of the first heating part 400.

According to the present embodiment, the surrounding portion of the first heating part 400 in the circumferential direction is surrounded by the reflector 440 and the protective grille 450. That is, one side of the first heating part 400 in the front-rear direction and an upper portion of the first heating part 400 are surrounded by the reflector 440, and the remaining portions of the first heating part 400, that is, the other side of the first heating part 400 in the front-rear direction and the lower portion of the first heating part 400 are surrounded by the protective grille 450.

Accordingly, the plurality of steel wires 451 are arranged in the form of surrounding the other side of the first heating part 400 in the front-rear direction and the lower portion of the first heating part 400 from the outer side of the first heating part 400 in the circumferential direction. Also, the fixing members 453 are formed in the form extending in the direction in which the steel wires 451 are arranged. The plurality of fixing members 453 may be disposed to be spaced a predetermined distance apart from each other in the longitudinal direction of the steel wires 451.

The protective grille 450 may be installed in the door frame 320 in such a way that both side end portions of the protective grille 450 in the longitudinal direction are respectively fixed to the first connecting end fixing part 326 and the second connecting end fixing part 327.

To this end, a grille fixing part may be provided in each of the first connecting end fixing part 326 and the second connecting end fixing part 327. The grille fixing part is provided as a means for fixing the steel wires 451 of the protective grille 450 to the heater mounting part 325. The grille fixing part may include a plurality of fixing ribs h.

The plurality of fixing ribs h are disposed to be spaced a predetermined distance apart from each other in the direction in which the plurality of steel wires 451 are arranged. Also, each fixing rib h is formed to protrude from the cover a towards the first heating part 400. Accordingly, a fixing groove may be formed between the fixing ribs h. The distance at which the fixing ribs h are spaced apart from each other may be determined to allow the fixing groove to be formed in a width corresponding to a thickness of the steel wire 451.

By fitting and fixing the steel wire 451 to each fixing groove formed between the plurality of fixing ribs h as described above, the protective grille 450 and the grille fixing part may be fitted and coupled to each other. In this way, a task of installing the protective grille 450 in the door frame 320 may be easily and promptly performed just by a simple task of fitting and fixing both side end portions of the protective grille 450 to the grille fixing part formed at each of the first connecting end fixing part 326 and the second connecting end fixing part 327.

Further, the plurality of fixing ribs h formed to protrude from the cover a as described above may also serve as reinforcing structures for improving the strength of the cover a.

FIGS. 35 to 39 are views for showing a process in which the first heating part is installed in the door frame.

Hereinafter, the process in which the first heating part 400 is installed in the door frame 320 will be described with reference to FIGS. 35 to 39.

Figure 35:
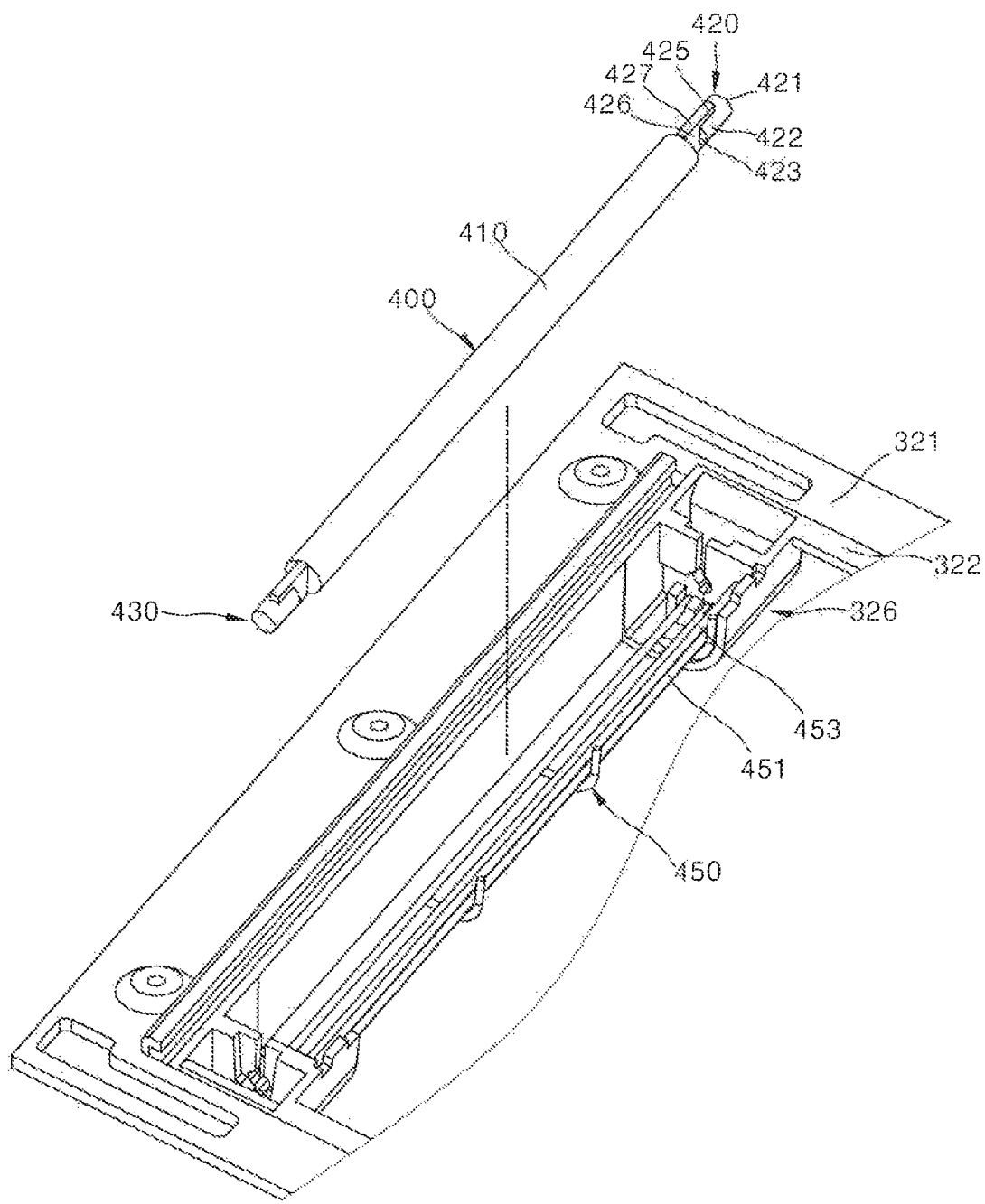
FIGS. 35 to 39 are views for showing a process in which the first heating part is installed in the door frame.

Referring to FIG. 35, installation of the protective grille 450 may be performed prior to installing the first heating part 400 in the door frame 320. The installation of the protective grille 450 may be performed in the form in which both side end portions of the protective griller 450 in the longitudinal direction are respectively fixed to the first connecting end fixing part 326 and the second connecting end fixing part 327. In this case, fixing of each end portion of the protective grille 450 may be performed in the form in which the steel wires 451 are fitted into the fixing grooves formed between the plurality of fixing ribs h so that the protective grille 450 and the grille fixing part are fitted and coupled to each other.

The installation of the first heating part 400 may be performed in a state in which the installation of the protective grille 450 is completed. For the first heating part 400 to be installed in the door frame 320, first, the first heating part 400 should take the first posture. In this case, both the first connecting end 420 and the second connecting end 430 reach a state in which the pair of first surfaces 426 face forward and downward and, of the two pairs of second surfaces 427, the pair of second surfaces 427 facing each other face upward and downward.

Figure 36:
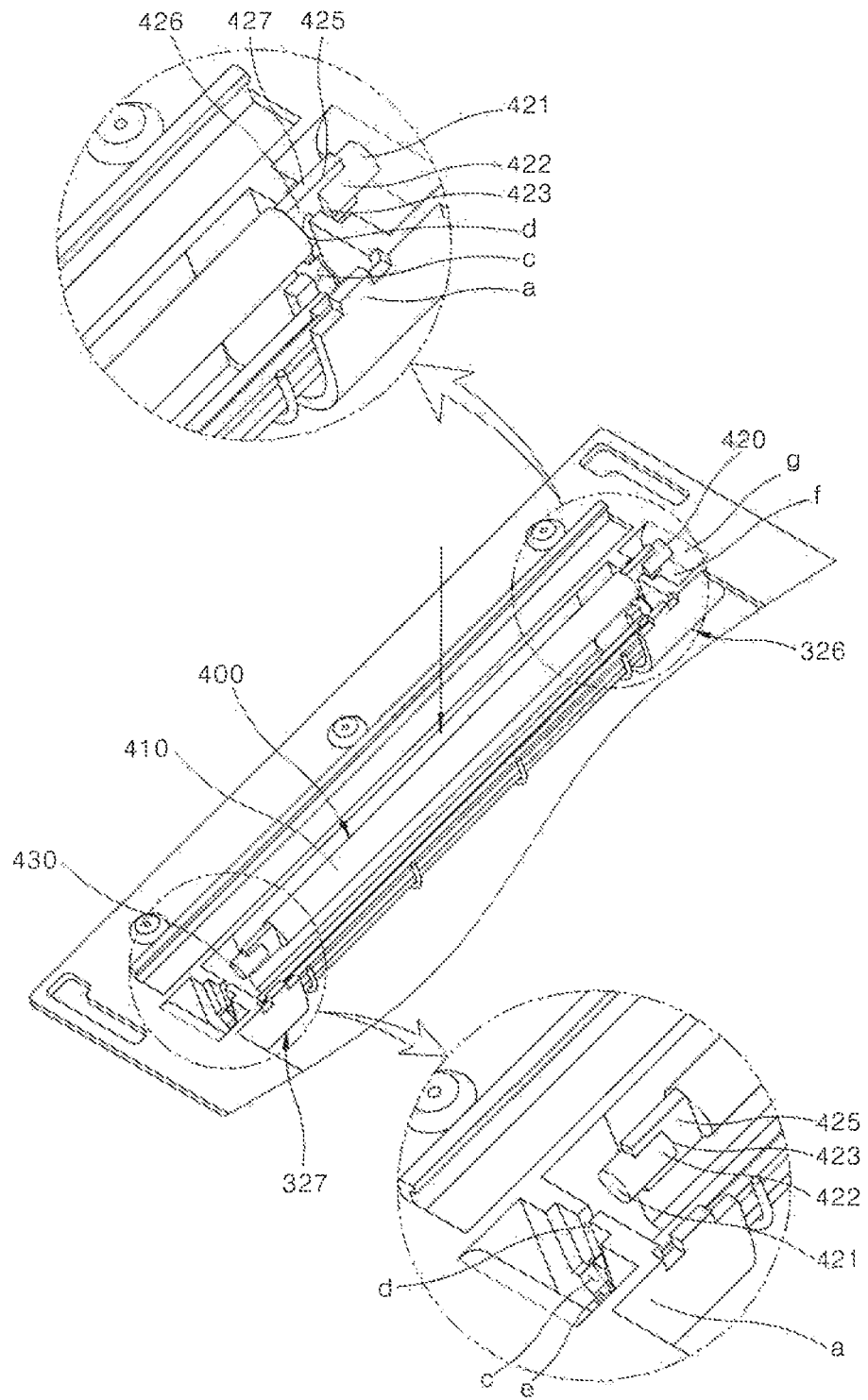

In this state, as illustrated in FIG. 36, any one of the first connecting end 420 and the second connecting end 430 is fitted into the support wall b. In the present embodiment, an example in which the first connecting end 420 is fitted to the support wall b provided in the first connecting end fixing part 326 is illustrated.

For the first connecting end 420 to be fitted into the support wall b, the first connecting end 420 should be inserted into the through-hole d formed in the support wall b. To this end, the first connecting end 420 is inserted into the through-hole d in a state in which the position of the key-shaped part 425 matches the position of the through-hole d. In this process, the key-shaped part 425 is inserted into the through-hole d through a cut-out upper end of the support wall b and passes through the through-hole d to be inserted into the coupling hole c.

In this case, the second connecting end 430 maintains a state of not being fitted into the second connecting end fixing part 327. That is, even when the first heating part 400 moves downward in the state in which the key-shaped part 425 of the first connecting end 420 is inserted into the coupling hole c, the second connecting end 430 is not fitted to the support wall b and maintains a state of being disposed outside of the support wall b.

In order to be fitted into the support wall b, the first connecting end 420 may be guided in the longitudinal direction to a position at which a region between a longitudinal end portion of the heating element 410 and the extension part 422 (hereinafter referred to as "depressed region") may overlap with the through-hole d. That is, in the first connecting end 420, a portion able to pass through the through-hole d is limited to the depressed region. The depressed region may be clearly distinguished due to the characteristic of being depressed between the longitudinal end portion of the heating element 410 and the extension part 422.

When a length of the depressed region is set to be substantially equal to the thickness of the support wall b or slightly longer than the thickness of the support wall b, the first heating part 400 may be easily guided to a position which allows the second connecting end 430 to maintain the state of not being fitted to the support wall b of the second connecting end fixing part 327 while the first connecting end 420 is fitted to the support wall b of the first connecting end fixing part 326.

To this end, a separation distance $L_1$ between the support wall b of the first connecting end fixing part 326 and the support wall b of the second connecting end fixing part 327 satisfies the following relational expression.

$$L_H = L_{H1} + 2L_{H2} + 2L_{H3}$$

$$L_1 = L_H - L_{H2} - L_{H3}$$

Here, $L_H$ is an entire length of the first heating part, $L_{H1}$ is a length of the heating element, $L_{H2}$ is a distance between the end of one side of the heating element and a step, and $L_{H3}$ is a distance between the step and the outermost end of the cylindrical part. Further, $L_{H2}$ may also be referred to as a length of the depressed region as well as the distance between the end of one side of the heating element and the step.

That is, the separation distance $L_1$ between the support wall b of the first connecting end fixing part 326 and the support wall b of the second connecting end fixing part 327 is set to a length equal to a length excluding one connecting end from the heating element 410 and the pair of connecting ends 420 and 430 constituting the first heating part 400.

When the separation distance $L_1$ between the support wall b of the first connecting end fixing part 326 and the support wall b of the second connecting end fixing part 327 is set as described above, when the depressed region of the first connecting end 420 is inserted into the through-hole d and fitted into the support wall b of the first connecting end fixing part 326, the second connecting end 430 maintains the state of not being fitted into the support wall b of the second connecting end fixing part 327.

Figure 37:
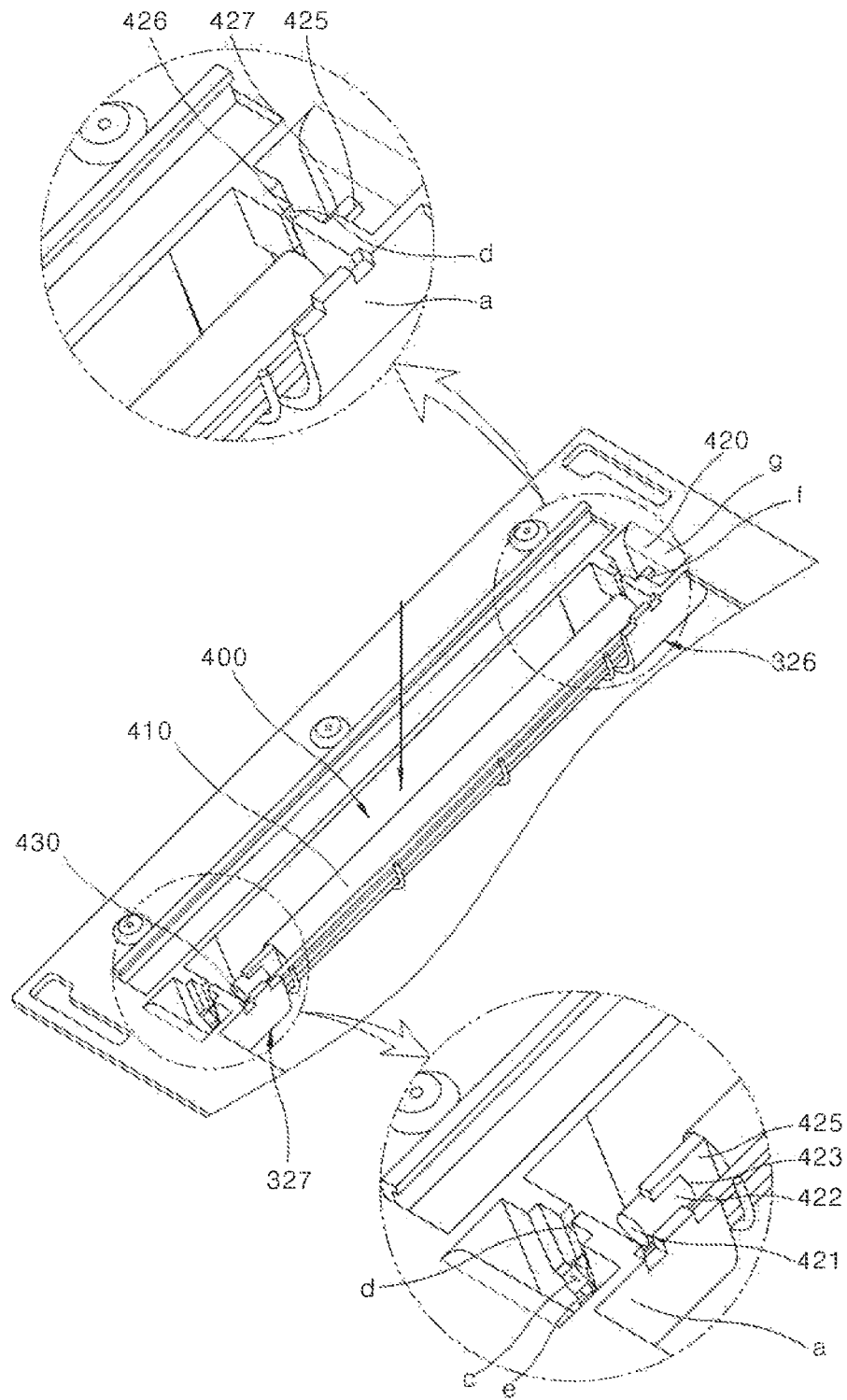

Meanwhile, as illustrated in FIG. 37, when the depressed region of the key-shaped part 425 passes through the through-hole d and is inserted into the coupling hole c, and thus the state in which the cylindrical part 421 is disposed at the same height as the coupling hole c is reached, the portion of the key-shaped part 425 protruding downward is inserted into the extension hole e, and the state in which the first connecting end 420 is unable to further move downward is reached.

Figure 38:
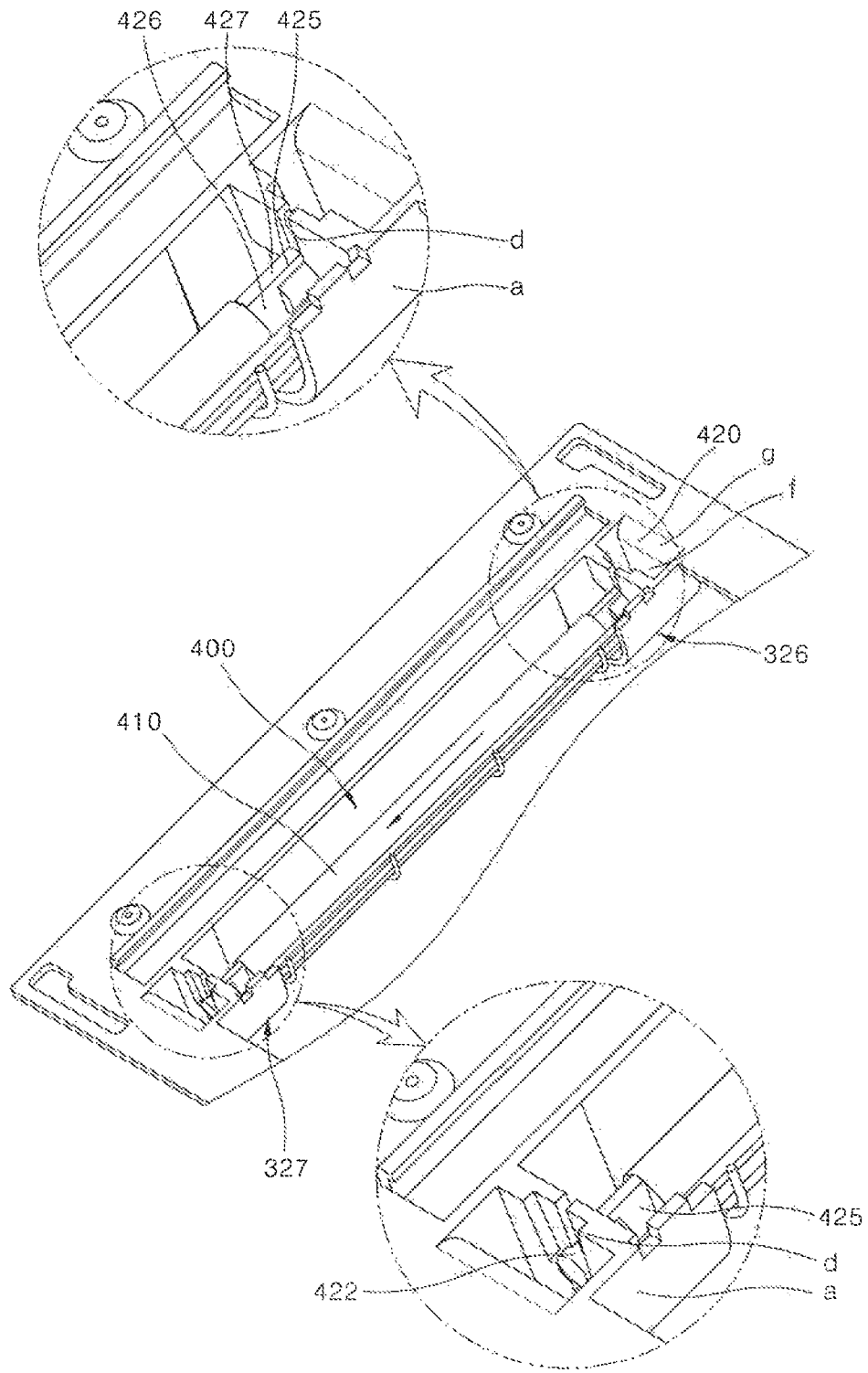

In this state, as illustrated in FIG. 38, the entire first heating part 400 is moved in the longitudinal direction of the first heating part 400 by moving the heating element 410 in a direction moving away from the support wall b of the first connecting end fixing part 326. Accordingly, the key-shaped part 425 of the first connecting end 420 is separated from the support wall b. That is, the key-shaped part 425 of the first connecting end 420 is deviated from the coupling hole c, the through-hole d, and the extension hole e, and instead, the cylindrical part 421 is inserted into the coupling hole c such that the cylindrical part 421 of the first connecting end 420 and the support wall b of the first connecting end fixing part 326 are fitted and coupled to each other.

At the same time, in the second connecting end fixing part 327, the cylindrical part 421 of the second connecting end 420 is inserted into the coupling hole c, and accordingly, the cylindrical part 421 of the second connecting end 430 and the support wall b of the second connecting end fixing part 327 are fitted and coupled to each other. In this case, the state in which the key-shaped part 425 of the second connecting end 420 is separated from the support wall b, that is, the state in which the key-shaped part 425 of the second connecting end 420 is not inserted into the coupling hole c, the through-hole d, and the extension hole e is also maintained in the second connecting end fixing part 327.

To this end, the separation distance $L_1$ between the support wall b of the first connecting end fixing part 326 and the support wall b of the second connecting end fixing part 327 satisfies the following relational expression.

$$L_1 = L_{H1} + 2L_{H4}$$

Here, $L_{H4}$ is a length of the key-shaped part 425.

That is, the separation distance $L_1$ between the support wall b of the first connecting end fixing part 326 and the support wall b of the second connecting end fixing part 327 is set to a length equal to a length including the heating element 410 and the pair of key-shaped parts 425.

When the separation distance $L_1$ between the support wall b of the first connecting end fixing part 326 and the support wall b of the second connecting end fixing part 327 are set as described above, when both the cylindrical part 421 of the first connecting end 420 and the cylindrical part 421 of the second connecting end 430 are fitted to the support walls b, both the key-shaped part 425 of the first connecting end 420 and the key-shaped part 425 of the second connecting end 430 maintain the state of not being fitted to the support walls b.

Figure 39:
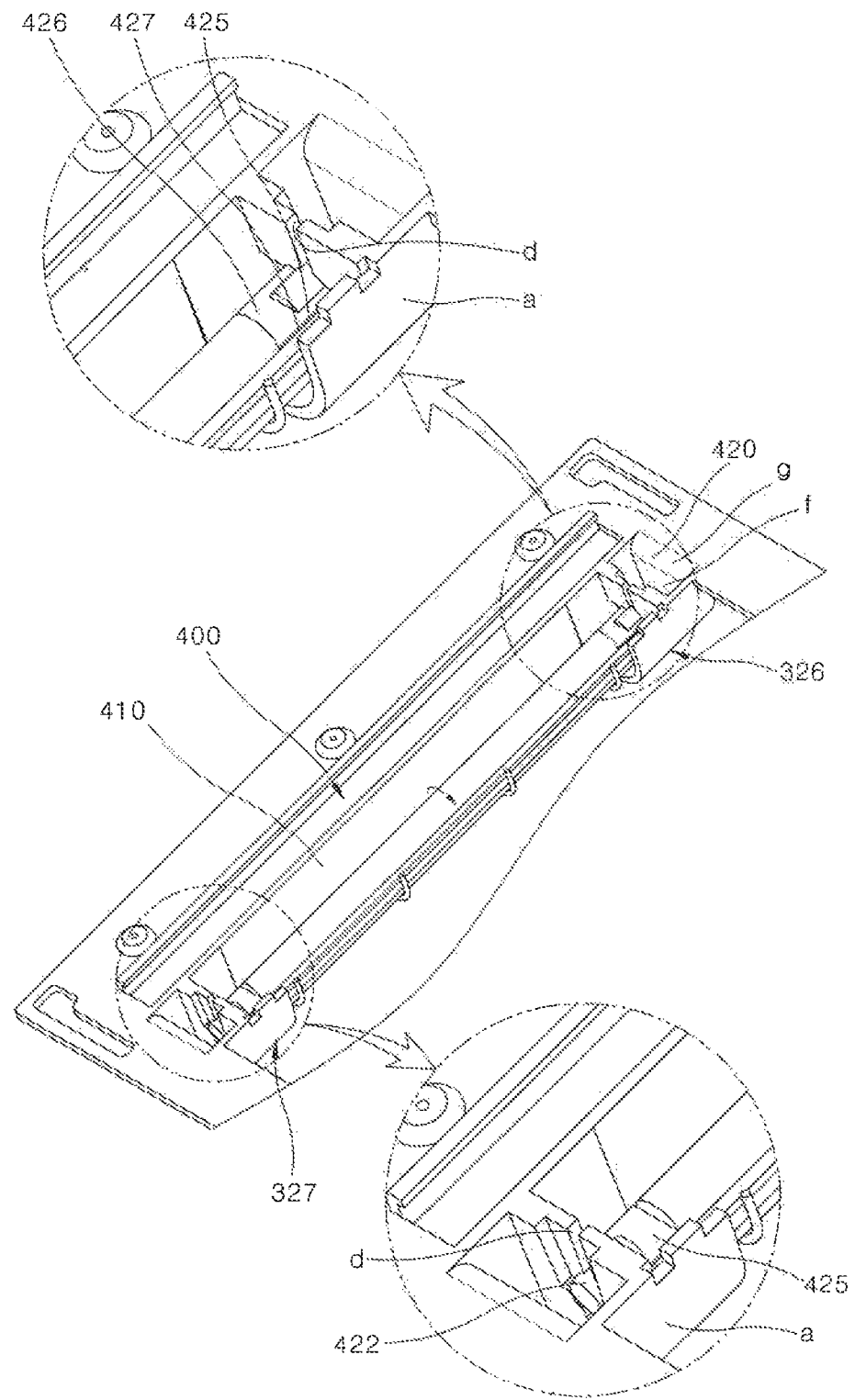

In this state, as illustrated in FIG. 39, when the posture of the first heating part 400 is changed to a second posture, the installation of the first heating part 400 is completed. Here, the second posture is defined as a posture of the first heating part 400 in which the first surface 426 of the key-shaped part 425 is disposed parallel to the width direction of the through-hole d. The second posture of the first heating part 400 may be a state reached by the first heating part 400 rotating 90° about the longitudinal axis of the first heating part 400 from the first posture.

As the posture of the first heating part 400 is changed as described above, the key-shaped part 425 disposed at each of both side end portions of the first heating part 400 may be adhered to the respective support wall b, and accordingly, the first heating part 400 may be fixed to the heater mounting part 325 in a state in which the movement of the first heating part 400 is restricted in the longitudinal direction.

This may correspond to the advantageous effect obtained by designing the shapes of the first heating part 400 and the heater mounting part 325 so that the separation distance $L_1$ between the support wall b of the first connecting end fixing part 420 and the support wall b of the second connecting end fixing part 430 satisfies the relational expression, $L_1 = L_{H1} + 2L_{H4}$.

Further, a separation distance $L_2$ between the support wall b and the outer wall f satisfies the following relational expression.

$$L_2 \geq L_{H3}$$

That is, the separation distance $L_2$ between the support wall b and the outer wall f is set to a length longer than a length between the step 423 and the outermost end of the cylindrical part 421.

When the separation distance $L_2$ between the support wall b and the outer wall f is set as described above, a space having a length corresponding to the separation distance $L_2$ is formed between the support wall b and the outer wall f. The extension part 422 and the cylindrical part 421 are inserted into the space formed between the support wall b and the outer wall f. Also, in the space, the connection between the cables and the connecting ends may be performed. That is, when the separation distance $L_2$ between the support wall b and the outer wall f is set as described above, sufficient space required for the insertion of the extension part 422 and the cylindrical part 421 and the connection between the cables and the connecting ends may be provided.

When the installation of the first heating part 400 is completed as described above, the installation of the reflector 440 may be performed. The installation of the reflector 440 may be performed in the form in which the reflector 440 is coupled to the shielding plate 328.

Then, when the glass 335 (see FIG. 31) is seated on the seating surface 332 of the door frame 320 and then fixed by the restricting rib 323 and the stopper 324, the installation of the glass 335 is completed.

The task of connecting the connecting ends and the cables may be performed before or after the process of installing the glass 335. Once all of these processes are completed, the door frame 320, the first heating part 400, the reflector 440, the protective grille 450, and the glass 335 may be provided as an integrally-assembled unit body. Also, when the door frame 320 which is integrally assembled with the first heating part 400, the reflector 440, the protective grille 450, and the glass 335 as described above is coupled to the door upper surface part 310 (see FIG. 31), the first heating part 400, the reflector 440, the protective grille 450, and the glass 335 may be assembled to the door 300 at once.

Although not illustrated, once the installation of the first heating part 400 and the task of connecting the connecting ends and the cables are completed, open upper portions of the first connecting end fixing part 326 and the second connecting end fixing part 327 (see FIG. 31) may be covered with caps so that the connecting ends are protected. For coupling between the caps and the first connecting end fixing part 326 and the second connecting end fixing part 327, a coupling protrusion i may be provided to protrude from an upper portion of the cover a.

The door frame 320 of the present embodiment having the above-described configuration may provide the following advantageous effects.

First, since the door frame 320 is coupled to the lower portion of the door upper surface part 310, the door frame 320 may cover the lower portion of the door upper surface part 310 so that the cable mounting parts 340 and 345 (see FIG. 7) disposed inside the door upper surface part 310 and the cables installed at the cable mounting parts 340 and 345 are not exposed to the outside.

The door frame 320 may be coupled to the lower portion of the door upper surface part 310 in the form in which, while the portions where the cable mounting parts 340 and 345 are disposed are covered by the coupling part 321, the door frame 320 is fastened to the cable mounting parts 340 and 345 using a fastening member. The door frame 320 coupled to the lower portion of the door upper surface part 310 in this way may cover the cable mounting parts 340 and 345 (see FIG. 7) disposed inside the door upper surface part 310 and the cables installed at the cable mounting parts 340 and 345 so that the cable mounting parts 340 and 345 and the cables are not exposed to the outside, and the door frame 320 may be easily separated from the door 300 when necessary. Since the door frame 320 may safely protect the components inside the door upper surface part 310 while being easily separable when necessary, the door frame 320 may contribute to allowing maintenance and repair tasks of the cooking appliance to be performed easily and promptly.

Second, the door frame 320 provides a frame in which the first heating part 400, the components related thereto, and the glass 335 may be assembled to a single unit body. In this way, the door frame 320 may contribute to allowing the components management and manufacturing management to be more efficiently performed.

In addition to the structures for fixing the glass 335 to the door frame 320, the structures for fixing the first heating part 400, the reflector 440, and the protective grille 450 to the door frame 320 are provided in the door frame 320.

Accordingly, the glass 335, the first heating part 400, the reflector 440, and the protective grille 450 may be provided as an integrally-assembled unit body coupled to the door frame 320, and the glass 335, the first heating part 400, the reflector 440, and the protective grille 450 may be assembled at once just by coupling the door frame 320 to the lower portion of the door upper surface part 310.

Third, since the door frame 320 provides structures that allow the first heating part 400 to be easily and promptly installed at the door frame 320, the door frame 320 may contribute to allowing the task of installing the first heating part 400 to be more efficiently performed.

According to the present embodiment, the installation of the first heating part 400 may be completed by a simple task in which one side end portion of the first heating part 400 is first fitted to any one of the first connecting end fixing part 326 and the second connecting end fixing part 327, the first heating part 400 is moved in the longitudinal direction thereof so that both side end portions of the first heating part 400 are respectively fitted to the first connecting end fixing part 326 and the second connecting end fixing part 327, and then the first heating part 400 is rotated.

In this case, since the first connecting end fixing part 326 and the second connecting end fixing part 327 are not provided to be directional, the installation of the first heating part 400 is possible without problems regardless of which of the first connecting end fixing part 326 and the second connecting end fixing part 327 is first fitted to the one side end portion of the first heating part 400.

In this way, by allowing the task of installing the first heating part 400 to be performed more efficiently, the door frame 320 may contribute to allowing maintenance and repair tasks performed for replacing the first heating part 400, as well as the task of manufacturing the cooking appliance, to be easily and promptly performed.

The present disclosure has been described above with reference to the embodiments illustrated in the drawings, but the embodiments are merely illustrative. Those of ordinary skill in the art to which the present disclosure pertains should understand that various modifications and other equivalent embodiments are possible from the above embodiments. Therefore, the actual technical scope of the present disclosure should be defined by the claims below.

What is claimed is:

1. A cooking appliance comprising:
a housing having a cooking compartment and including a bottom surface, both side surfaces, and a back surface, and having upper and front surfaces which are open;
a door that includes a door upper surface part that covers the upper surface of the housing and a door front surface part that is connected to a front side of the door upper surface part and covers the front surface of the housing, and rotatable about a rear side of the door upper surface part to open and close the upper and front surfaces of the housing;
a heating part; and
a door frame that supports the heating part and is coupled to the door,
wherein the door frame includes:
a heater mounting part to which the heating part is coupled; and
a coupling part that is coupled with the door upper surface part and supports the heater mounting part on the door upper surface part, wherein:
the heating part includes a heating element, a first connecting end disposed at an end of the heating element in a longitudinal direction, and a second connecting end disposed at an other end of the heating element in the longitudinal direction; and
the heater mounting part includes a first connecting end fixing part that fixes the first connecting end and a second connecting end fixing part that fixes the second connecting end,
wherein each of the first connecting end fixing part and the second connecting end fixing part includes:
a cover that surrounds an outer side of the respective first connecting end and second connecting end in a circumferential direction; and
a support wall which partitions a space formed by the cover into inner and outer spaces and, the first connecting end and second connecting end are fitted into the respective support wall, wherein:
the heating element is formed in a shape of a rod having a predetermined length;
each of the first connecting end and the second connecting end includes a cylindrical part that is formed in a cylindrical shape and is disposed at the respective end of the heating element in the longitudinal direction, and a key-shaped part that is disposed between the heating element and the respective cylindrical part and is formed in a flat hexahedral shape whose thickness is smaller than a diameter of the cylindrical part and whose width is larger than the diameter of the cylindrical part; and each support wall includes a coupling hole that is formed to pass through the support wall and is formed in a shape corresponding to a shape of an outer circumferential surface of the cylindrical part, and a through-hole that is formed to pass through the support wall and is formed as a passage that connects the coupling hole and an outer portion of the support wall to each other.

2. The cooking appliance according to claim 1, wherein:
the door frame covers a bottom portion of the door upper surface part; and
the heating part is installed on the door frame, and is disposed at the bottom portion of the door upper surface part.

3. The cooking appliance according to claim 1, wherein the through-hole of the support wall is formed with a width corresponding to the thickness of the key-shaped part.

4. The cooking appliance according to claim 3, wherein:
the heating part is moved in a first direction so that one of the first connecting end and the second connecting end passes through the through-hole and is inserted into the coupling hole of one support wall and takes a first posture, wherein the first posture is a posture in which a surface parallel to a thickness direction of the key-shaped part is disposed parallel to a width direction of the through-hole; and then
the heating part is moved in a second direction opposite to the first direction so that the other one of the first connecting end and the second connecting end passes through the through-hole and is inserted into the coupling hole of the other support wall and takes a second posture,
wherein the second posture is a posture in which the heating part has rotated by an angle about the longitudinal axis of the first heating part from the first posture.

5. The cooking appliance according to claim 3, wherein:
each of the cylindrical part further includes an extension part that is formed to extend toward the respective key-shaped part; and
the extension part is formed to protrude outward from a surface parallel to a width direction of the respective key-shaped part so that a step is formed on the surface parallel to the width direction of the respective key-shaped part.

6. The cooking appliance according to claim 5, wherein a separation distance ($L_1$) between the support wall of the first connecting end fixing part and the support wall of the second connecting end fixing part satisfies the following relational expression:

$$L_H = L_{H1} + 2L_{H2} + 2L_{H3}$$

$$L_1 = L_H - L_{H2} - L_{H3}$$

where $L_H$ is an entire length of the heating part, $L_{H1}$ is a length of the heating element, $L_{H2}$ is a distance between the end of one side of the heating element and the step, and $L_{H3}$ is a distance between the step and an outermost end of the cylindrical part.

7. The cooking appliance according to claim 6, wherein the separation distance ($L_1$) between the support wall of the first connecting end fixing part and the support wall of the second connecting end fixing part satisfies the following relational expression:

$$L_1 = L_{H1} + 2L_{H4}$$

where $L_{H4}$ is a length of the key-shaped part.

8. The cooking appliance according to claim 6, further comprising an outer wall disposed outside of each of the support wall in the longitudinal direction of the heating element, wherein a separation distance ($L_2$) between the support wall and the outer wall satisfies the following relational expression:

$$L_2 \geq L_{H3}.$$

9. The cooking appliance according to claim 8, wherein:

at least a part of each cylindrical part of the heating part are inserted into a space surrounded by the cover, the support wall, and an outer wall of the respective first connecting end fixing part and second connecting end fixing part;

a plurality of connecting portions, each outer wall is connected to the coupling part through a respective connecting portion; and a concave groove recessed from an upper surface of the coupling part is formed in the respective connecting portion.

10. A cooking appliance comprising:

a housing having a cooking compartment and including a bottom surface, both side surfaces, and a back surface, and having upper and front surfaces which are open;

a door that includes a door upper surface part that covers the upper surface of the housing and a door front surface part that is connected to a front side of the door upper surface part and covers the front surface of the housing, and rotatable about a rear side of the door upper surface part to open and close the upper and front surfaces of the housing;

a heating part; and a door frame that supports the heating part and is coupled to the door, wherein the door frame includes:

a heater mounting part to which the heating part is coupled; and a coupling part that is coupled with the door upper surface part and supports the heater mounting part on the door upper surface part, wherein:

the heating part includes a heating element, a first connecting end disposed at an end of the heating element in a longitudinal direction, and a second connecting end disposed at an other end of the heating element in the longitudinal direction; and the heater mounting part includes a first connecting end fixing part that fixes the first connecting end and a second connecting end fixing part that fixes the second connecting end, wherein each of the first connecting end fixing part and the second connecting end fixing part includes:

a cover that surrounds an outer side of the respective first connecting end and second connecting end in a circumferential direction; and a support wall which partitions a space formed by the cover into inner and outer spaces and, the first connecting end and second connecting end are fitted into the respective support wall, wherein the cooking appliance further comprises a shielding plate that is disposed at a side farther from a center of the cooking compartment in a front-rear direction than the heating part and connects the first connecting end fixing part and the second connecting end fixing part to each other.

11. The cooking appliance according to claim 10, further comprising a protective grille disposed to be spaced apart from the shielding plate with the heating part interposed therebetween.

12. The cooking appliance according to claim 11, wherein:

the protective grille includes a plurality of steel wires that extend in the longitudinal direction of the heating part, and a plurality of fixing members that extend in a direction in which the plurality of steel wires are arranged and fix the plurality of steel wires; and the plurality of steel wires are arranged to surround an outside of the heating part in a circumferential direction.

13. The cooking appliance according to claim 12, wherein:

each of the first connecting end fixing part and the second connecting end fixing part includes a grille fixing part that fixes the steel wires to the heater mounting part;

the grille fixing part includes a plurality of fixing ribs that are formed to protrude from the cover toward the heating part; and the plurality of steel wires are fitted into fixing grooves formed between the plurality of fixing ribs.

14. A cooking appliance comprising:

a housing having a cooking compartment and including a bottom surface, both side surfaces, and a back surface, and having upper and front surfaces which are open;

a door that includes a door upper surface part that covers the upper surface of the housing and a door front surface part that is connected to a front side of the door upper surface part and covers the front surface of the housing, and rotatable about a rear side of the door upper surface part to open and close the upper and front surfaces of the housing;

a heating part; and a door frame that supports the heating part and is coupled to the door, wherein the door frame includes:

a heater mounting part to which the heating part is coupled; and a coupling part that is coupled with the door upper surface part and supports the heater mounting part on the door upper surface part, wherein:

the heating part includes a heating element, a first connecting end disposed at an end of the heating element in a longitudinal direction, and a second connecting end disposed at an other end of the heating element in the longitudinal direction; and the heater mounting part includes a first connecting end fixing part that fixes the first connecting end and a second connecting end fixing part that fixes the second connecting end, wherein each of the first connecting end fixing part and the second connecting end fixing part includes:

a cover that surrounds an outer side of the respective first connecting end and second connecting end in a circumferential direction; and a support wall which partitions a space formed by the cover into inner and outer spaces and, the first connecting end and second connecting end are fitted into the respective support wall, wherein a through-hole formed inside the coupling part in a planar direction; and a glass covering the through-hole formed inside the coupling part, wherein the glass is disposed at an upper side of the heater mounting part.

15. The cooking appliance according to claim 14, further comprising:
   a shielding plate that is disposed at a side farther from a center of the cooking compartment in a front-rear direction than the heating part and connects the first connecting end fixing part and the second connecting end fixing part to each other; and
   a reflector that reflects heat of the heating part, blocks the heating part and the shielding plate from each other, and blocks the heating part and the glass from each other.

16. The cooking appliance according to claim 14, wherein:
   seating surfaces on which the glass is seated are formed at an inner side surface of the coupling part adjacent to the through-hole formed inside the coupling part;
   the seating surfaces are disposed on both sides of the through-hole formed inside the coupling part in a left-right direction; and
   the coupling part includes a restricting rib that is disposed at one side of the through-hole formed inside the coupling part in the front-rear direction and restricts movement of the glass to one side in the front-rear direction and movement of the glass in an upward direction, and a stopper that is disposed at the other side of the through-hole formed inside the coupling part in the front-rear direction and restricts movement of the glass to the other side in the front-rear direction.

* * * * *